United States Patent [19]

Rice, Jr. et al.

[11] Patent Number: 5,016,003
[45] Date of Patent: May 14, 1991

[54] ENVIRONMENTAL CONTROL SYSTEM FOR THE HANDICAPPED

[75] Inventors: Richard F. Rice, Jr., Huntsville; David M. Kelly, Madison; Daryl L. Smith, Moulton, all of Ala.

[73] Assignee: Rice-Kelly Research and Engineering, Inc., Huntsville, Ala.

[21] Appl. No.: 263,439

[22] Filed: Oct. 27, 1988

[51] Int. Cl.⁵ .................. H04M 1/00; G05D 29/00
[52] U.S. Cl. .................. 340/825.19; 379/52; 340/706
[58] Field of Search .............. 340/825.19, 706, 709; 379/52; 381/56; 341/21

[56] References Cited

U.S. PATENT DOCUMENTS

| | | | |
|---|---|---|---|
| 4,183,015 | 1/1980 | Drew et al. | 340/286 R |
| 4,215,240 | 7/1980 | Ostrowski | 340/825.19 |
| 4,274,753 | 6/1981 | Brown | 341/21 |
| 4,322,744 | 3/1982 | Stanton | 358/94 |
| 4,406,998 | 7/1983 | Willough | 341/21 |
| 4,427,847 | 1/1984 | Hofmann | 358/85 |
| 4,503,528 | 3/1985 | Nojiri et al. | 340/825.19 |
| 4,558,315 | 12/1985 | Weiss et al. | 340/825.19 |
| 4,605,927 | 8/1986 | Katz | 340/825.19 |
| 4,642,610 | 2/1987 | Smith, III | 341/21 |
| 4,746,913 | 5/1988 | Volta | 341/21 |

FOREIGN PATENT DOCUMENTS 2136617 9/1984 United Kingdom ........... 340/825.19

OTHER PUBLICATIONS

Nu-Life Environment Control System, "Control 1", described in published brochures entitled Control 1, Scanning X-10 Powerhouse Environment Control Unit, Accessories for Control 1 and Control Interfaces, Prentke Romich Company, Wooster, Ohio (1986).
"Mecca" and Deuce systems developed by Du-It Control Systems Group of Shreve, Ohio, described in Controls For the Severely Disabled (12/1987).
"Model 2814" Environmental Control System sold by Rehab Technology, Inc. of Highland, Ill., brochure Environmental Control From RTI (12/1986).
Various environmental controls, 1985-86 Catalog, pp. 11-17, published by "Technical Aids and Systems for the Handcapped, Inc." (TASH) of Markham, Ontario, Canada (12/1985).
"Mastervoice" brochure published by J-B Communications of Minneapolis, MN (12/1987).
EZRA single switch environmental control system, brochure "EZRA Easy Remote Access", published by KY Enterprises of Long Beach, CA (12/1987).
DIRECTEL model telephone interface, manufactured by bell Canada, AT&T publication "AT&T National Special Needs Center Product Catalog" (12/1988).
"Dialess I The Ultimate Family Phone", TTC, Carson, CA (12/1985).

(List continued on next page.)

Primary Examiner—Donald J. Yusko
Assistant Examiner—Yuk H. Lau
Attorney, Agent, or Firm—Nixon & Vanderhye

[57] ABSTRACT

An environmental control system for the handicapped provides a user interface which is totally integrated and programmable. An audible nested control option selection structure organizes logically related tasks and subtasks together so the user can access the tasks and subtasks in a natural fashion—providing an easy to learn user interface that is user friendly, minimizes frustration in accomplishing desired tasks, and also minimizes the time required to perform even complex control operations. Enhanced user interface features, including time encoding of control switch functions and synthesized speech prompting, further increases ease of operation and functionality. Interaction between different control channels allows the user to perform different tasks simultaneously. Enhanced telephone line manipulation is provided, including off-line assembly of telephone numbers for dialing which can be stored and easily accessed by the user through the unified audible sub-menu structure. Sharing of common hardware for multiple functions minimizes system cost, increases reliability and makes the system easier to use.

13 Claims, 34 Drawing Sheets signed for Disabled People", KY Enterprises, Long Beach, CA 90803 (12/1987).
Voice Control Systems Letter, 14 Aug. 1987.

OTHER PUBLICATIONS

OMNI PILOT environmental control unit, manufactured by Everest & Jennings, Concord, Ontario, Canada (12/1985).
Home Brain environmental control unit, manufacturer Hypertek, Whitehouse, NJ (12/1987).
Environmental Control System, manufacturer Fortress Scientific, Buffalo, NY (12/1987).
PMV Independence, manufactured by PMV Systems, Hank, The Netherlands (12/1986).
CEPCO Home Remote Control System, manufactured by Cepco, Canoga Park, CA (12/1986).
VCS1000 TM Technical Specifications, VCS TeleRec, product brochures (3), Voice Control Systems, 14140 Midway Rd., Dallas, TX 75244 (12/1987).
Developmental Equipment, Inc., catalog 1987, Lake Zurich, IL 60047 (12/1986).
ComputAbility, The Handicapped's Source, catalog, ComputAbility Corporation, Pine Brook, NJ 07058 (12/1986).
Cordless Hands-Free Phone, brochure, J-B Communications, Minneapolis, MN 55454, 12/1987.
ACS, Adaptive Communication Systems, Inc., 9-pages of switch information, Pittsburg, PA 15231 (12/1985).
"Our Switches Allow Control", product leaflets from various companies (10pp., 12/1987).
"For Higher Personal Achievement", complete brochure booklet, Prentke Romich Company, Wooster, Ohio 44691 (12/1987).
National Semiconductor, DT1050 DIGITALKER TM Standard Vocabulary Kit, National Semiconductor Corp. (12/1980).
"Controllers for Computers and Video Games De-

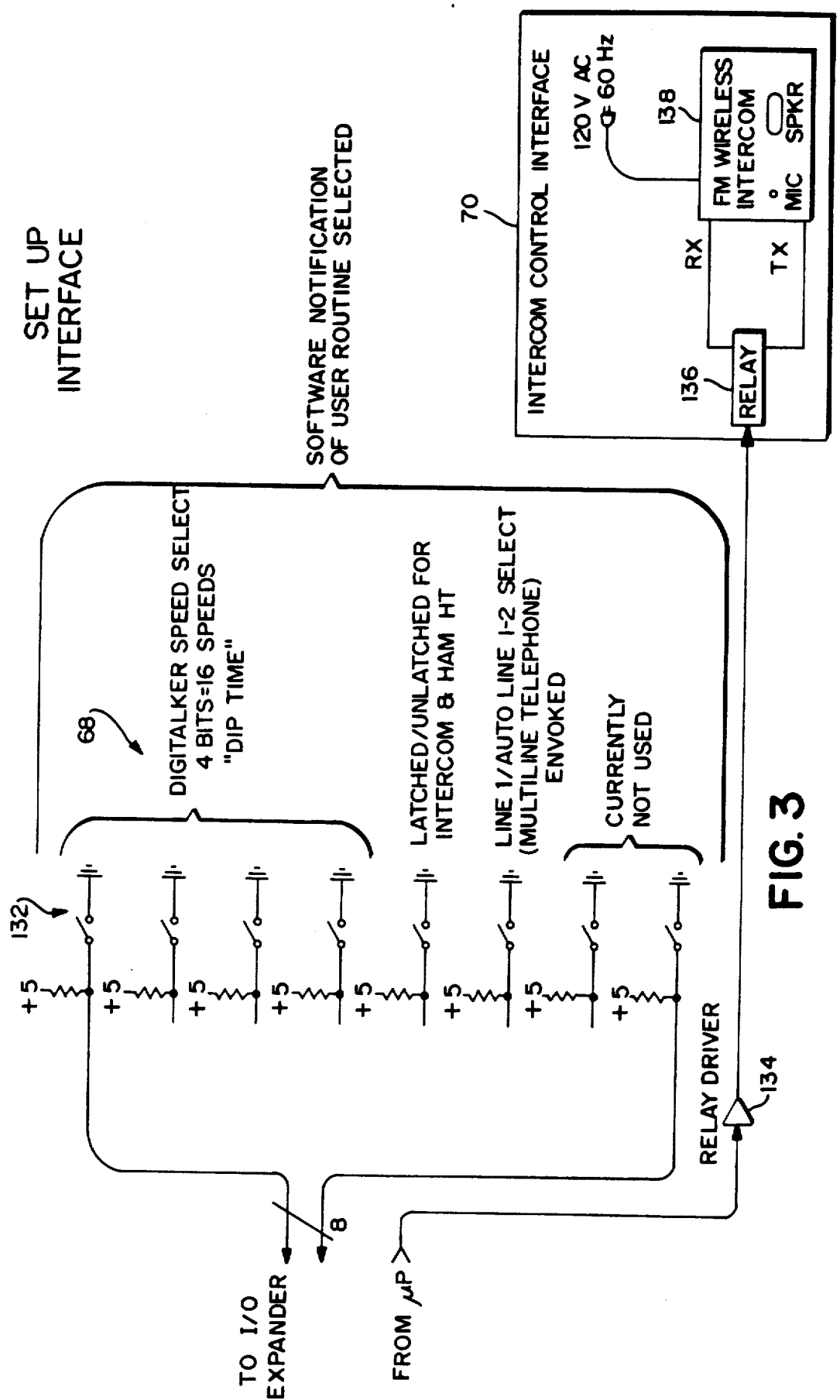

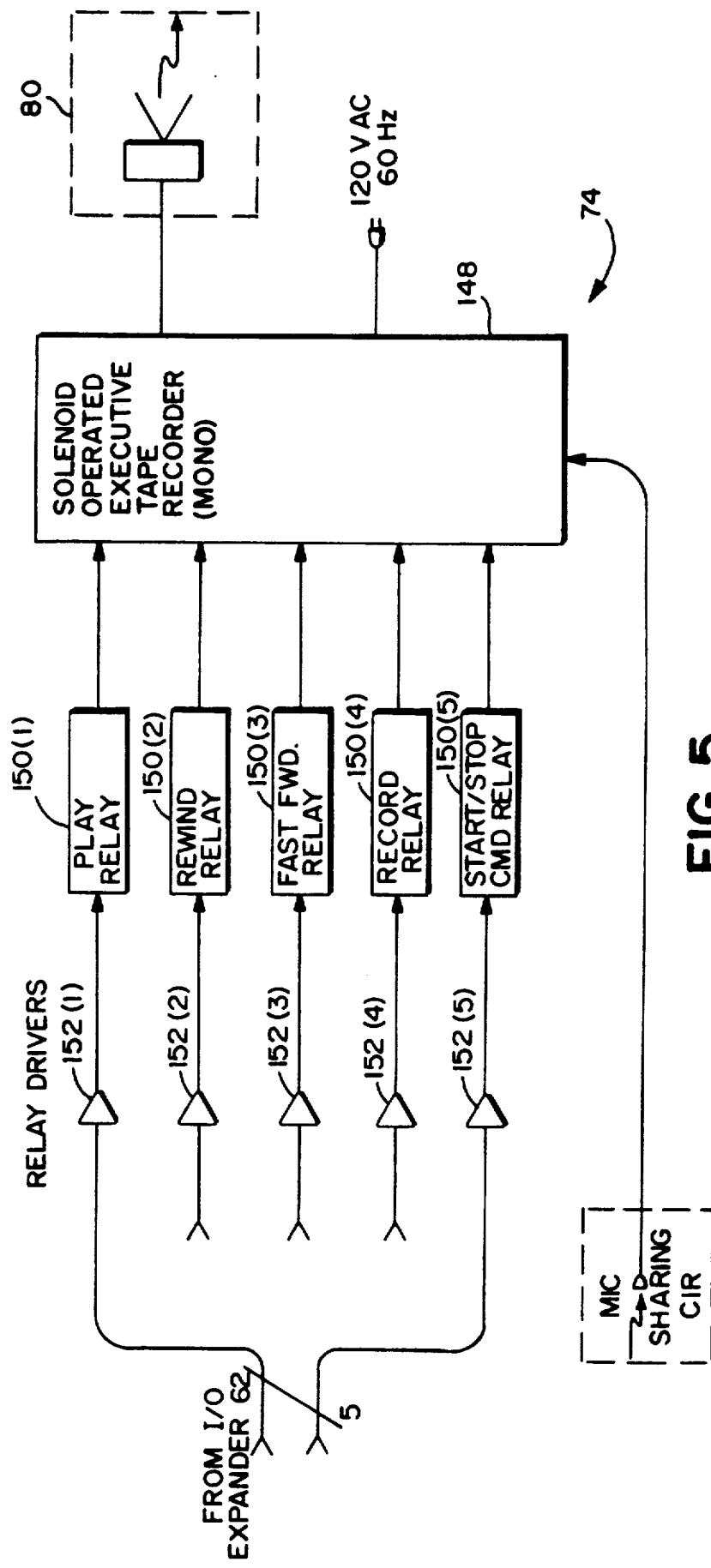

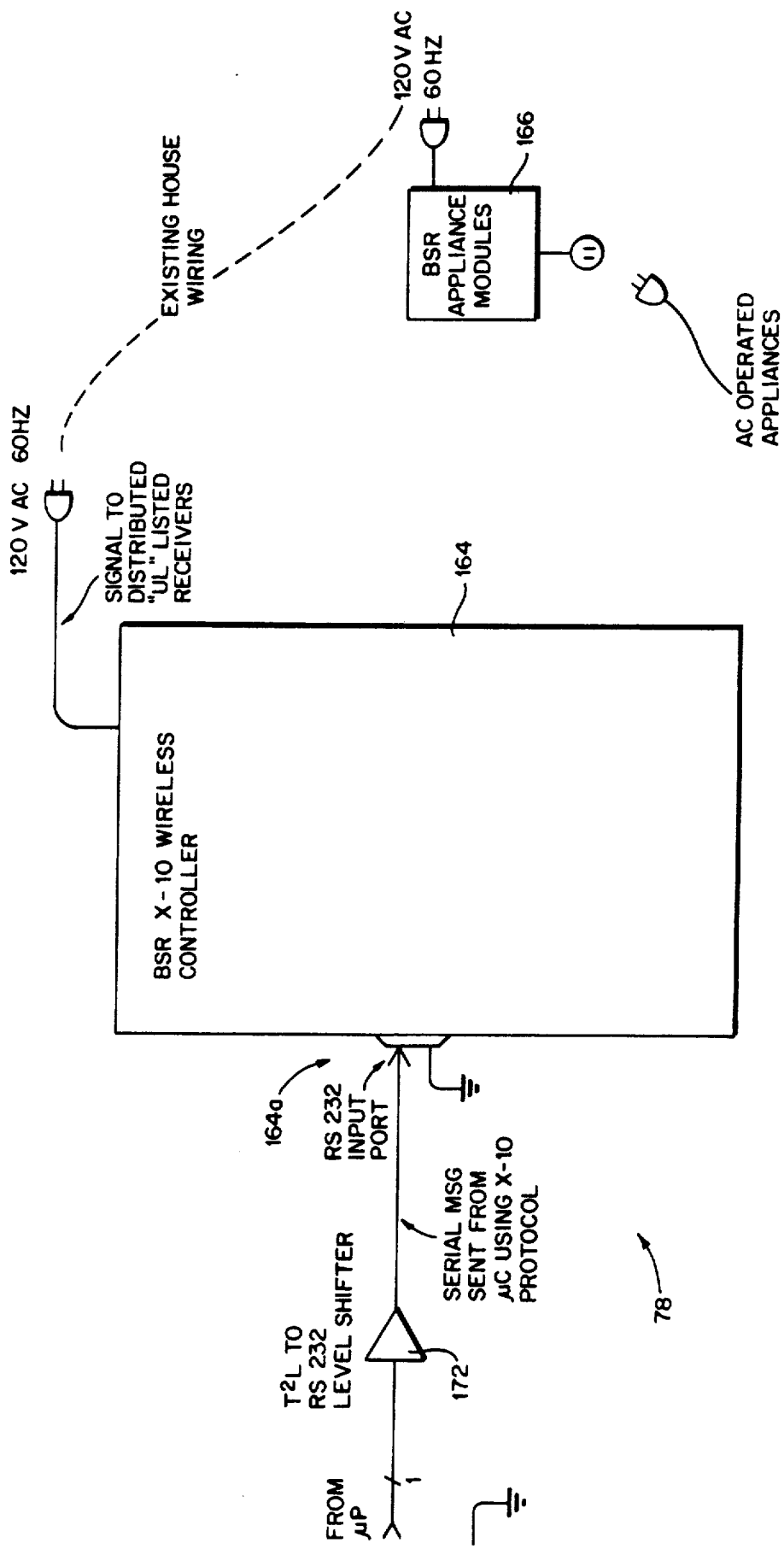
FIG. 7 BSR CONTROL INTERFACE

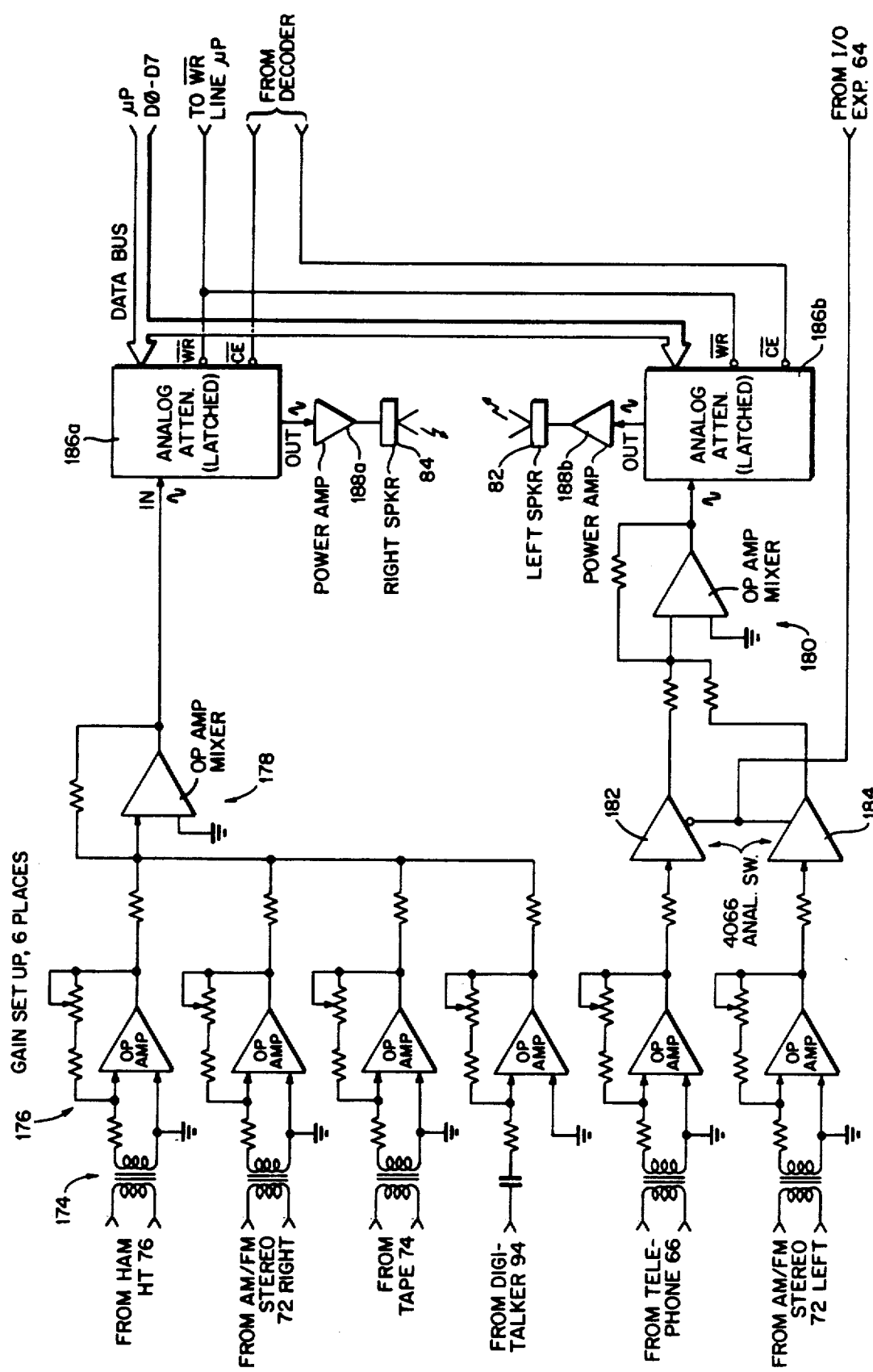
FIG. 8A SHARED SPEAKER CIRCUIT

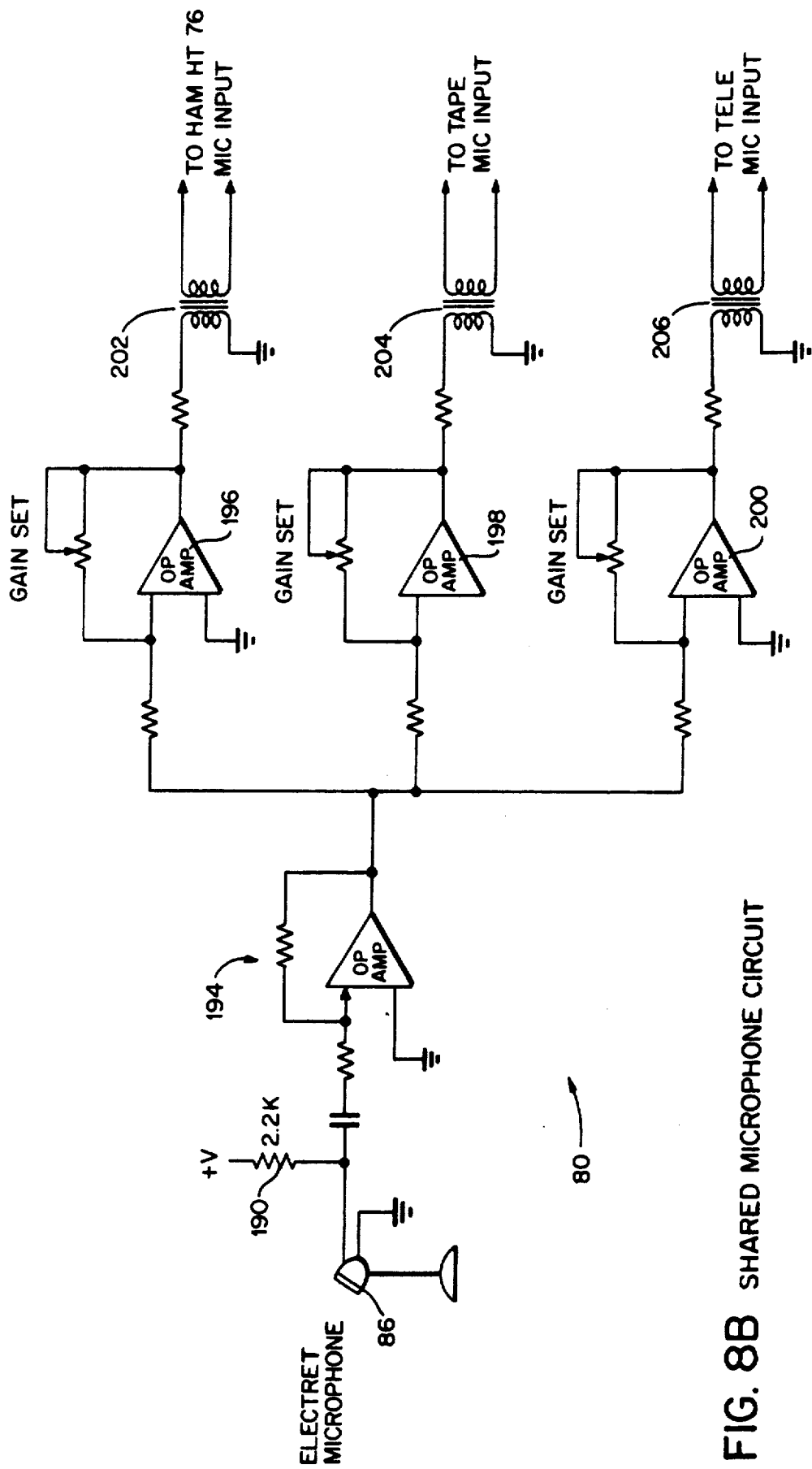
FIG. 8B SHARED MICROPHONE CIRCUIT

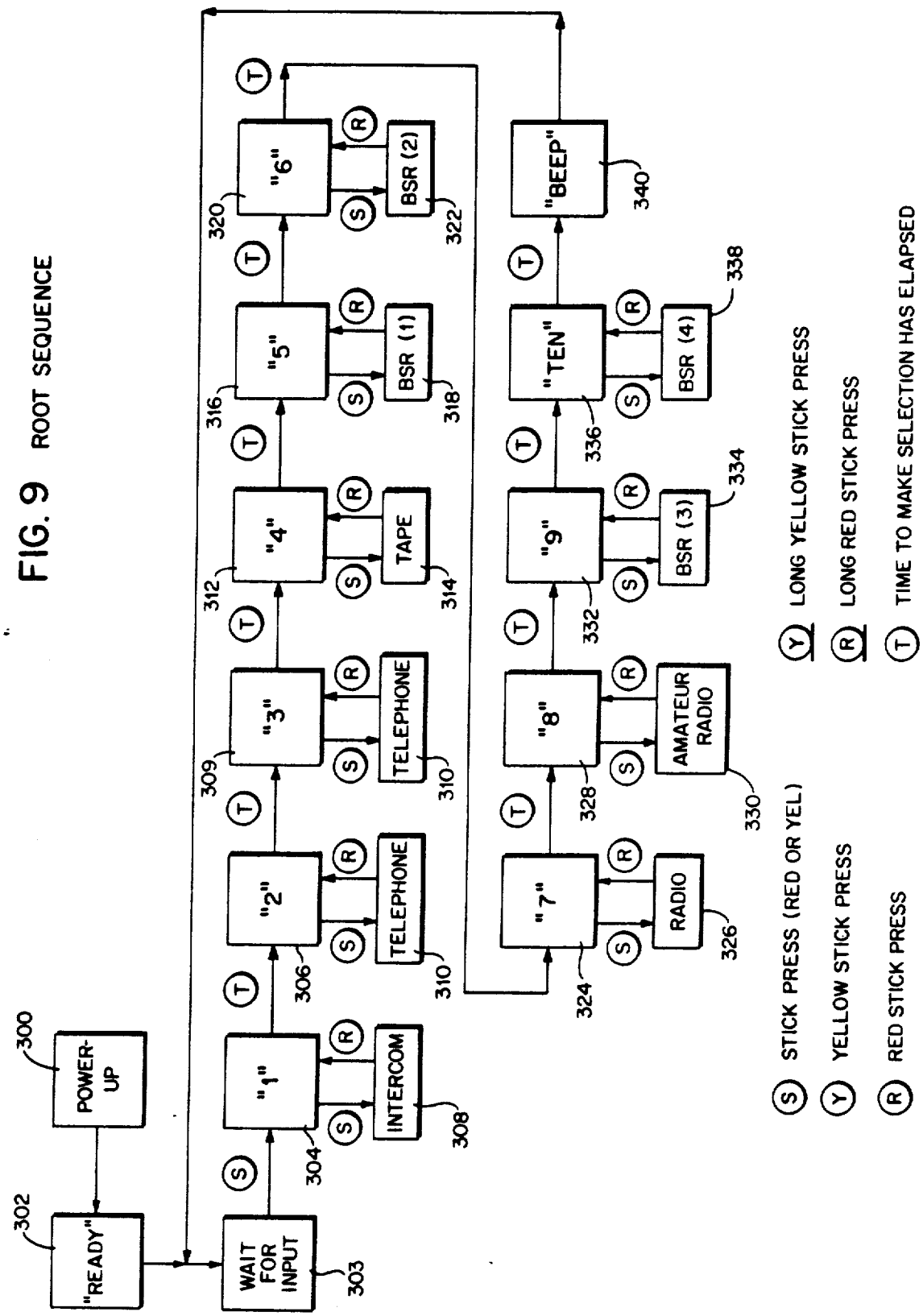
FIG. 9 ROOT SEQUENCE (INTERCOM)

(BSR)

(TAPE)

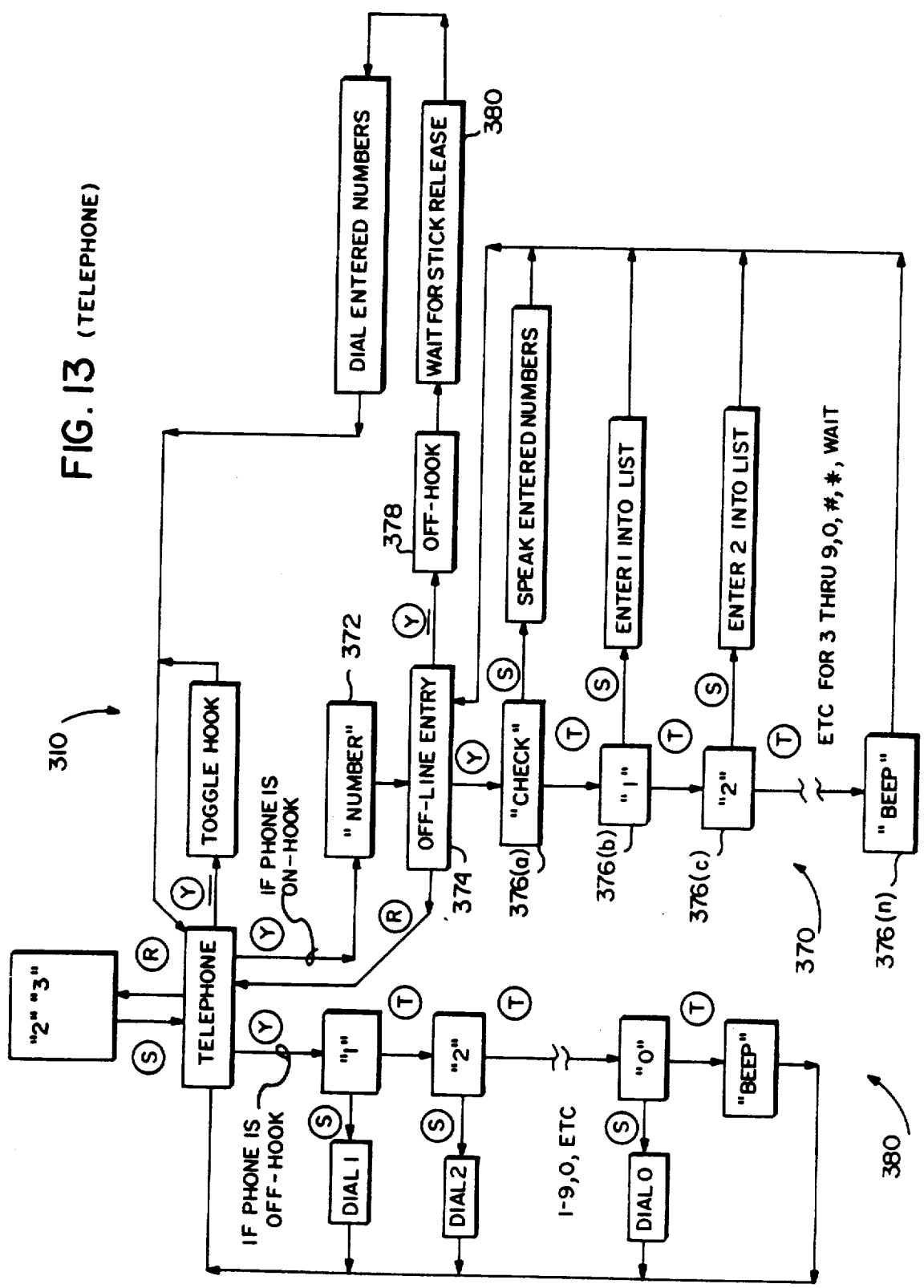
FIG. 13 (TELEPHONE)

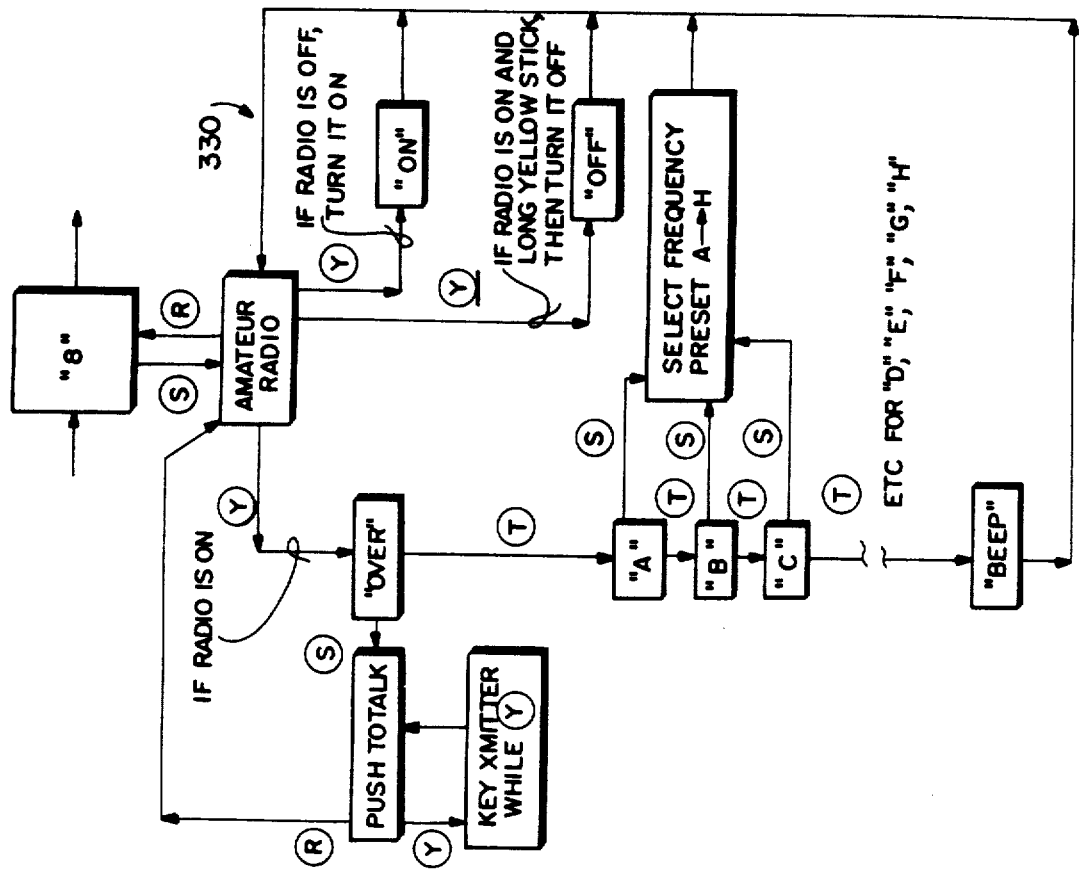
FIG. 15 (AMATEUR RADIO)
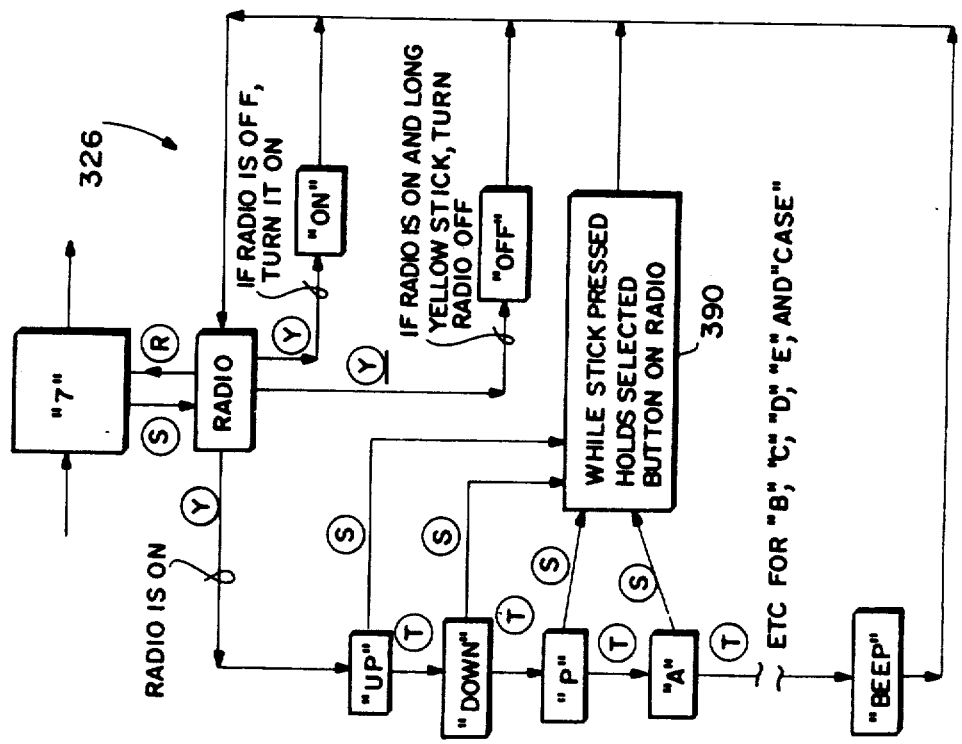
FIG. 14 (RADIO)

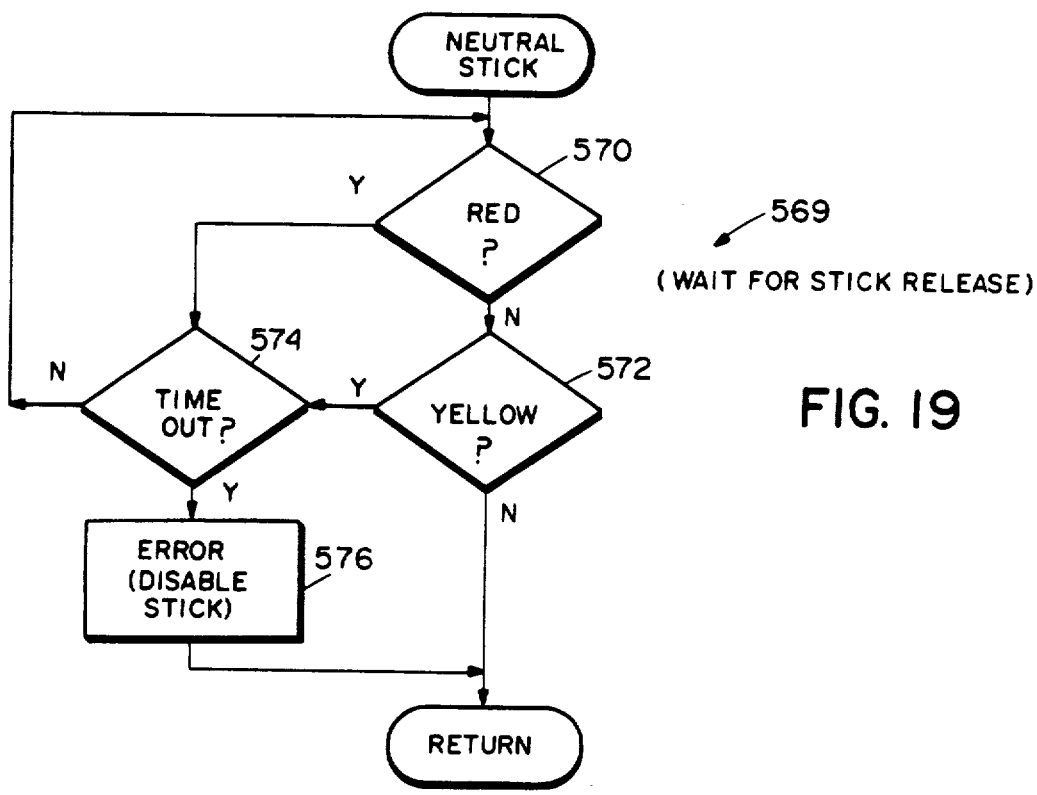
FIG. 19 (WAIT FOR STICK RELEASE)
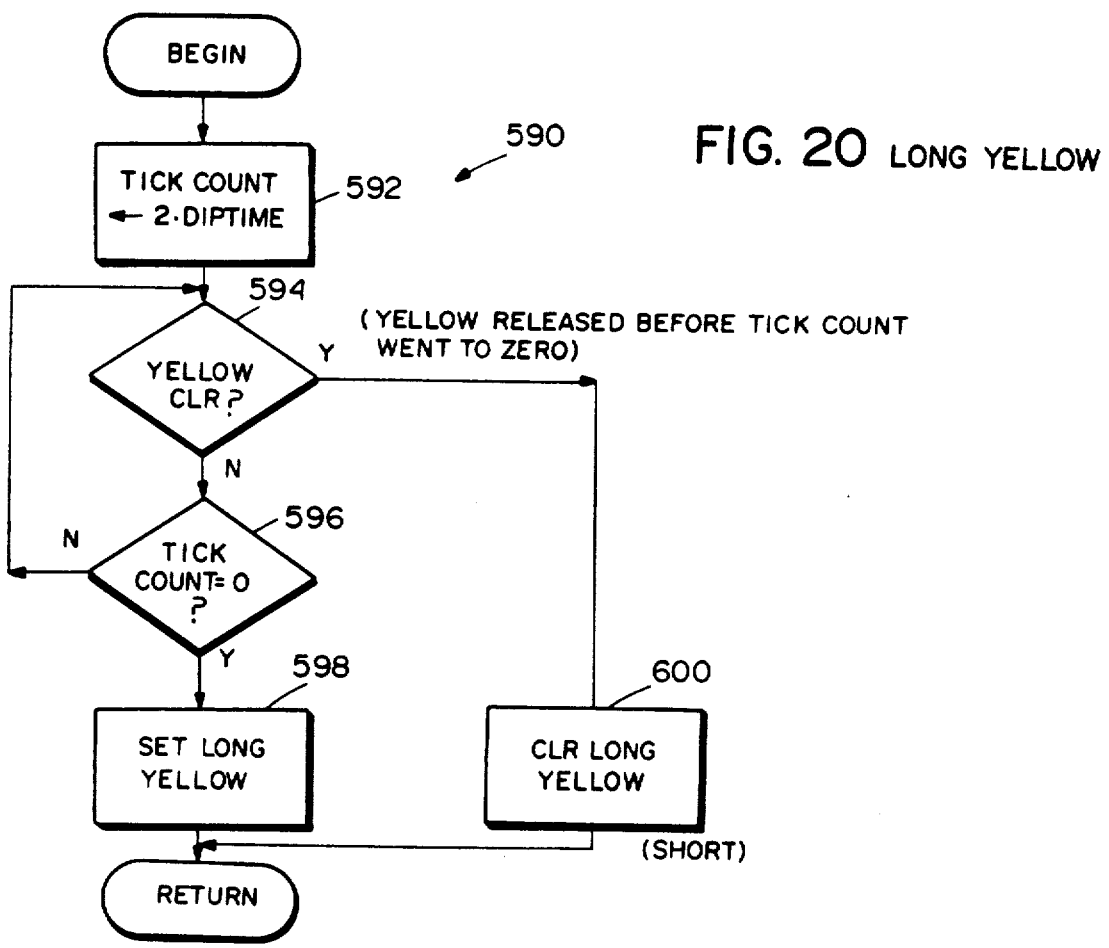
FIG. 20 LONG YELLOW

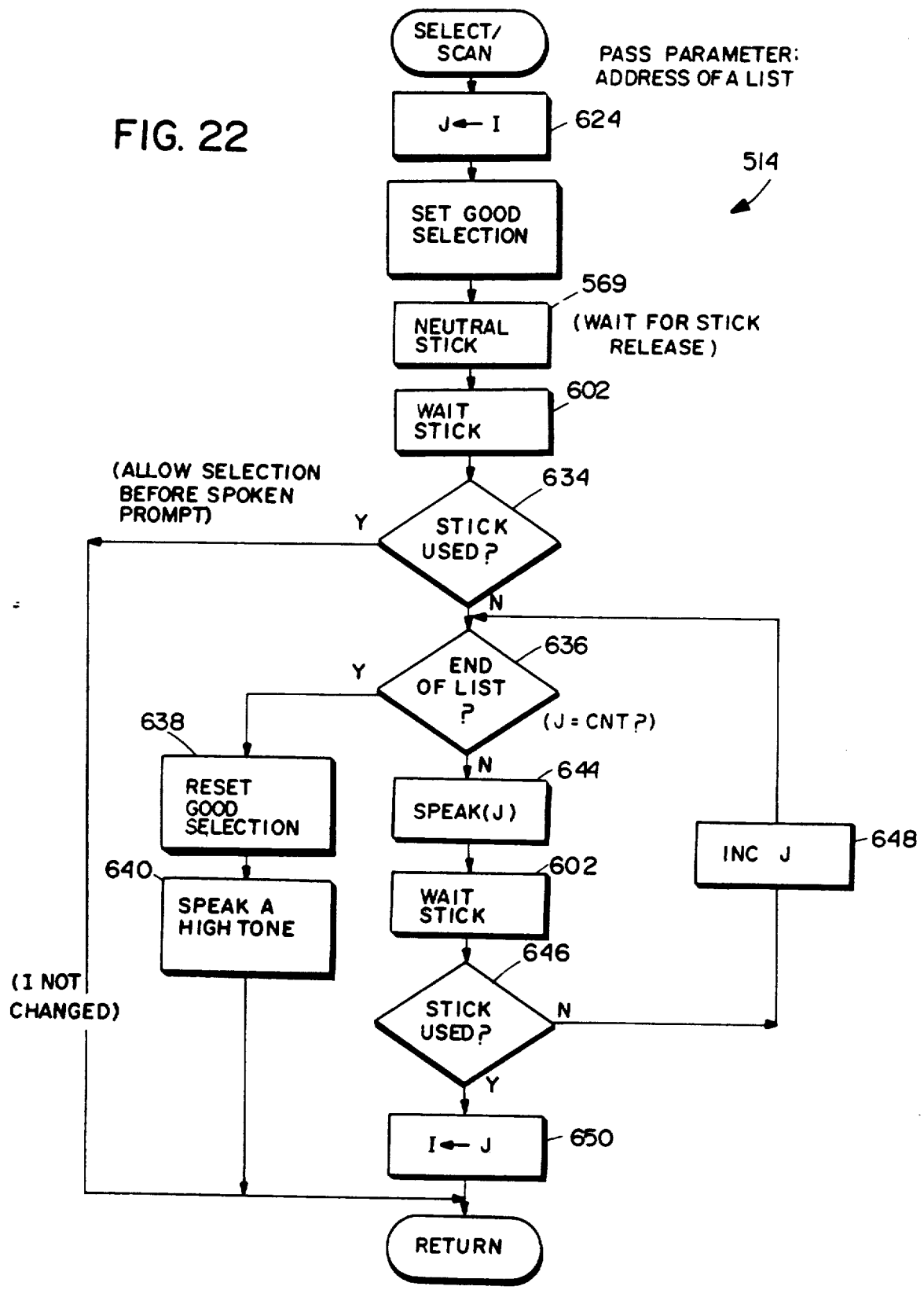

TO FIG. 24B 5,016,003

ENVIRONMENTAL CONTROL SYSTEM FOR THE HANDICAPPED

FIELD OF THE INVENTION

This invention relates to so-called "environmental control" systems for enabling handicapped people with limited mobility, dexterity and/or sensory capabilities to use, control and interact with various devices and facilities in their environment.

BACKGROUND AND SUMMARY OF THE INVENTION

It is difficult or impossible for those of us blessed with all five senses and full mobility and control of our limbs and muscles to even imagine the isolation and helplessness experienced by the severely handicapped.

Someone with sensory and/or mobility impairments may be completely unable to control the devices (e.g., telephones and radio and television receivers) we all rely upon to interact with the rest of the world. A severely handicapped person is typically confined to a bed or a wheelchair, and his entire "world" or environment may be the room or set of rooms he is confined to by reason of his lack of mobility. Electrical communications links such as the telephone, the television, the radio, the computer and "talking book" records/audio tapes may be the principal or only contact a severely handicapped person has with people and places outside of his immediate environment (fortunately, mass media is now capable of bringing a wealth of information into the home through electrical communications). Yet, an unassisted quadriplegic or other seriously handicapped person may be physically incapable of operating the controls to dial a telephone, turn a radio receiver on and off and select a station (and adjust the volume) operate a television receiver, or turn a room lamp off at night before going to sleep at night.

A person unable to perform such rudimentary control functions without assistance must rely upon the help of others to do almost everything. Turning on the television set, adjusting its volume, dialing the telephone, and switching radio stations each become a group effort requiring the cooperation of a friend, family member or personal care attendant (PCA). Sometimes a person forced to rely on another person's help for nearly all aspects of his interaction with his environment feels demoralized, useless, and purposeless—and at the very least feels very frustrated because he cannot do anything for himself.

Although a severely disabled person usually does have the mental capabilities, the skills and the determination to manage his own affairs and to function independently, complete physical dependence on someone else can easily lead to total mental dependence at worst and great frustration at best. Needless to say, a severely disabled person in such circumstances almost never can be an employable, productive member of society regardless of his skills, talents and experience (which may be considerable indeed). This frustration of the work ethic often leads to extremely low self esteem and intellectual stagnation.

Fortunately, the modern electronics age has provided severely handicapped persons with systems that allow them to interact with and control their environment. These so-called "environmental control" units or systems typically provide a user control with a small number of positions (e.g., a "sip-and-puff" switch, a joystick, a voice actuated switch, or the like) capable of being operated by a severely handicapped person. By operating the user control in accordance with feedback (e.g., audible tones and/or visual indicators) he may remotely select between and control many different electrical and electronic devices in his immediate environment.

The following is a (by no means exhaustive) listing of environmental control devices and systems having some or all of the capabilities discussed above:

NuLife Environmental Control System (a mid 1970s discrete TTL based system providing some control of a telephone and on/off of various appliances discussed in greater detail below);

"Control 1", a system sold by Prentke Romich Company, Wooster Ohio and described in published brochures entitled "Control 1", "Scanning X-10 Powerhouse Environmental Control Unit", "Accessories for Control 1" and "Control Interfaces";

The "Mecca" and "Deuce" systems developed by Du-It Control Systems Group of Shreve, Ohio and described in "Controls For the Severely Disabled";

"Model 2814" Environmental Control System sold by Rehab Technology Inc. of Highland, Illinois and described in the brochure "Environmental Control From RTI";

Various environmental controls described at pages 11-17 of the 1985/1986 Catalog published by "Technical Aids and Systems for the Handicapped, Inc." (TASH) of Markham, Ontario;

"Mastervoice" brochure distributed by J-B Communications of Minneapolis, Minn.;

EZRA single switch environmental control system described in the brochure "EZRA Easy Remote Access" published by KY Enterprises of Long Beach, California;

DIRECTEL model telephone interface manufactured by Bell Canada and described at page 11 of the AT&T Publication "ATT National Special Needs Center Product Catalog";

"Dialess I The Ultimate Family Phone", TTC, Carson, California (1985);

OMNI PILOT environmental control unit manufactured by Everest & Jennings, Concord, Ontario, which includes a five switch user interface with sequential scanning, an ultrasonic environmental control channel, a tape recorder hook up channel, and an infrared environmental control channel to allow user to operate a television converter;

Home Brain environmental control unit made by Hypertek of Whitehorse, New Jersey, a microprocessor based system (programmed by downloading from an IBM personal computer) which includes appliance and lighting control and optional voice output and telephone interface;

Environmental Control System manufactured by Fortress Scientific, Buffalo, New York, including a four-channel ultrasonic transmitter built into a joystick wheel chair control and providing the ability to dial preset telephone numbers and control a radio dial;

PMV Independence made by PMV Systems of Hank, The Netherlands, providing visual indicator lamps and associated audible indication to indicate state scanning; and CEPCO Home Remote Control System made by Cepco of Canoga Park, California, providing a multi-switch remote control module for applying and removing control voltages from appliances.

The following prior issued U.S. patents may possibly be generally relevant to environmental control systems of the type discussed above:
Katz U.S. Pat. No. 4,605,927 (1986);
Hofmann U.S. Pat. No. 4,427,847 (1984);
Drew et al U.S. Pat. No. 4,183,015 (1980); and
Stanton U.S. Pat. No. 4,322,744 (1982).

One example of a prior art environmental control system that has provided some severely handicapped users with considerable control over their environment is the "NuLife" system manufactured in very limited quantities in the mid 1970s by Scientific Systems International located in Huntsville, Alabama. This NuLife system included a wall-mounted control module and a further switching module connected to the control module via cables. A three-position hand-actuated joystick (center=off, left="ON" position one or "red-stick", right="ON" position two or "yellow-stick") or a three-position "sip and puff" respiratory-actuated switch (normally off, sip="ON" position one, puff="ON" position two) provides the control input from the user to the control module. The control module includes a discrete TTL logic type state machine that is capable of scanning a sequence of input states ("control channels") in response to control switch actuation. The input state scanning sequence is indicated by an audible tone (that is, each channel could be preset with a tone of a different pitch) and also by an array of indicator lights. No matter how the tones are setup, the user has to rely on memory of previous tones to know "where" he is in the sequence of options being presented to him. A control was provided to change the scanning rate at which the system sequences through the states. Further switch actuation when the control module occupies a certain input state causes the switching module to exercise on/off (and in some cases, more complex) control over an external device assigned (by hard wiring) to that input state.

For example, suppose the user wishes to turn on the television set and increase the television volume level. Assume that television set on/off control has been assigned to input state no. 2, and television volume selection has been assigned to input state no. 5. A typical user control input sequence using a joystick might be as follows:

(a) user moves joystick to the left ("red-stick") momentarily;
(b) the control module begins "scanning" through input states in sequence in response to the joystick input, providing a visual (light array) state indication for sighted users and alternating pitched tones to indicate the sequence of input states to blind users;
(c) when the control module "reaches" input state no. 2 (corresponding to television set on/off control channel and indicated to the user by an illuminated indicator lamp and by the fact that two tones have been generated since scanning began) the user moves joystick to the left again ("red-stick") to stop the scanning process;
(d) the user then moves the joystick to the right ("yellow-stick") momentarily to "toggle" the control output state of input state no. 2 (that is, if the switching module formerly did not supply power to the television, it will now operate a relay to apply power to the television);
(e) the user repeats step (a) and the control module repeats step (b) by resuming scanning in sequence at input state no. 3;
(f) when the user sees/hears that the control module has "reached" input state no. 5 (corresponding to television receiver volume control), he moves the joystick to the left ("red-stick") to stop the scanning process;
(g) the user moves the joystick to the right ("yellow-stick") to change the control output state for input state no. 5 (e.g., stepper relay may be operated to switch a different resistance in series with a television receiver audio amplifier output each time the joystick is operated);
(h) the user repeats step no. (a) to cause the control module to resume scanning; and
(i) the control module resumes scanning at input state no. 6, cycles to the last state (e.g., state no. 9), and waits at a null state (e.g., state no. 0) for further joystick input.

The NuLife system also allows the user to control a telephone line assigned to one of the input states. Once the state corresponding to the telephone line is selected by the "red-stick" sequence described above, the user moves the joystick to the right ("yellow-stick") to take the telephone line "off hook". A speaker phone allows the user to hear the dial tone. A similar scanning sequence is then used to permit the user to dial a telephone number. Specifically, a "yellow-stick" causes the system to begin counting from 1, with alternating pitched tones corresponding to different counts. The user selects a desired telephone number digit 0-9 by waiting for the system to count up to the desired digit and then operating "yellow-stick" again. The control module automatically transmits the selected digit in repertory pulse form (only) over the telephone line. This digit selection process is repeated by the user a number of times (e.g., eleven times for a long distance call) to dial a complete telephone number. While this procedure does permit the user to dial telephone numbers himself (as opposed to placing every call through the operator), it takes a long time to dial a single telephone number using this procedure (during which the telephone line is "off hook" so that all incoming callers hear a "busy" signal) and errors are easily introduced into the dialing process. New telephone services such as call waiting, hold, 3-way calling to call forwarding cannot be accessed with NuLife.

Many of the operational characteristics of the NuLife system have proven to be highly successful and useful. For example, the NuLife scanning input state/feedback feature (which permits the user to access a large number of different control functions by operating a three-position switch) is highly valid for any environmental control system for the severely handicapped. However, many improvements are possible and desirable.

The environmental control system user interface is the most important area for improving existing environmental control systems. The NuLife user interface, for example, is extremely cumbersome because control functions are arranged in the scanning sequence based on hard-wired relay configurations (e.g., the only stepper relay capable of controlling amplifier volume might be assigned to input state 5). This requires the user to select control functions from several different input states in order to obtain the same control results that non-handicapped users are able to achieve through a single manual operation (e.g., turning the television set ON and setting desired volume in the same knob-twisting motion). In addition, control functions were generally not grouped together logically (e.g., it was possible to change the television volume level when the television was OFF)—adding to user confusion and increasing the probability that the user would become "lost" in the control functions provided. Control operations using prior user interfaces take a great deal of time to perform and require the user to memorize essentially arbitrary assignments of control functions to input states. It would be highly desirable to provide a more flexible user interface which minimizes the number of control switch movements and the time required to obtain specific control objectives and is as user friendly and easy to learn as possible.

Perhaps one of the most serious shortcomings of prior environmental control systems is their lack of flexibility and the resulting difficulty in changing or customizing the systems to accommodate the needs of different users. Different users may have different needs (for example, some users may need multiple telephone lines, blind users may not wish to listen to television but prefer listening to talking books instead, etc.). The NuLife system described above was not a so-called "state machine" (as that term is defined in the art) in that it had no memory and could not be programmed. Rather, the system was implemented using discrete logic gates and state components and therefore provided a fixed set of functions which could be altered only by physically rewiring the combinatorial and sequential circuits (components) and associated external connections. Because of these limitations, additional functionality cannot practically be added to the system. Therefore, the only way to provide additional functions to the user is to provide additional, non-integrated control mechanisms (thereby adding to user confusion and inconvenience, increasing overall cost, cluttering the user area with additional devices and associated control and power cords, exacerbating reliability problems, and making it difficult to maintain all equipment in working order). It would be highly desirable to provide an integrated environmental control system architecture which is expandable, provides sufficient generality and flexibility to permit a wide variety of devices to be readily interfaced to it under a common flexible unified user interface/control scheme, can be customized (preferably by the user himself in some cases via the same user interface/control scheme) to accommodate the needs of different users and the changing needs of a single user, and yet is compact, portable and battery operable (so that is can be mounted on a wheelchair).

Further disadvantages of prior "complete" environmental control systems such as the NuLife system and other systems presently offered for sale relate to cost. A high percentage of disabled people cannot afford equipment to enhance their lives and many times are bitterly disappointed when provided equipment fails to live up to expectations. Because currently available systems have been designed to provide a certain fixed repertoire of functions, the basic system cost is relatively high. A few manufacturers currently provide "full featured" environmental control systems (offering multiple channels of AC power control, a telephone interface capable of prestoring telephone numbers, electric bed control, television control, intercom, and other control functions)—but the system cost is excessive ($3000 to $4000 for a fully configured system) is simply out of reach for all but a few severely handicapped people. Severely handicapped people without an environmental control system are often not employable—and therefore cannot afford to purchase the equipment they need to make them employable! It would be highly desirable to provide an affordable environmental control system which has a modular, expandable architecture so that the basic system cost can be minimized and the user can purchase additional control features (without risking functionality already provided) if and when additional funds become available. It would also be highly desirable to share as many facilities as possible between different control functions (e.g., to share a microphone between the telephone, a note-taking tape recorder, and a two-way radio) to minimize overall system cost and reduce the number of input/output cables that must be connected to the system.

Another serious shortcoming in existing environmental control systems is the lack of interaction between different control channels. For example, if the telephone rings while the user is watching television or listening to the radio, the user may have to manually mute the sound filling his room through a first time-consuming control sequence before he can answer the telephone (typically a speakerphone type system) through another time-consuming control sequence (it is not generally possible for a severely handicapped person to run to a quieter room to answer the telephone). It would be highly desirable to provide automatic control channel interaction in a flexible manner.

Another deficiency in existing environmental control systems is their inability to effectively interface with modern Touch-Tone telephone lines having advanced features such as call waiting or with modern computerized automatic call processing systems (which typically require one to key additional tones corresponding to account number, for example). The telephone is a powerful and vital link to the outside world, and a severely handicapped person should be capable of using the power of the telephone to the fullest extent possible. Unfortunately, most existing environmental control system telephone interfaces are extremely limited (some require the user to place every call through an operator) and do not take advantage of the tremendous flexibility provided by modern electronic Telephone Company switching networks—nor do they provide local speed calling or off hook programming features that could save the user a great deal of time and anxiety. Even if access was provided to the speed dialing feature offered by the telephone company, there would be no way for the severely handicapped person (who often cannot write and may be unable to read due to sight impairments) to keep track of what numbers have been programmed for the various speed calling digits.

Our invention provides an environmental control system for the severely handicapped which overcomes many of the disadvantages of prior systems. Some of the advantageous features of the presently preferred exemplary embodiment of our invention are listed below:

Totally integrated and programmable system provides flexibility, expandability and versatility;

An audible nested control option selection structure organizes logically related tasks and subtasks together so the user can access the tasks and subtasks in a natural fashion, providing an easy to learn user interface that is user friendly, minimizes frustration in accomplishing desired tasks, and also minimizes the time required to perform even complex control sequences;

Enhanced user interface features, including time encoding of control switch functions and synthesized speech prompting, further increases ease of operation and functionality;

Interaction between different control channels allows the user to perform different tasks simultaneously. All items with a high potential "nuisance factor" (NF) (such as volume controls) are programmed to reduce their nuisance factor whenever a mute subroutine is called. For example, all potentially interfering audio being generated by the system is muted automatically whenever the telephone is placed off-hook. Once on the phone, the user may play his favorite music as loud as he wishes (the system assumes he knows what he is doing).

System modularity allows the user to purchase a low-cost starter system that meets immediate needs and permits later (inexpensive) expansion without risk at will;

The system form factor is small enough to be mounted on a wheel chair or carried as an attache case;

The system may be battery operated; is portable and transportable;

Open system architecture will encourage users and technologists to develop their own specific hardware customized for specific control needs—and control such hardware through the common integrated user interface;

Enhanced telephone line manipulation, including off-line assembly of telephone numbers for dialing, a catalog of user preprogrammed telephone numbers indexed for easy access by the user through the unified audible sub-menu structure;

Wireless control links minimize wire connections and also facilitate control over off-the-shelf consumer electronics devices with built-in wireless remote control functionality; and Sharing of common hardware for multiple functions minimizes system cost, increases reliability and makes the system easier to use.

BRIEF DESCRIPTION OF THE DRAWINGS

These and other features and advantages of the present invention will be better and more completely understood by studying the following detailed description of presently preferred exemplary embodiments in conjunction with the drawings, of which:

FIGS. 2-7, 8A and 8B are more detailed schematic diagrams of various components of the system shown in FIG. 1;

FIGS. 9-15 are schematic diagrams of the audible selection control process performed by the system shown in FIG. 1;

FIGS. 16A-16B, 17, 18, 19, 20, 21, 21A, 22, 23A-23B, 24A-24C, 25, 26A-26D are schematic flow charts of exemplary program control steps performed by the system shown in FIG. 1.

DETAILED DESCRIPTION OF THE DRAWINGS

Figure 1:
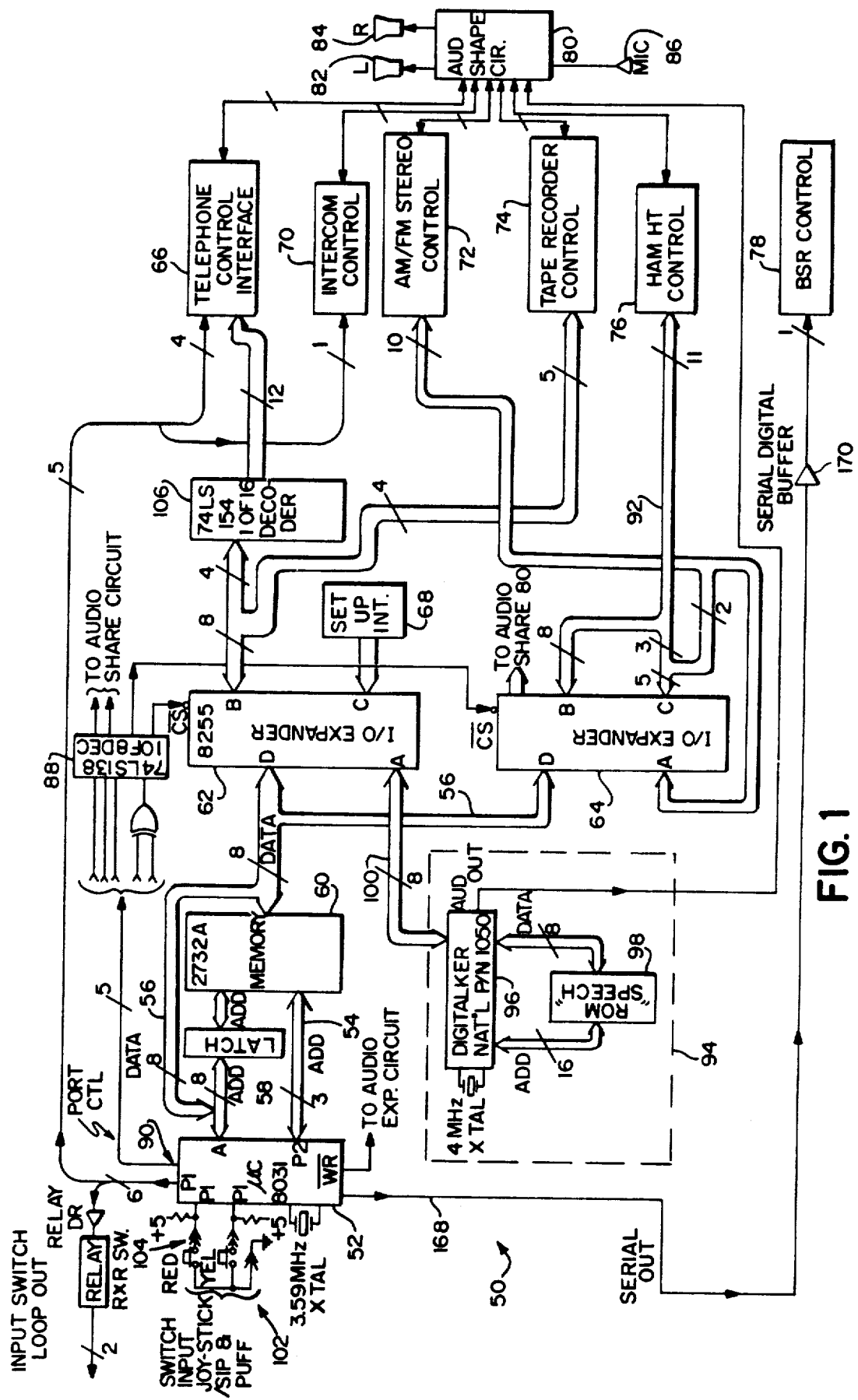
FIG. 1 is a schematic block diagram of presently preferred exemplary embodiment of an environmental control system in accordance with the present invention.

FIG. 1 is a schematic block diagram of the presently preferred exemplary embodiment of an environmental control system 50 in accordance with the present invention. System 50 includes a microprocessor/microcontroller 52 connected via the conventional address bus 54, shared address/databus 56 and latch 58 to an EEPROM program store memory 60. Microprocessor 52 controls the remainder of system 50 in accordance with programmed controlled instructions stored in memory 60 (these program control instructions will be discussed in detail in connection with FIGS. 16A-23D). Shared address/databus 56 is also connected to inputs of conventional I/O expanders 62, 64, the function of which is to effectively multiplex the bus 52 to a selected peripheral device. Microcontroller 52 can communicate via I/O expanders 62, 64 to any one of the following subsystems of system 50: telephone control interface 66, a setup interface 68, an intercom control interface 70, an am/fm stereo radio control interface 72, a tape recorder control interface 74, an amateur radio control interface 76, and a BSR control interface 78. These various control interfaces provide the means by which microprocessor 52 is capable of controlling the environment of the user.

Each of control interfaces 66, 70, 72, 74 and 76 in the preferred embodiment, provide audio signals to and/or receive audio from an audio sharing circuit 80. This audio sharing circuit 80 in the preferred embodiment provides a left stereo audio output to a left stereo speaker 82 and a right stereo audio output to a right stereo speaker 84. Audio sharing circuit 80 also has an input connected to an electric microphone 86. In addition, microprocessor 52 is able to directly control audio sharing circuit 80 via a decoded port control output provided by a 1-of-8 decoder 88 in response to signals provided on a 5-line port control output 90 of the microprocessor; via a right/not right output control WR provided by the microprocessor; and also via a multiplex bus output 92 shared between the amateur radio control interface and the audio sharing circuit 80. The function of audio sharing circuit 80 is to permit various devices requiring an amplified voice input (the intercom control interface 70, the telephone control interface 66, the tape recorder control interface 74 and the amateur radio control interface 76) to share common microphone 86, and to permit the various devices producing an audio output signal (all of control interfaces 66, 70, 72, 74, 76 in addition to a speech synthesizer subsystem 94 to share common left and right stereo output speakers 82, 84.

Speech synthesizer 94 provides a vocabulary of spoken synthesize words and phrases specified by and on the command of microprocessor 52. In the preferred embodiment, speech synthesizer 94 is based on the National Semiconductor DT1050 DIGITALKER ™ speech synthesis system, which includes speech processing chip 96 and a read-only memory 98. Further detailed information about the National Semiconductor part number DT1050 may be found in a variety of National Semiconductor publications, including the publication entitled "DT1050 DIGITALKER Standard Vocabulary Kit", publication number IM-FL30M120 (Dec. 1980, National Semiconductor Corp.). Briefly, speech ROM 98 contains a vocabulary of nearly 140 words in compressed form along with two-toned (high tone and low tone) in silence durations. Speech synthesis chip 96 selects a specified word or a phrase stored in speech ROM 98 in response to an 8-bit command passed to it from microprocessor 52 via I/O expander 62 and databus 100. Thus, to control speech synthesizer 94 to speak a particular word (e.g., the number "1"), microprocessor 52 needs only to address speak synthesizer 94 (via I/O expander 62) and provide the speech synthesizer with the predefined code corresponding to the word or phrase to be spoken (8-bit binary value 00000001 for the phrase "1"). Of course, speech synthesizer 94 in the preferred embodiment is relatively limited in vocabulary—and this limits the content and variety of the audible prompts system 50 is capable of providing.

Each function, such as telephone, talking book, X-10 (BSR), radio, etc., is built on a separate PC board containing all the I/O hardware and software needed to add that item to the system. The user may customize his system by purchasing only (and all) the items he needs. There is no reason not to have five telephones for example.

For institutional purposes, a network card could page the nursing station or front desk digitally rather than using analog techniques (intercoms are analog and subject to noise). Much other information can be conveyed digitally—such as enforcement of "lights-out" or "time to wake-up." Functions may be dynamically added or deleted through such an interface at fixed times during the day or when the user's skill advances and needs them. In order for an item such as the telephone to be customizable via the network, the telephone software must be written with this in mind. This limits customization to enabling/disabling preprogrammed functions and rearranging their order. For those occasions this restriction is too severe (such as software development) the network card allows complete access to the system RAM for reprogramming at the microprocessor level. All forms or customization and outside control require a computer interfaced to the network with display and keyboard.

In the preferred embodiment, microprocessor 52 accepts only a single input: the on/off state of a single-pole double-throw switch 102. Switch 102 (which is disengagably connectable to microprocessor 52 via a conventional connector 104) may be one of two types in the preferred embodiment: A conventional joystick switch having a left-position-on (e.g., "red") set of contacts, a center off position, and a right-position-on (e.g., "yellow") set of contacts; or a conventional "sip and puff" pneumatically operated switch having an inhale on position, an exhale on position and an atmospheric pressure off position. As will be understood, many handicapped people lack the manual dexterity required to operate a computer keyboard or even a bank of on-off push button or toggle switches. It was discovered long ago, however, that a rugged 3-position joystick is capable of being operated effectively by a person who lacks the dexterity or other facilities to operate a more complex switch. Moreover, even a person such as a high-level quadriplegic who has no use of his or her arms or legs is generally able to operate either a conventional "sip and puff" switch (exhaling into a tube activates one switch on state, and drawing air from the tube in a manner like sipping from a straw activates another switch on state) or a conventional joystick type switch. A basic problem confronted by (and effectively solved by) the preferred embodiment environmental control system 50 is to permit the user to easily, effectively and flexibly select and control any or all of the various control interfaces 66, 70, 72, 74, 76 and 78 using only a single switch having only two alternate on positions and a default off position.

Briefly, system 50 in the preferred embodiment solves this control problem in part by providing hierarchically-arranged sequences of control options. Audible prompts generated by microprocessor 52 via speech synthesizer 94 inform the user about where he currently "is" in the hierarchical control sequences, and in response to user activation of switch 102, announces a sequence of control options available to the user at the particular level in the hierarchy the system is currently operating in. The user may select one of the announced options (by further manipulation of switch 102) or he may reject all of the options and operate the switch to select a different level—and corresponding option sequence—in the hierarchical option selection structure. Because options are presented to the user in sequence and audible prompting is provided, the user may select an option by synchronizing his operation of switch 102 in time with the announcement of the prompt corresponding to the option he wishes to select. The preferred embodiment of the present invention also attaches significance at some levels of the hierarchical control structure to the length of time the user operates switch 102 (e.g., holding the joystick in the yellow on position for a long time period may select one control option, while holding the joystick in the yellow on position for a shorter time period may select an entirely different control option). These and other control features of the presently preferred exemplary embodiment of the present invention will be described in much greater detail later in connection with FIGS. 9-15.

Now that the overall architecture of system 50 has been described, details relating to the individual control interfaces 66–78 will be presented with reference to FIGS. 2-8B.

Figure 2:
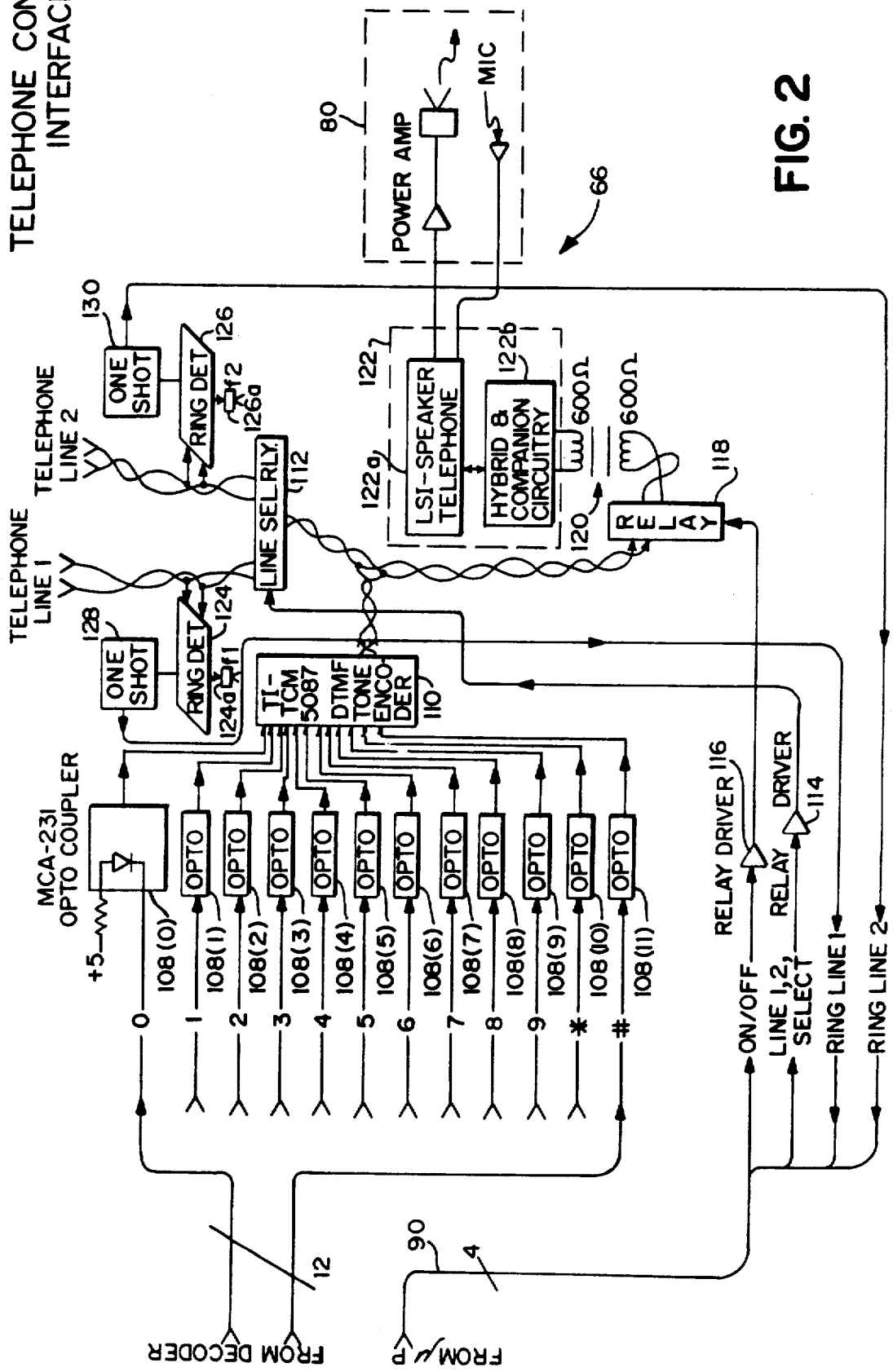

FIG. 2 is a schematic block diagram of telephone control interface 66 shown in FIG. 1. In the preferred embodiment, telephone control interface 66 is connected to receive control signals from microprocessor 52 port control output 90, and receives additional control from the microprocessor via I/O expander 62 and a 1-of-16 decoder 106 shown in FIG. 1. Decoder 106 decodes 4 bits of the 8-bit microprocessor shared address/databus 56 into 16 mutually exclusive output lines corresponding to dialable telephone digits (in the preferred embodiment, only 12 of the 16 outputs of decoder 106 are used, corresponding to digits 0–9, "*" and "#"). The 12 outputs of decoder 106 are connected to respective opto-couplers 108. These opto-couplers (which may be conventional semiconductor opto-coupling devices such as Monsanto part number MCA-231) provide safety voltage isolation and noise immunity between decoder 106 and a DTMF tone encoder 110. Tone encoder 110 in the preferred embodiment is a conventional Texas Instruments device TCM507 which produces the DTMF tone pair corresponding to a selected telephone digit. Thus, for example, to control DTMF tone decoder 110 to produce the DTMF tone pair corresponding to a "9", microprocessor 52 merely addresses telephone control interface 66 via I/O expander 62 and provides 4 bits of encoded data to decoder 106. These 4 bits, when decoded by decoder 106, activate the opto-coupler 108 corresponding to the number "9", which in turns provides an input on the "9" input line of DTMF tone encoder 110.

The output of tone encoder 110 is connected to a line select relay 112 which selects between two different telephone lines (line 1 and line 2) in the preferred embodiment. Telephone lines 1 and 2 are conventional touch-tone telephone lines, preferably with advanced features such as call waiting, pause, speed dialing and the like. Line select relay 112 alternately selects between line 1 and line 2 in response to a control signal applied to it via relay driver 114 by microprocessor 52. An additional relay driver 116 permits microprocessor 52 to directly control the state of an on-hook/off-hook relay 118, this relay 118 selectively connecting and disconnecting the telephone line selected by relay 112 to and from the primary winding of a 600 ohm matching transformer 120. The other winding of transformer 120 is connected to a conventional speaker telephone system 122, which in the preferred embodiment includes a conventional off-the-shelf LSI speaker telephone module manufactured by Motorola and its conventional hybrid and companion circuit 122B. Speaker telephone 122 provides conventional voice-operated switching, isolation and amplification commonly found in readily available conference speaker telephones. The audio output provided by speaker phone 122 is connected to an input of audio sharing circuit 180 for eventual amplification and annunciation over a speaker 82, 84; and audio sharing circuit 80 provides an amplified input for microphone 86 to the input of the speaker phone.

A ring detector 124 is connected to telephone line 1, and another ring detector 126 is connected to telephone line 2. In the preferred embodiment, ring detectors 124, 126 are conventional off-the-shelf Motorola part numbers MC34012-1 which provide a output signal whenever telephone ringing voltage is detected. The output signal provided by ring detector 124 is processed by a conventional one-shot monostable multi-vibrator (e.g., type 74LS123) 128, and the output of ring detector 126 is processed by one-shot 130. One-shots 128, 130 condition the outputs of ring detector 124, 126 respectively so that the short ring voltage duration outputs produced by the ring detectors are converted into relatively long TTL pulses. One-shots 128, 130 provide their outputs separately and directly to port inputs of microprocessor 52 in the form of signals "ring line 1" and "ring line 2". Ring detectors 124, 126 also provide audible ringing indications of different frequencies (via transducers 124A, 126A) so that the user is informed whenever either of the telephone lines rings and can also tell which line is ringing.

FIG. 3 is a detailed schematic diagram of setup interface 68 and intercom control interface 70 shown in FIG. 1. In the preferred embodiment, a single 8-switch DIP (dual in line package) switch assembly 132 is provided by setup interface 68 for programming some default options that may change from user to user but do not often change for the same user. Switch 132 is preferably accessible from the outside of the cabinet in which system 50 is housed, and is used to select certain default values for the operation of system 50. In the preferred embodiment, for example, one of the options that may be selected via positions of switch 132 is the scan rate at which system 50 presents options to the user. This timing setting, called "dip time", may be set to any one of sixteen different delay times by operating switches (4) of switch assembly 132. Another switch default option provided by setup interface 68 is latched/unlatched operation of input switch 102 for certain operating modes. For example, some of the control interfacing provided by system 50 requires push-to-talk operation. In particular, intercom control interface 70 is desirably operated in a mode in which the user may speak to the remote intercom unit so long as he continues to actuate input switch 102, and then listen to the remote intercom unit upon releasing the input switch. However, if a sip and puff input switch 102 is being used (which requires constant inhale or exhale to maintain the switch in either on position), the user cannot maintain the switch in the on position and at the same time speak. The latch/unlatched option provided by setup interface 68 allows the user to operate the sip and puff switch, for example, to place intercom control interface 70 in the "talk" mode (auto latched by 52), release the sip and puff switch to speak into the intercom and operate sip and puff switch again to unlatch the "talk" state and enter the "listen" state.

Setup interface 68 also provides a further switch option to disable telephone line 2 if only one telephone line is connected to system 50.

Intercom control interface 70 is shown in schematic form on FIG. 3. Intercom control interface 70 is controlled by one of the output port lines from microprocessor 52, and is a relatively simple interface in the preferred embodiment. Microprocessor 52 controls a relay driver 132 which in turn drives a "talk"/"listen" selection relay 136. Relay 136 controls the state of a conventional off-the-shelf fm wireless intercom 138 to operate in either the talk mode or the listen mode (in the preferred embodiment intercom 13 is always "on" in the listen mode—even when other devices are activated—unless the user places it into the "talk" mode). Wireless intercom 138 may receive its microphone audio input from audio sharing circuit 80 and provide its audio output to the audio sharing circuit if desired, or alternatively, the intercom may use an internal microphone and speaker.

FIG. 4 is a schematic block diagram of am/fm stereo radio control interface 72 shown in FIG. 1. Am/fm stereo control interface 72 in the preferred embodiment is built around a conventional off-the-shelf Blaupunkt SQM model automotive am/fm digital radio 140. This conventional digital radio has been modified in the preferred embodiment to provide a parallel push button control input through which microprocessor 52 may control the radio. In particular, a bus output of I/O expander 64 shown in FIG. 1 connected to a bank of opto-isolators 142 connected in parallel with the conventional radio push button controls. The opto-isolators 142 thus provide on/off control of push button inputs of radio 140. For example, to enable the "seek up" function provided by radio 140, microprocessor 52 merely applies a logic level 1 on its shared address/databus 56 and addresses the am/fm stereo control interface 72 via I/O expander 62 to activate opto-coupler 142(8) shown in FIG. 4. An additional control line from I/O expander 62 operates a power on/off relay 144 via a relay driver 146 to selectively apply power to and disconnect power from radio 140. A regulated conventional 12VDC power supply output is connected to relay 144 to selectively provide power to radio 140.

Figure 5:
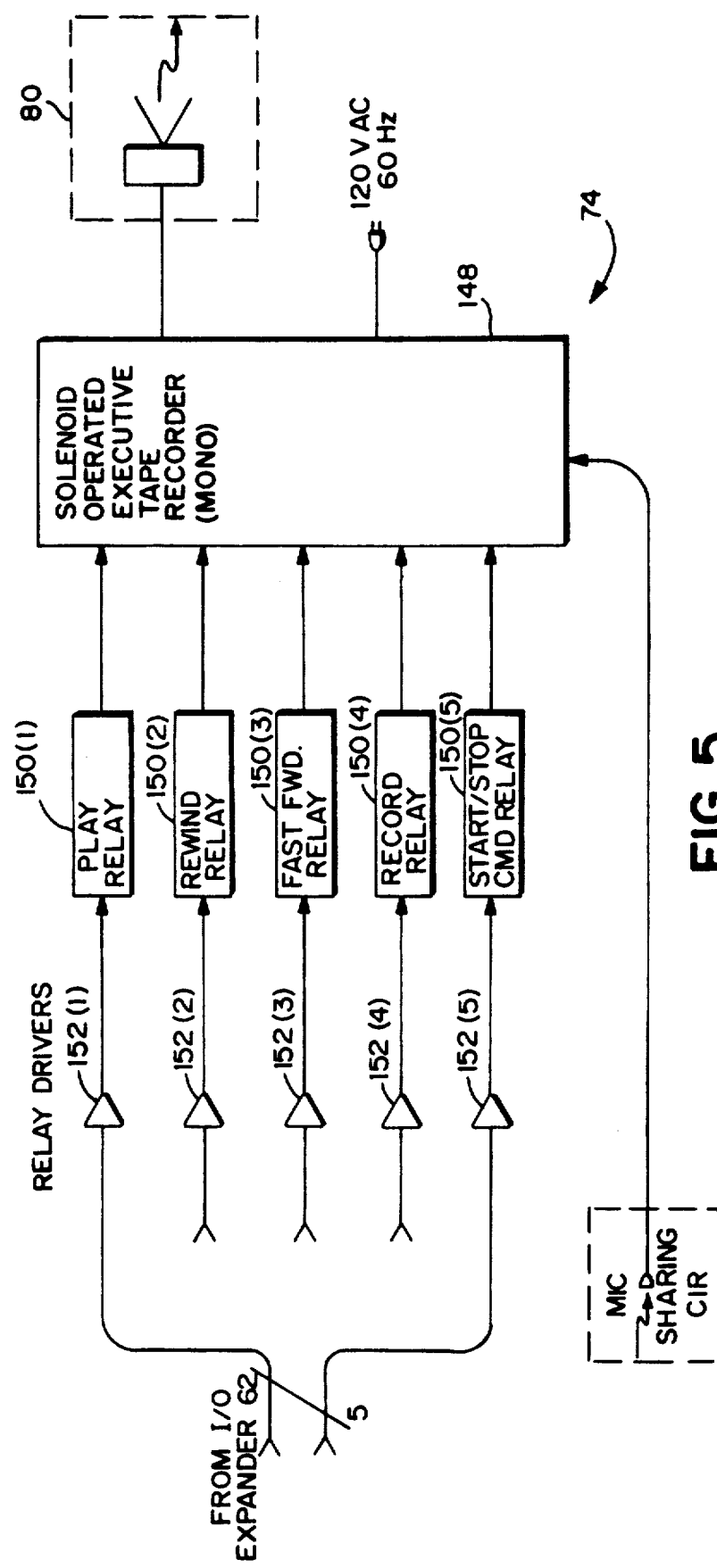

FIG. 5 is a schematic block diagram of tape recorder control interface 74 shown in FIG. 1. Tape recorder control interface 74 is built around a conventional executive tape recorder 148 having rewind, play, fast forward, record and start/stop control inputs. These respective inputs are normally operated by different push buttons on the tape recorder, but on the preferred embodiment the push buttons are not used and control relays 150 operate the respective functions instead Microprocessor 52 controls the states of relays 150(1)-150(5) via data sent to I/O expander 62 and relay drivers 152. The audio output provided by conventional tape recorder 148 is applied to audio sharing circuit 80, and amplified microphone input provided by the audio sharing circuit is connected to the microphone input of the tape recorder.

Figure 6:
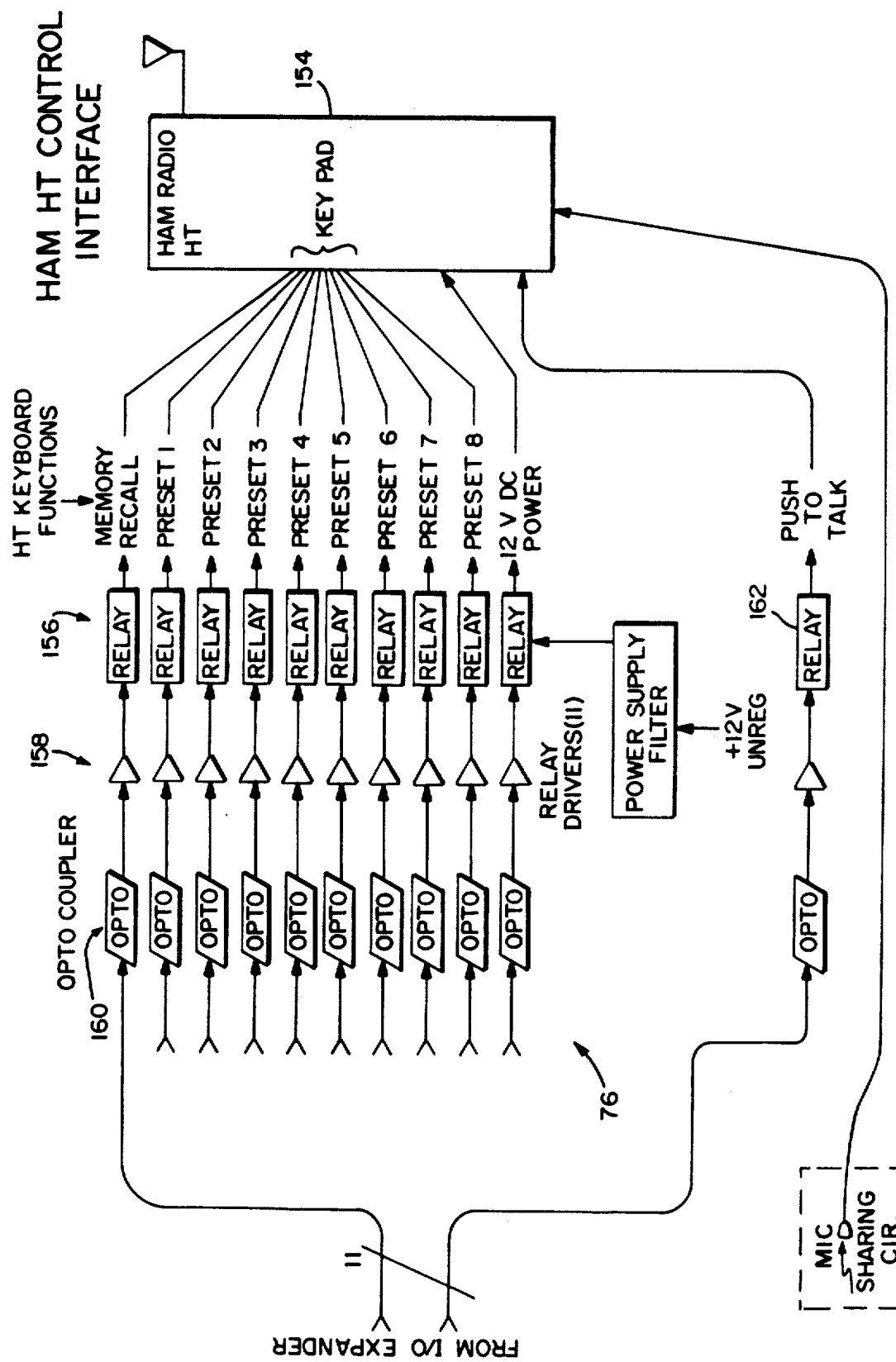

FIG. 6 is a schematic block diagram of amateur radio control interface 76 shown in FIG. 1. Control interface 76 is built around a conventional off-the-shelf Kenwood TR-2600A amateur 2-meter transceiver having various keyboard functions such as memory recall and presettable operating frequencies. Microprocessor 52 controls the keyboard functions of transceiver 154 via a bank of relays of 156 connected by relay drivers 158 and optocouplers 160 to a bus output 92 of I/O expander 64. An additional relay 162 controls the push-to-talk input of transceiver 154 in response to additional control signals provided by microprocessor 52 over bus 92. The amplified microphone input provided by audio sharing circuit 80 is connected to the microphone input of transceiver 154, and the audio output provided by the transceiver is connected to the input of the audio sharing circuit.

FIG. 7 is a schematic block diagram of the BSR control interface 78 shown in FIG. 1. In the preferred embodiment, BSR control interface 78 is built around a conventional BSR X-10 wireless controller 164 and associated BSR appliance modules 166. As well known by those skilled in the art, controller 164 and modules 166 provide a means to control remotely-located conventional appliances via signals distributed over existing house wiring. For example, it is possible to connect a BSR appliance module 166 between a wall outlet and the power cord of a television receiver, and then remotely control that television to turn on and off via signals injected into the house wiring from another location by BSR controller 164. In the preferred embodiment, controller 164 provides on and off control of four different modules 166 in response to control inputs applied to its RS232 input port 164a. Microprocessor 52 provides serial output signals on a serial output line 168 which are buffered by a buffer 170 (see FIG. 1), shifted from TTL to RS232 levels by a conventional level shifter 172, and then applied to controller serial input port 164a. Microprocessor 52 may thus control the on/off states of plural BSR modules 166 (and thus associated corresponding plural appliances) by applying corresponding serial digital signals (in a conventional, standard protocol specified by the manufacturer of controller 164) to BSR interface 78.

FIGS. 8A and 8B together are a schematic block diagram of audio sharing circuit 80 shown in FIG. 1. Referring now to FIG. 8A (the portion of audio sharing circuit 80 which produces and routes audio outputs), the audio outputs produced by control interfaces 66, 72, 74 and 76 in addition to the output produced by speech synthesizer 94 are applied to respective audio isolation transformers 174 (with the exception of the output of speech synthesizer 94 which is capacitively coupled) and amplified/gain adjusted by a bank of conventional operational amplifiers 176. In the preferred embodiment, some of the monaural control interface outputs (e.g., the amateur radio control interface output, the tape recorder control output and the speech synthesizer 94 output, as well as the am/fm stereo control interface 72 "right" stereo channel output) are connected to a right channel operational amplifier mixer 178, while other control interface outputs (e.g., the output from telephone control interface 66 and the "left" output channel from am/fm stereo control interface 72) are inputted to a "left" operational amplifier mixer 180. The allocation of audio outputs to the left and right channels shown in FIG. 8A permit different control interfaces to be used simultaneously without substantial interference with one another. For example, telephone control interface 66 may provide an output on left speaker 82 at the same time as speech synthesizer 94 is providing an output on right speaker 84. Analog switches 182, 184 controlled by microprocessor 52 via I/O expander 64 permits microprocessor to automatically mute the left channel am/fm stereo control interface 72 output whenever it activates the output of telephone control interface 66. Analog attenuators 186a, 186b (conventional off-the-shelf attenuators type AD7111 in the preferred embodiment) provide a selected degree of attenuation to the outputs of mixers 178, 180 in response to digital control signals provided by microprocessor 52 (thus allowing the microprocessor to directly, independently control the volume levels of sound emanating from right speaker 84 and left speaker 82). The outputs of attenuators 186a, 186b are amplified by power amplifiers 188a, 188b, respectively and applied to speakers 84, 82, respectively.

FIG. 8B is a schematic diagram of the input side of shared audio circuit 80. A conventional electret microphone 186 is biased by a bias resistor 190 and provides an output which is amplified by a conventional amplifier 194. The output of op amp 194 is distributed to the inputs of three operational amplifiers 196, 198, 200 in the preferred embodiment. Each of op amps 196-200 has an independent gain adjustment to accommodate different gain level requirements of the control interfaces requiring a microphone input signal. The output of op amp 196 is coupled via a transformer 202 to the microphone input of amateur radio control interface 76, the output of operational amplifier 198 is coupled via a matching transformer 204 to the microphone input of tape recorder interface 74, and the output op amp 202 is coupled via the transformer 206 to the microphone input of telephone control interface 66.

HIERARCHICAL CONTROL STRUCTURE OF THE PREFERRED EMBODIMENT

The hierarchical sequential user interface control structure provided by the system 50 is illustrated schematically in FIGS. 9-15. FIGS. 9-15 are flow chart type diagrams showing the hierarchical sequence of options presented to the user by system 50 in response to operation of input switch 102. At power-up (block 300) system 50 speaks (via speech synthesizer 94) the word "ready" (block 302) and then enters a state in which a "top level" sequence of "root" options are presented to the user. The root option sequence in the preferred embodiment is the "highest" level sequence of options presented to the user, and permits the user to select which one of control interfaces 66, 70, 72, 74, 76, 78 he wishes to control (in addition to also selecting, for some control interfaces, additional options such as BSR channel for BSR interface channel 78 and telephone lines for telephone control interface 66). There is not necessarily a one-to-one correspondence between options provided by the root control sequence in the preferred embodiment and hardware control interfaces of system 50. Rather, the root control sequence presents the user with user-oriented device options (in the preferred embodiment, these options are intercom, telephone line 1, telephone 2, tape recorder, BSR channel 1, BSR channel 2, am/fm radio, amateur radio, BSR device 3, BSR device 4 and mute) and effectively "hides" the specific architecture of system 50 from the user. For example, even though the same telephone control interface 66 is used in the preferred embodiment to control both telephone line 1 and telephone line 2, there are two independent telephone "devices" or "channels" from the user's standpoint.

After system 50 speaks the word "ready", it enters a wait mode 303 in which it waits for the user to operate input switch 102. Any operation of input switch 102 (either "red stick" operation of a joystick in one direction or "yellow stick" operation of the joystick in the other direction, or equivalent red "sip" and yellow "puff" actuation of a sip and puff switch or the like) causes system 50 to leave the wait mode 303 and sequentially present various "device" options to the user. In the preferred embodiment, each device option is announced by speaking a prompt designated the option via speech synthesizer 94. Because of the relatively limited vocabulary provided by synthesizer 94 in the preferred embodiment, the prompts provided by the root sequence in the preferred embodiment are simply number designations. For example, the system speaks the word "one" for the intercom device, speaks the word "two" for telephone line 1, speaks the word "three" for telephone line 2, speaks the word "four" for tape recorder, speaks the word "five" for BSR device 1 (which may control any desired device such as a television receiver), speaks the phrase "six" for BSR device 2 (which may be, for example, a reading lamp, an air conditioner, etc.), and the like. As it becomes economically feasible to obtain speech synthesizers with increased or customizable/programmable vocabulary (e.g., a vocabulary could be programmed via a local area network), more descriptive audio prompts would desirably be provided by system 50 (so that, for example, the system could actually prompt the user to select the intercom "device" with the phrase "intercom" or the like). Audible prompts in other languages could also be provided as desired by substituting speech synthesizers with different capabilities and/or vocabularies.

Once the user starts the root scanning sequence by operating and releasing the input switch 102, system 50 waits a short time delay (this scan time is controlled by the "dip time" parameter specified by setup interface 68 in the preferred embodiment) and then speaks the prompt associated with the first device option 304 (in the preferred embodiment, the first "device" is the intercom and its associated prompt is the phrase "one"). To select the intercom " device", the user must operate the input switch again before an additional time delay has passed and the prompt for the next "device" is spoken at 306. If the user does operate input switch 102 within this scan delay period after being prompted by system 50 with the audible phrase corresponding to the intercom "device", system 50 enters the intercom mode 308. Similarly, if the user wants to access the telephone line 1 "device", he simply waits until he hears the audible prompt "two" corresponding to telephone line 1 and then operates input switch 102 (either red stick or yellow stick) before the next prompt is spoken to cause system 50 to operate in the telephone line 1 mode 310. If the user continues to not operate the switch 102, on the other hand, system 50 continues to scan through select option prompts 312, 316, 320, 324, 328, 332 and 336 (although ten user prompts are included in the root control sequence of the present invention, any desired number of prompts can be provided)—and finally, if the user has made no selection by the time system 50 reaches the "end" of the root control sequence, system 50 generates a "beep" and returns to wait mode 303 for another input.

As has been explained, to enter a desired " device" control mode from the root sequence, the user need only operate his input switch 102 within a certain time window after the prompt corresponding to the "device" is spoken and before the prompt corresponding to the next "device" is spoken. This sequential scanning operation allows the user to select any desired one of any number of options presented by the root control sequence simply by operating input switch 102 in synchronism with the time system 50 presents (announces) the option to the user.

Figure 10:
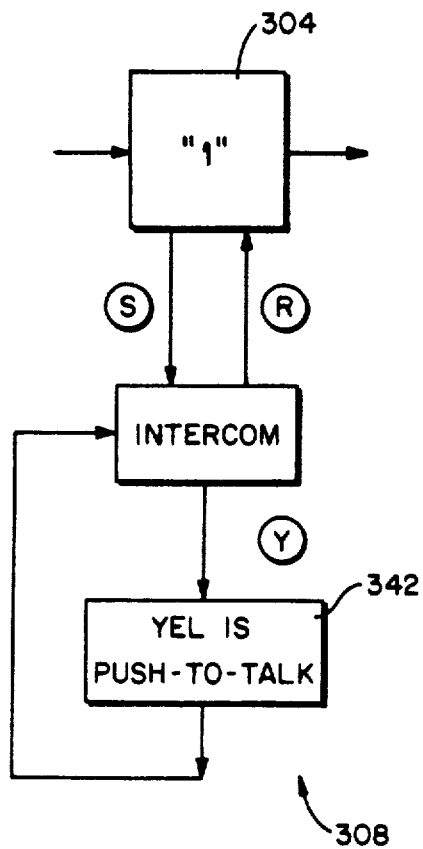

In response to selection by the user of a "device" mode, system 50 enters a lower level control sequence corresponding to the selected device. For example, FIG. 10 schematically shows the control sequence for the intercom function. In the preferred embodiment, the intercom function provides the user with only two options: return to the root sequence (by operating input switch 102 such as the "red" contacts are closed—referred to herein as a "red stick"); or to control intercom interface 70 to actuate the "talk" function of the intercom (in the preferred embodiment, by operating input switch 102 such that the "yellow" contacts are closed, referred to herein as a "yellow stick"). In the preferred embodiment, system 50 continues to operate in the intercom control sequence until the user provides a red stick. That is, once the user selects the intercom function from the root control sequence, system 50 continues to provide an intercom control function, operates the intercom in the "talk" mode in response to a yellow stick, and releases the intercom into the "listen" mode in response to release of yellow stick. System 50 will remain in the intercom control sequence shown in FIG. 10 indefinitely—until the user provides a red stick to exit the intercom control sequence and cause system 50 to return to the root control sequence shown in FIG. 9. The preferred embodiment may provide an auto time or function which returns the user to the next sequence if the user has not operated switch 102 for a certain time period.

As mentioned before, one of the options specified by setup interface 68 is to control whether the intercom yellow stick push-to-talk switching is latched or unlatched. If setup interface 68 specifies a latched mode of operation, then the intercom control sequence shown in FIG. 10 is modified so that a first yellow stick is required to place the intercom into the "talk" mode and the intercom remains in the "talk" until the user provides another yellow stick. This operation mode facilitates operation by, for example, "sip and puff" type switches.

Figure 11:
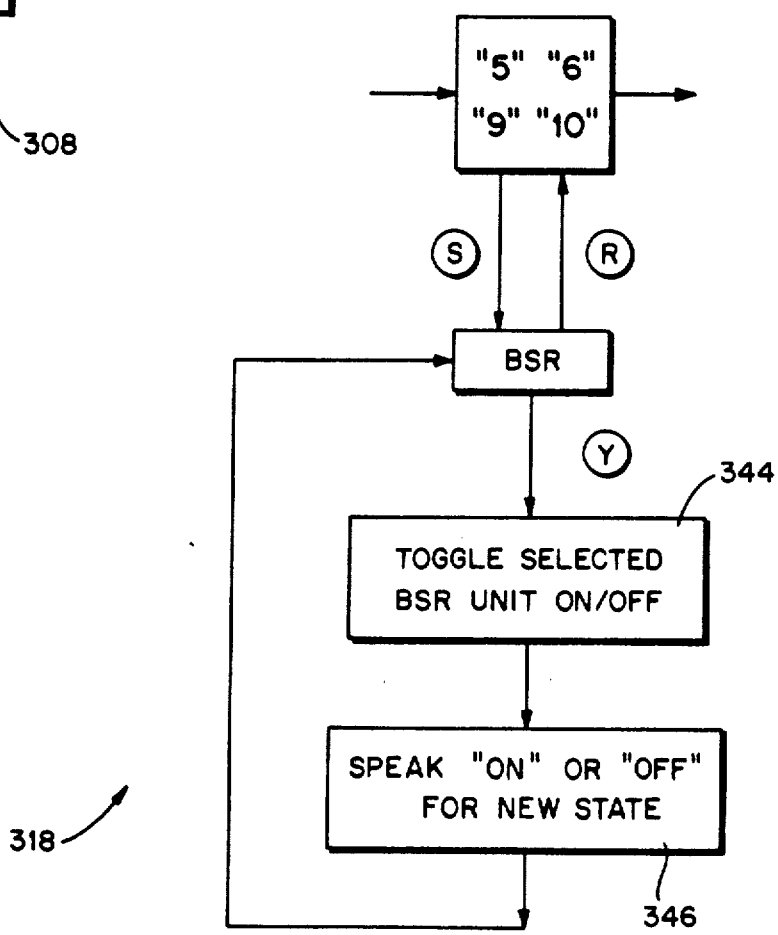

FIG. 11 schematically shows the control sequence provided by system 50 for BSR "devices" 1, 2, 3 and 4 (access via root control sequence prompts 316, 320, 334 and 338, respectively). BSR control sequence shown in FIG. 11 provides a "toggle" function for the BSR device selected by the user. For example, upon entering the FIG. 11 BSR control function from root sequence prompt 316, the preferred embodiment changes the state of BSR device 1 in response to a yellow stick provided by the user. If the appliance connected to the BSR module 166 assigned to device 1 is "off", a yellow stick will turn the appliance "on" (block 344) and system 50 will then speak an indicator "on" corresponding to the new on state of the BSR device. If the user again provides a yellow stick, block 344 toggles the state of BSR device 1 once again to turn the appliance "off" and block 346 speaks the word "off". If the appliance connected to BSR device 1 was on when the user entered the FIG. 11 BSR control sequence, the initial depression of yellow stick would turn the device "off" at block 344. Any time the user provides a red stick while system 50 provides BSR control sequence causes the system to return to the FIG. 9 root control sequence.

In accordance with one feature of the present invention, the root control sequence shown in FIG. 9 need not always begin at first prompt 304. Suppose, for example, that the user had previously selected the BSR control shown in FIG. 11, and then provided a red stick to return to the root control sequence. Rather than reverting to FIG. 9 block 303 and generating the prompt "one" from block 304 corresponding to the intercom function, system 50 instead would enter a wait for input mode like 303 just before prompt block 316 (corresponding to the control sequence just exited). The next time the user operated input switch 102, the first prompt to be provided by system 50 would be at FIG. 9 block 316 (in the preferred embodiment, the phrase "five") and not that provided by block 304. This allows the user to exit any lower level control sequence and then rapidly return to that lower level control sequence last exited without waiting for a system 50 to scan the entire root sequence from beginning to end. This important feature has certain advantages. One advantage is that the time it takes for system 50 to scan through the entire root sequence may be relatively long, and requiring the user to wait while the entire root control sequence is scanned may be unnecessary. Suppose, for example, that the user accidentally provides a red stick and did not actually wish to leave the lower level control sequence the system was operating in. Because system 50 waits for input in the root sequence immediately before the prompt for a function from which the user last exited, the user can immediately reenter the accidentally-exited function by operating input switch 102 twice in rapid succession (the first operation of the input switch begins the scanning sequence, and the second operation of the input switch selects the first function selection provided by the scanning sequence—in this case the accidentally exited function). Moreover, the preferred embodiment permits the user to select the first option before system 50 provides a prompt. Specifically, system 50 calls a subroutine of a list of items to be selected which is used throughout every time a list of items is presented to the user, (not just in the root menu). A feature of this subroutine is that the user has twice the time to "hit" the first item in its list then the line provided to "hit" the second through last items. This double time is the time (one diptime) before the item is spoken and the time (1 diptime) after the word is spoken in the preferred embodiment one subroutine accepts either red or yellow stick for input, the caller routine determines if it was acceptable. This subroutine will be discussed in much greater detail in connection with FIG. 22.

For example, if the user had accidentally exited, for example, the BSR control feature shown in FIG. 11 by accidentally providing a red stick, the user could immediately return to the BSR control option by operating input switch 102 twice in rapid succession without waiting for system 50 to provide the prompt of block 316. On the other hand, if the user does not remember which option he last exited, he can operate input switch 102, wait for the first prompt provided by system 50 (which corresponds to the last stick function the user exited) and then operate input switch again to re-select that option. This user interface feature greatly aids the user in "navigating" through the hierarchical control sequence structure provided by system 50 —since if the user ever gets "lost" and does not know what function he has activated, he can simply provide red stick to "backup" into the next higher level function, operate the input switch 102 again to cause system 50 to generate a prompt corresponding to the option just exited, and then operate the input switch a third time to reenter that option.

In the preferred embodiment, a red stick always controls system 50 to "backup" to the next highest level in the hierarchical control sequence structure (except in the root sequence, which is the "highest level")—and eventually to backup to the root sequence. This co-insistency in the significance attached by system 50 to red stick also facilitates user navigation through the hierarchical control sequence. Similarly, yellow stick generally assigned to activate control functions (e.g., activate a device or a device function) in the preferred embodiment. In many cases, (e.g., during scanning of the root control sequence), either red stick or yellow stick can be used to select an option—further eliminating user confusion and frustration and making it much easier to select options.

Figure 12:
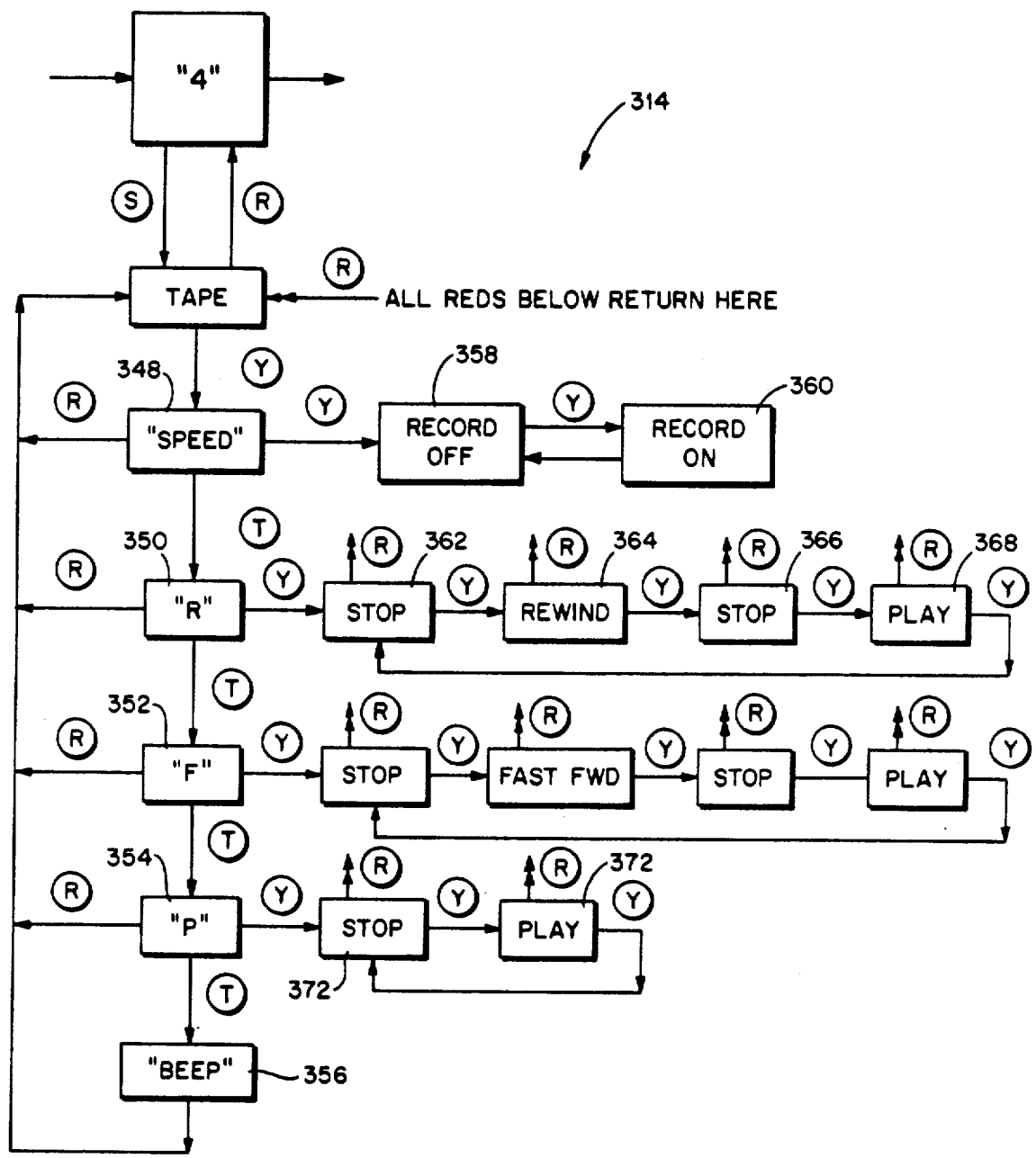

Turning now to a further discussion of specific option control sequences provided by the preferred embodiment, FIG. 12 is a schematic diagram of the tape control sequence enabled by operating input switch 102 after the "four" prompt provided by FIG. 9 block 312 is spoken. The FIG. 12 control sequence is considerably more complex than either of the control sequences shown in FIGS. 10 and 11, since it includes nested suboption control sequences. The preferred embodiment provides the capability to nest control sequences in a hierarchical manner to any desired depth. FIG. 12, for example, provides a tape recorder option control sequence including the options record on/off (provided by prompt "speed" at block 34B), the rewind function (provided by prompt "r" at block 350), the fast forward option (provided by the prompt "F"O, the play option (provided by block "P" 354). In the preferred embodiment, however, none of these four options record on/off, rewind, fast forward or play actually controls tape recorder 148. Rather, each of these options permits the user to select further sub-options, these further sub-options controlling the tape recorder state. For example, if upon entering the tape control sequence shown in FIG. 12, the user provides yellow stick, system 50 scans through the tape control sequence (and thus blocks 348, 350, 352, 354), and if no user selection occurs by the end of the scan, prompts with a tone at block 356 and waits for further user input. If the user provides another actuation input switch 102 (either red or yellow) during this scan, system 50 selects the sub-options associated with the selection. For example, if the user operates input switch 102 after system 50 provides the prompt "speed" and before the system provides the next prompt "R" (block 350), system 50 enters the sub-option control sequence shown in blocks 358, 360. In response to a yellow stick, the record option of tape recorder 148 is toggled so that if the tape recorder was in the "play" mode before the yellow stick, it enters the record mode, and if it was in the record mode before the yellow stick, it enters the "play" mode.

In the preferred embodiment, system 50 (e.g., at "wait" block 374 shown in FIG. 13), the user is presented with a telephone sequence of prompts beginning with the prompt "check", followed by prompts for the numbers "one"-"zero", followed by prompts for "star", "pound", "wait"—and if no user selection is made by that time, a "beep" and return to wait block 374. These prompt blocks 376(a)–376(n) constitute a relatively long sub-option scannable control sequence which permits the user to select characters to be stored for later dialing over the telephone line. The prompt "check" provided at block 376(a) provides an option which, if selected by the user (by operating input switch 102), causes system 50 to speak previously entered telephone digits. Thus, the user may assemble a telephone number off line (e.g., by selecting digits or other characters presented by others of prompt blocks 376 in which numbers are stored in the memory of microprocessor 52). Upon selecting the "check" sub-option control sequence prompt, system 50 repeats back to the user (via speech synthesizer 94) the string of numbers previously entered. This "check" sub-option allows the user to check and verify a previously entered string of telephone numbers before he uses it to dial the telephone—thus minimizing the possibility that the user will be embarrassed by having dialed an incorrect telephone number and also providing positive feedback to the user that the correct telephone number has and will in fact been dialed. Once a string of digits has been stored in microprocessor 52 memory, this string remains in the memory until the user writes over it by later selecting one of digit prompts 376(b)–376(n)-1). Thus, if a user assembles a telephone number off-line and dials it only to discover the person he is trying to reach is not at home, the user can leave the telephone option control sequence entirely (by providing several red sticks) and go on to do other things (e.g., activate the stereo radio, watch television, etc.). Later, the user can reaccess the telephone option control sequence, select via a short yellow the off-line number assembly sub-option control sequence, and if desired, select the "check" function to read the previously stored number back to him. If this number is the desired number the user wishes to call (as if the user remembers which number was last stored), the user may then provide a long yellow stick from wait block 374 the effect of which is to take the telephone "off-hook" (block 378). Because the amount of time required by telephone exchanges to provide a dial tone differs from one exchange to another, in the preferred embodiment the user continues to depress yellow stick until he hears a dial tone emanating from the speaker of audio sharing circuit 80 and then releases yellow stick. Upon release of yellow stick (block 380) system 50 converts the string of telephone numbers stored in microprocessor 52 memory into DTMF tones (via I/O expander 62, decoder 106, and opto-isolators 108 and DTMF encoder 110 shown in FIG. 2) which go out over the telephone line.

The special symbols appearing on a telephone touch-tone keypad "*" and "#" are included in the sub-option control sequence 370 to permit the user to access special services requiring these special DTMF tones. For example, advanced digital telephone exchanges allow the user to store and access speed dialing numbers using the "*" and "#" tone pairs. Moreover, some internal telephone exchanges (e.g., the PBX of a large company) may require the user to key in one or more of these special symbols to access special options (e.g., read back a current bank account balance, or the like). The preferred embodiment permits the user to dial via system 50 any tones he could dial by operating a standard touch-tone operating tone keypad.

The preferred embodiment also provides a "wait" delay character to adjust for dialing delays. For example, the user may wish to access a telephone network which requires him to dial a first 7-digit number, wait for an access code, and dial a further number. This wait delay might be used for this type of dialing.

The preferred embodiment also permits the user to dial the telephone number "on the fly" via a further sub-option control sequence 380 also shown in FIG. 13. If the user takes the telephone off hook (e.g., by providing a long yellow upon first entering the telephone option sequence), and then provides another yellow stick, system 50 assumes the user wants to dial a telephone number "on the fly" and begins scanning through the on-line number sub-option control sequence 380 to permit the user to select the first digit to be dialed. The user may repeat scanning through this sub-option control sequence 380 as many times as necessary to dial any length of telephone number. One disadvantage of "on the fly" telephone number dialing, however, is that some telephone exchanges require a complete number to be dialed within a certain time period (or at least require that no more than a certain time delay occurs between consecutively dialed digits), and some handicapped users may not be dexterious enough or for other reasons may not be able to select the digits to be dialed rapidly enough. For this reason (and also to avoid the necessity of reentering commonly used telephone numbers each time they are to be dialed), the preferred embodiment of the present invention provides the off-line number assembly sub-option control sequence 370 described above.

FIGS. 14 and 15 schematically show the option control sequences corresponding to am/fm radio and the amateur radio 350, respectively. These sub-option control sequences are relatively similar with the exception that the amateur radio sub-option control sequence also provides a push-to-talk feature not required by the am/fm radio. In addition, the am/fm radio option control sequence 326 actuates certain controls in the am/fm stereo radio 72 for as long a period as the yellow stick is depressed (block 390) to allow the user to program the am/fm radio by himself (e.g., by actuating the scan or seek function until a desired radio station has been tuned to, and then selecting the preset control for a long enough period to result in programming the preset control with the new frequency). While this particular programming sequence is somewhat specific to the particular am/fm stereo radio 72 used in the preferred embodiment, other similar arrangements could be adapted for other types of radios.

EXEMPLARY PROGRAM CONTROL STEPS

Figure 26A:
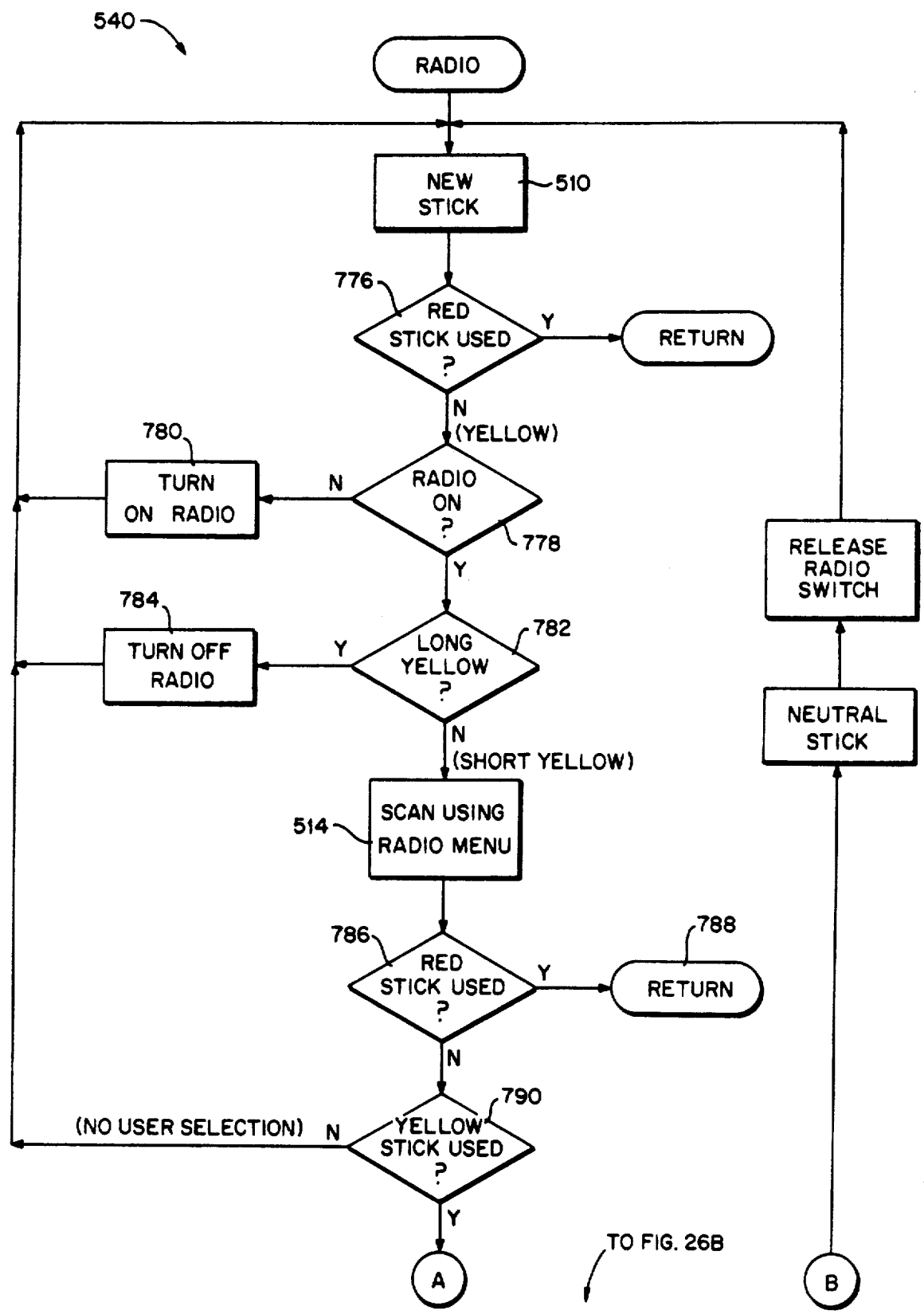
Figure 26B:
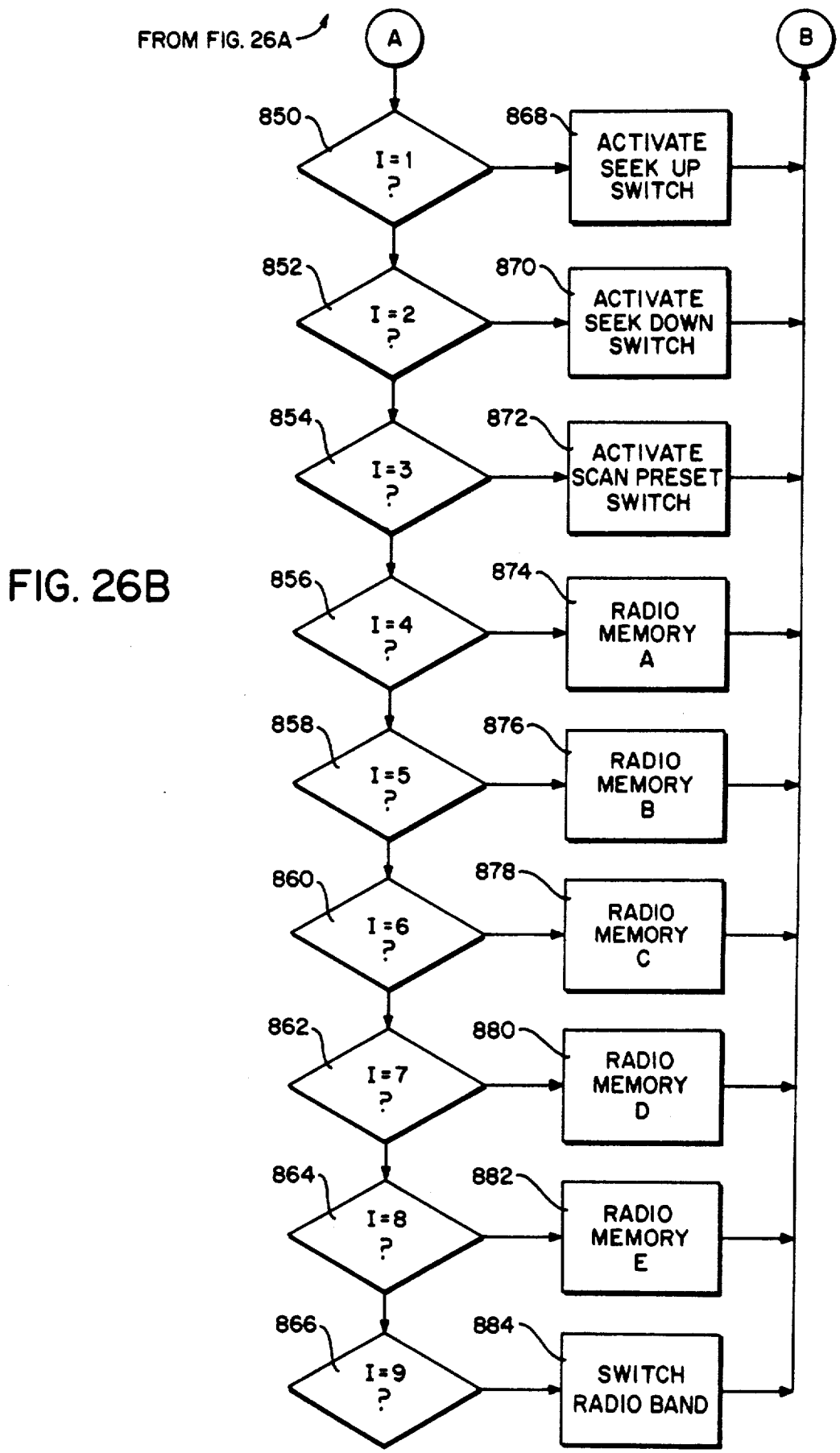
Figure 26C:
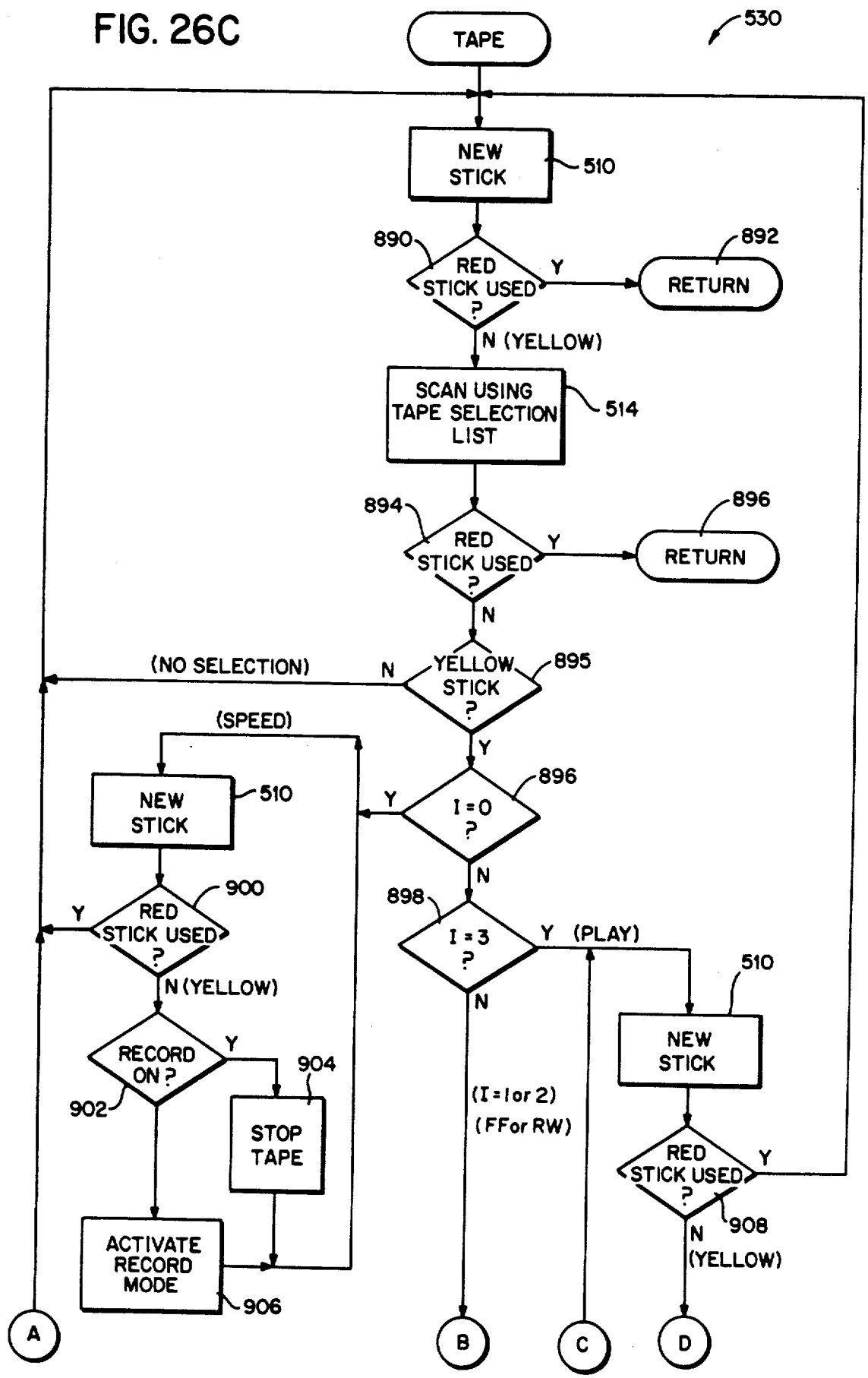
Figure 26D:
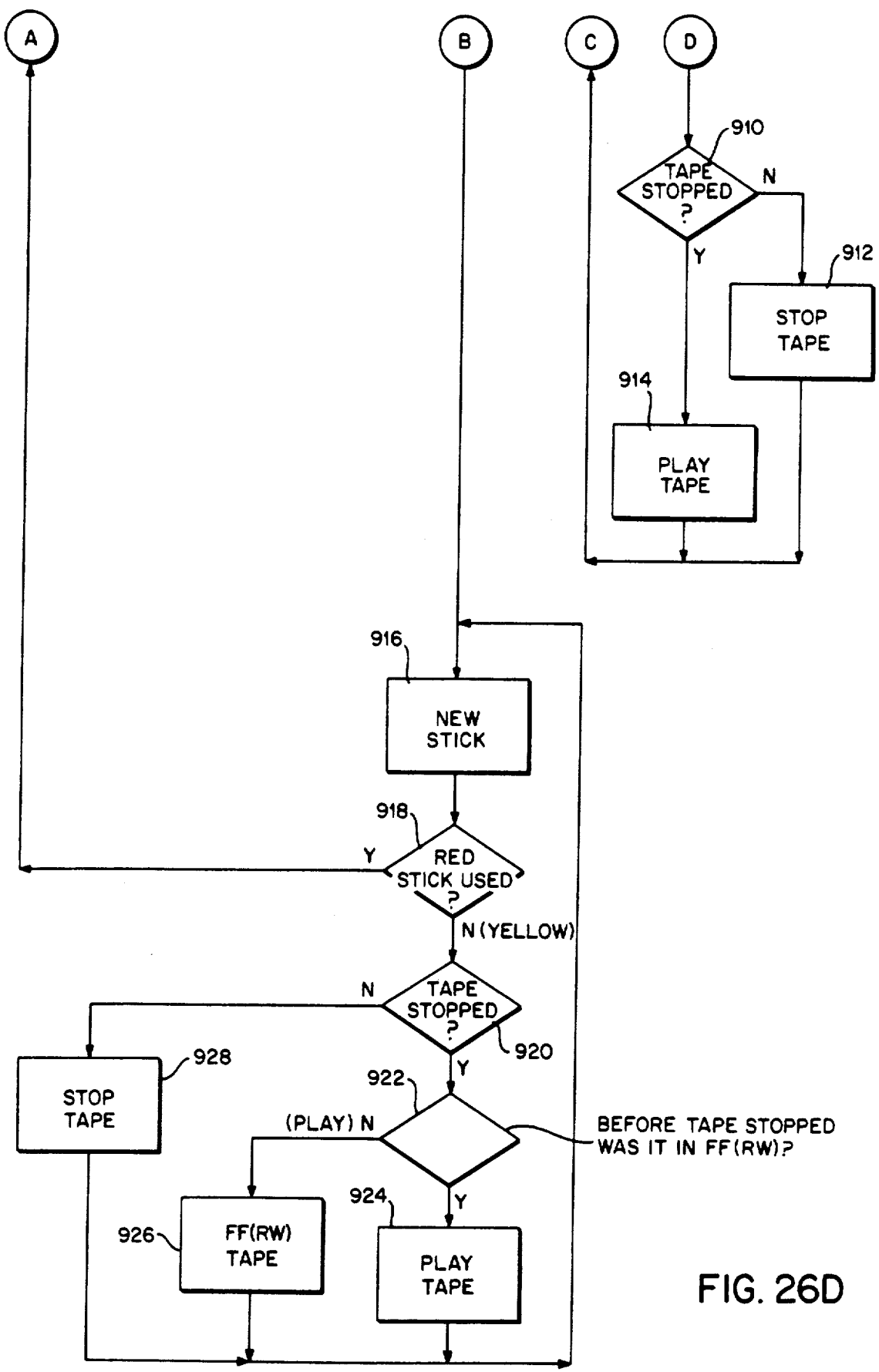
Figure 27A:
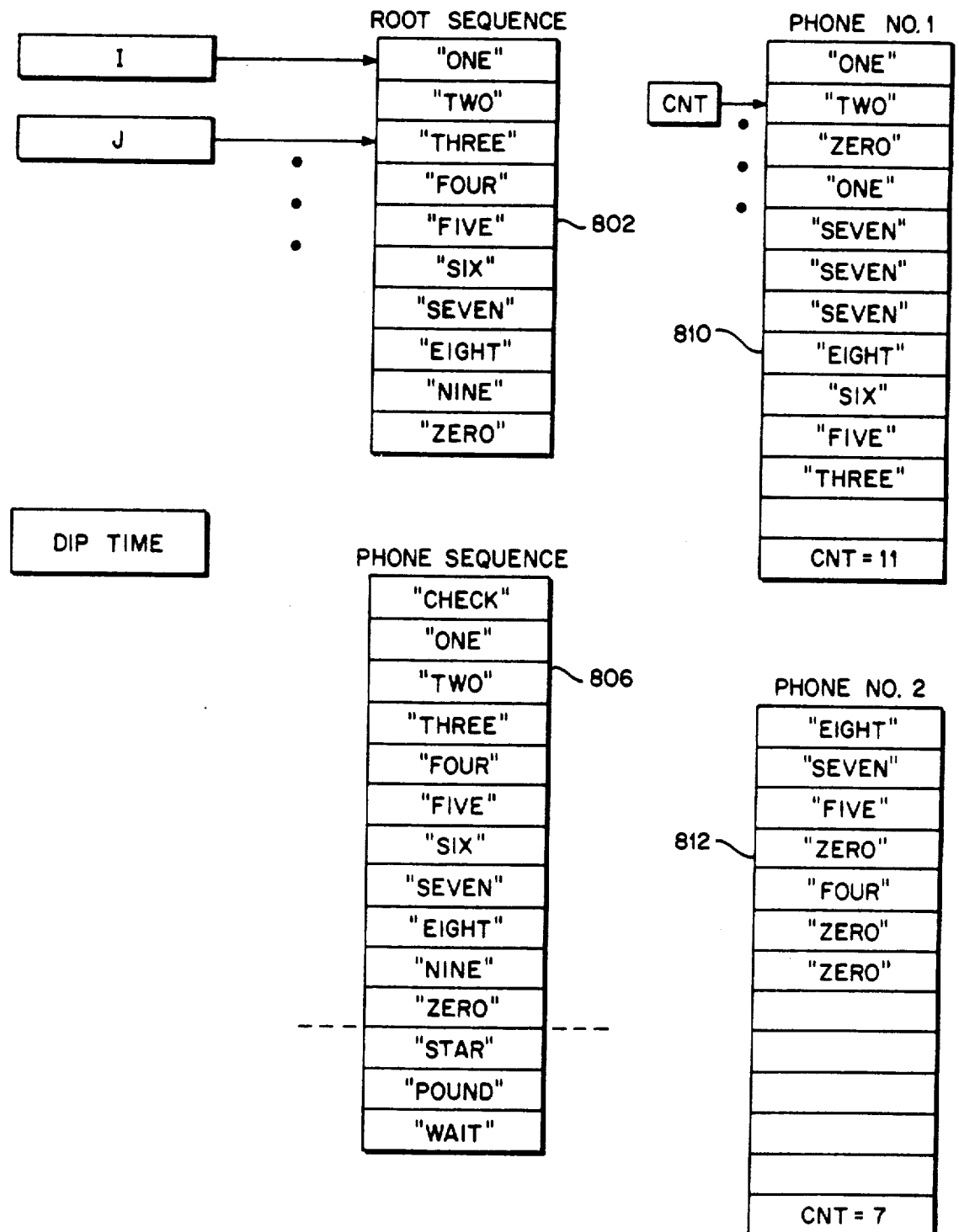
FIGS. 27A and 27B are together a schematic diagram of exemplary data structures maintained by the system shown in FIG. 1.
Figure 27B:
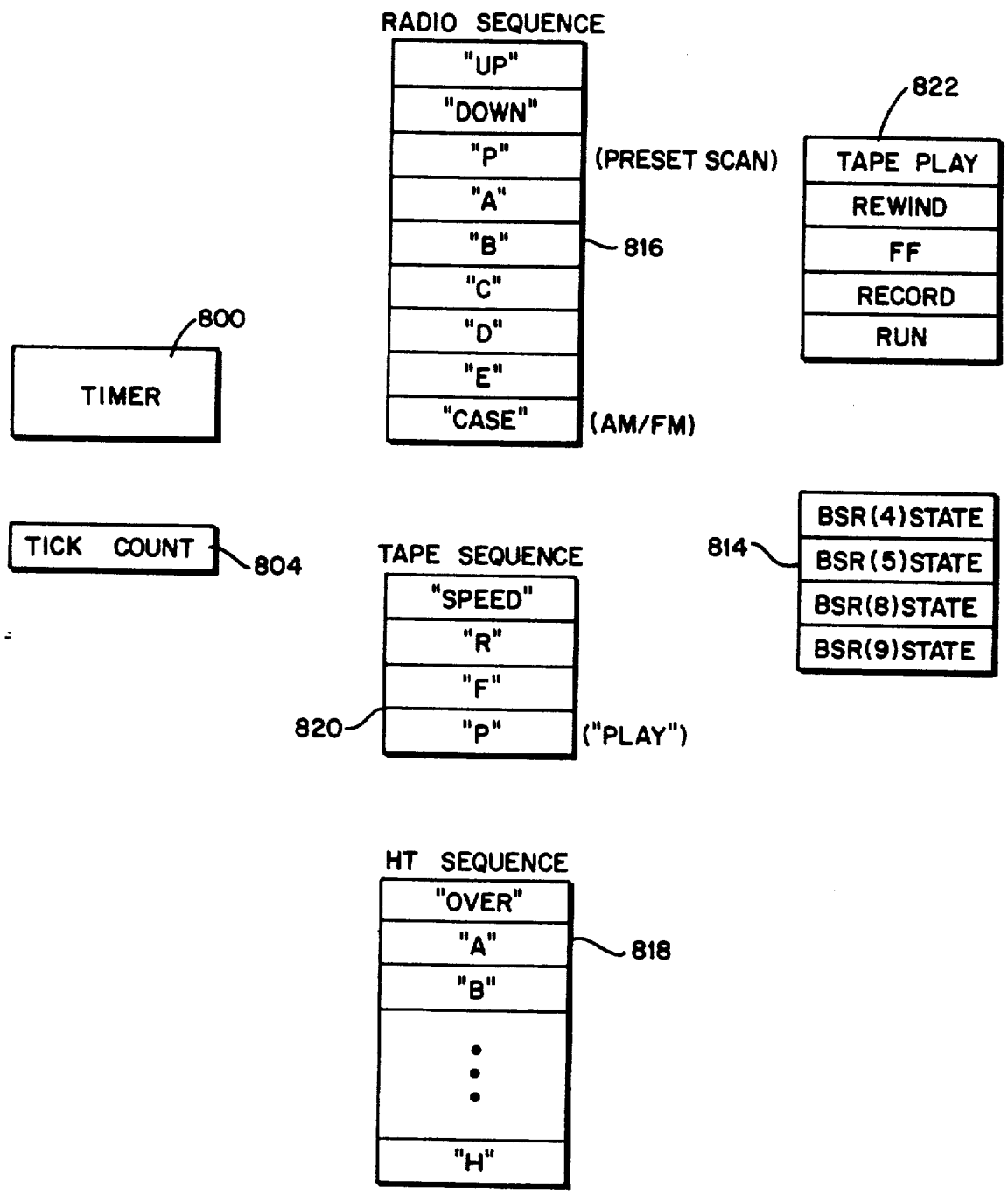

FIGS. 16A–26D are flow charts of exemplary program control steps performed by microprocessor 52 in the preferred embodiment, and FIGS. 27A and 27B schematically show data structures maintained by the microprocessor in its internal random access memory and/or stored in read only memory 60. While FIGS. 9–15 describe the user interface in terms of flow, FIGS. 16A–26D describe exemplary program control steps performed by microprocessor 52 in the preferred embodiment to provide that user interface flow and associated control options. Program control instructions representing the exemplary program control shown in FIGS. 16-26 are stored in program store 60 and are accessed by microprocessor 52 in a conventional manner via address latch 58 and shared address/databus 56 and address bus 54.

Figure 16A:
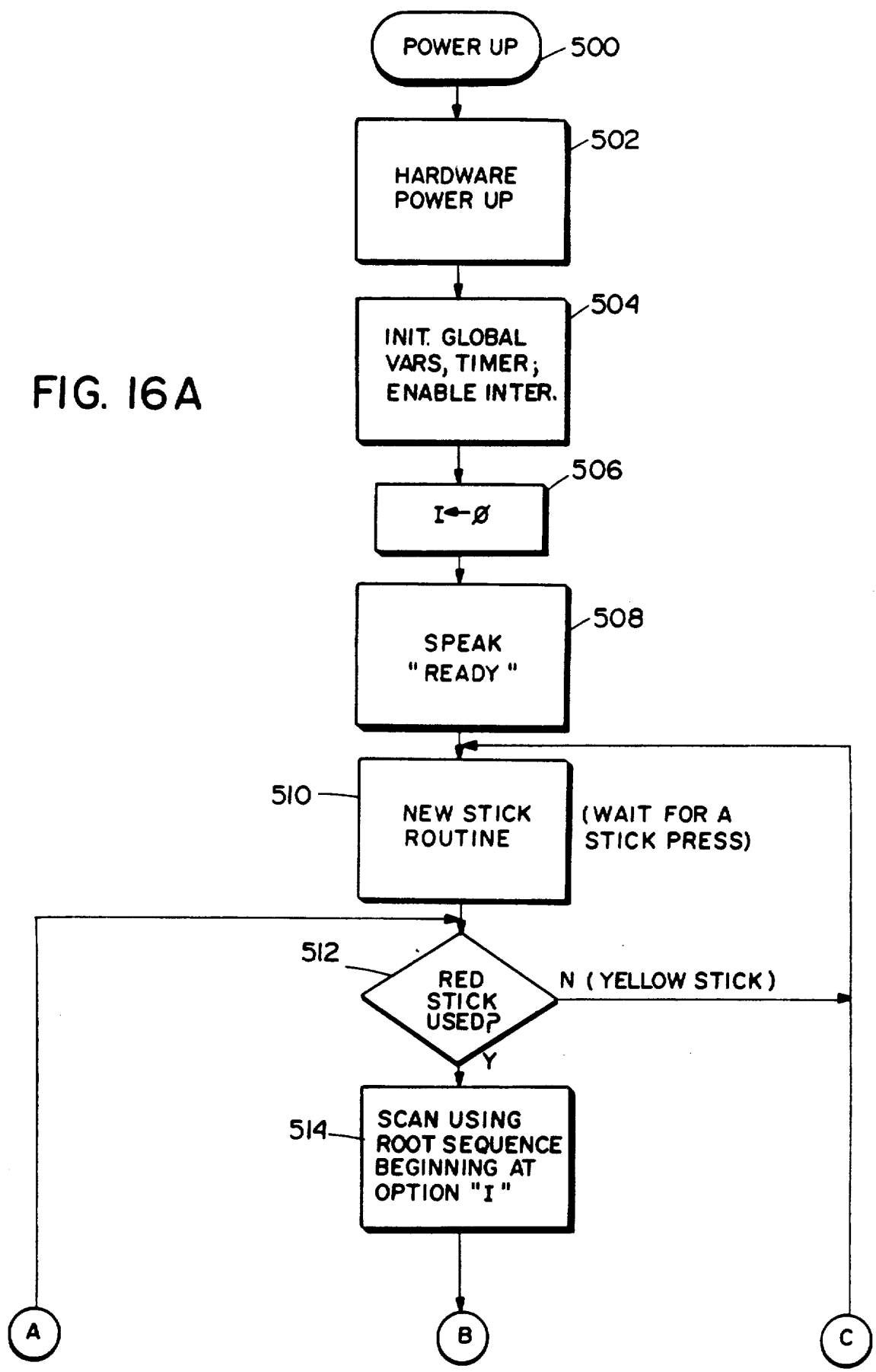
Figure 16B:
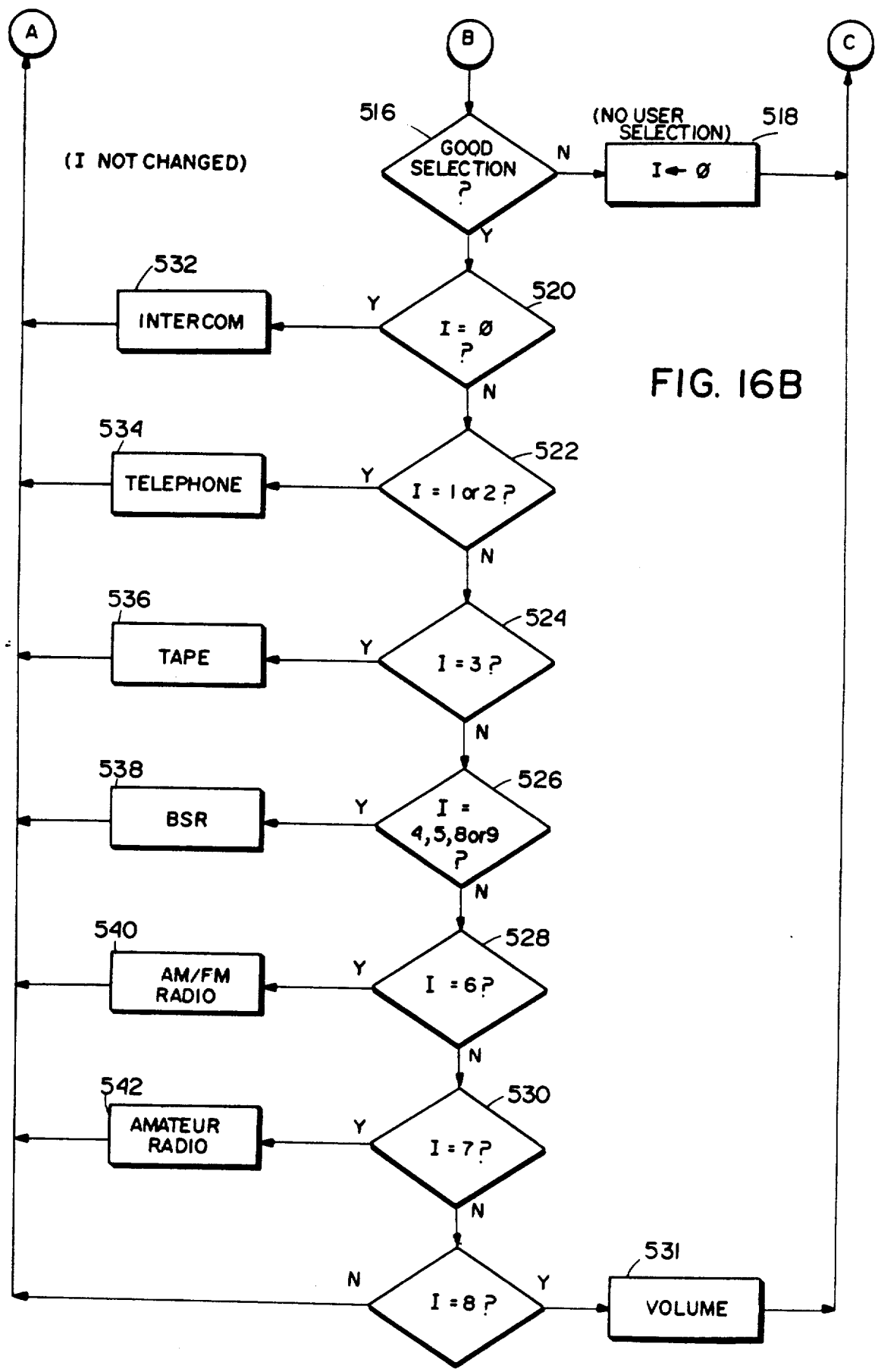

FIGS. 16A and 16B are together a flow chart of the main routine performed by microprocessor 50 in the preferred embodiment. The exemplary program control steps shown in FIGS. 16A and 16B largely correspond to an implementation of the root control sequence shown in FIG. 9. Upon power-up of system 50 (block 500), microprocessor 52 performs a conventional hardware-type power-up routine 502, and then initializes certain global variables, memory locations and a hardware timer 800 shown in FIGS. 27A and 27B. Hardware timer 800 is the conventional hardware timer provided by the type 8031 microprocessor (used for microprocessor 52 in the preferred embodiment), and permits the microprocessor to time the duration of certain events (such as the time between scan options, the length of time the user has provided yellow stick, and the like). Interrupts are then enabled (block 504), and a state counter I is initialized to zero (block 506). State counter I is used in the preferred embodiment to index the current option control sequence selections—and thus provides the ability to scan through control sequences as well as the capability to remember the last selected control sequence option.

After initializing state variable I, microprocessor 52 controls speech synthesizer 94 to speak the phrase "ready" (block 50B) and then cause a routine called "new stick" to wait for the user to operate input control 102 (block 510). A more detailed description of the new stick and other input handling routines will be provided shortly.

Once routine 510 detects that the user has operated input switch 102, decision block 510 determines (based upon information provided to it by the new stick routine 510) whether the user depressed a yellow stick or a red stick. In the preferred embodiment, decision block 512 may require the user to depress a red stick in order to begin scanning the root control sequence—although it may alternately be desirable to eliminate decision block 512 altogether and allow scanning to begin in response to depression of either red stick or yellow stick. In any event, once the user operates input switch 102 in the proper manner to begin scanning the root control sequence, a routine called "select" is called which actually performs root control sequence scanning based upon the current value of the state variable I and by accessing a root sequence data structure 802 shown in FIGS. 27A and 27B (block 514). Routine 514 will be described in greater detail shortly in connection with FIG. 22. Select scan routine block 514 returns with an indication of whether the user made a selection or simply permitted the entire control sequence to be scanned without operating input switch 102. If no good selection was made (decision block 516), state variable I is reset to zero (block 518) and control returns to block 510 to wait for another depression switch 102. On the other hand, if a good selection was made (the "yes" exit of decision block 516), decision blocks 520, 530 determine which option from the root sequence the user selected. If the user selected the first option (decision block 520 corresponding to the audible prompt "one"), a routine called intercom (block 532) is called. If the user selected either the second or third option (corresponding to audible prompts "two" or "three"), a routine called telephone (block 534) is called. If the fourth option (corresponding to audible prompt "four") was selected by the user, a tape routine (block 536) is called. Similarly, the BSR routine 538, the am/fm radio routine block 540, the amateur radio routine block 542 and the volume routine (block 531) are called in response to other selections from the root control sequence scan performed by block 514. Upon return from any of routine 532-542 (e.g., via red stick), control returns to scan block 514 without resetting the value of state variable I—so that upon next entering scan routine 514, the first option announced to the user corresponds to the routine he most recently exited.

Figure 17:
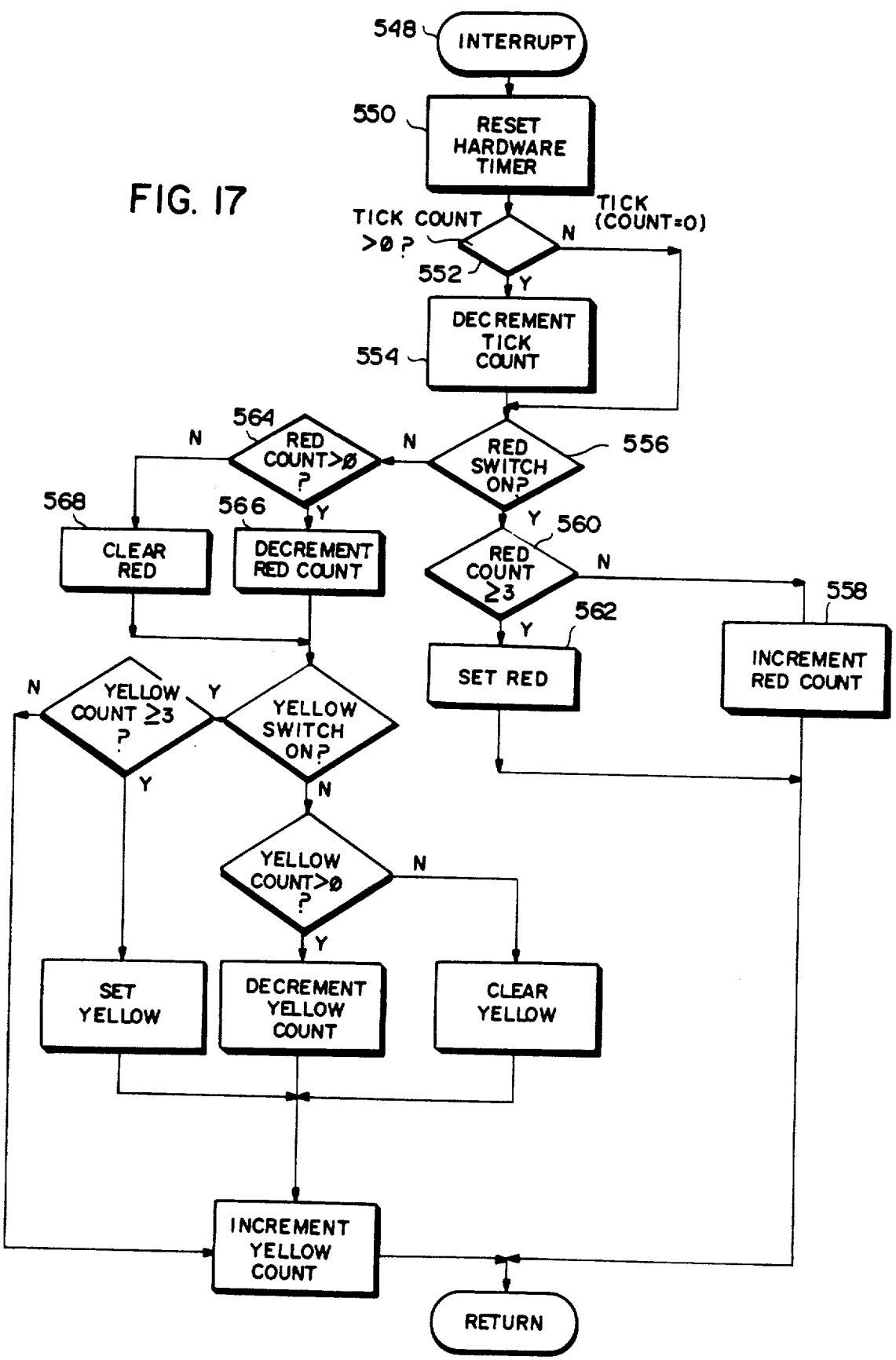

FIG. 17 is a flow chart of exemplary program control step performed by an interrupt routine which executes fifty times every second in response to interrupts generated by decrementing hardware timer 800. As will be understood by those skilled in the arts, hardware timer 800 may be decremented automatically by microprocessor 52 for every clock "tick" (i.e., processor cycle) and may generate an interrupt (block 548) whenever it is decremented to zero. The FIG. 17 routine is called every time this interrupt occurs. The first thing the interrupt routine does is to reset the hardware timer (block 550) in preparation for the next interrupt. The interrupt routine then checks the value of a software variable tick count 804—which is used in the preferred embodiment to count the number of interrupts that have occurred since a specific time (and thus permits system 50 to time variable delays). If tick count 804 is greater than zero (decision block 552), tick count is decremented by one (block 554). The FIG. 17 interrupt routine then determines whether the red stick contacts of input sticks 102 are closed by reading the value present at the input port to which those contacts are connected (decision block 556). FIG. 17 interrupt routine then performs exemplary program control steps which "debounce" the red stick so that actuations of very short duration are entirely ignored. In particular, a counter called red count is incremented by block 558 when red stick is first depressed and is continually incremented for each successive calling of the interrupt routine until red count exceeds a certain value (e.g., three, as tested by decision block 560). When red count exceeds this certain value (indicating that red stick has been depressed for more than a minimal time period), a flag called red is set (block 562) to indicate to the FIGS. 16A and 16B routine and the other routines that had called that red stick is present. Decision block 564 and associated blocks 566, 568 result in clearing the flag RED only after the red stick has been released for more than a minimal time period (e.g., three clock "tricks"). The remaining blocks shown in FIG. 17 perform the same type of debounce operation independently for yellow stick.

Figure 18:
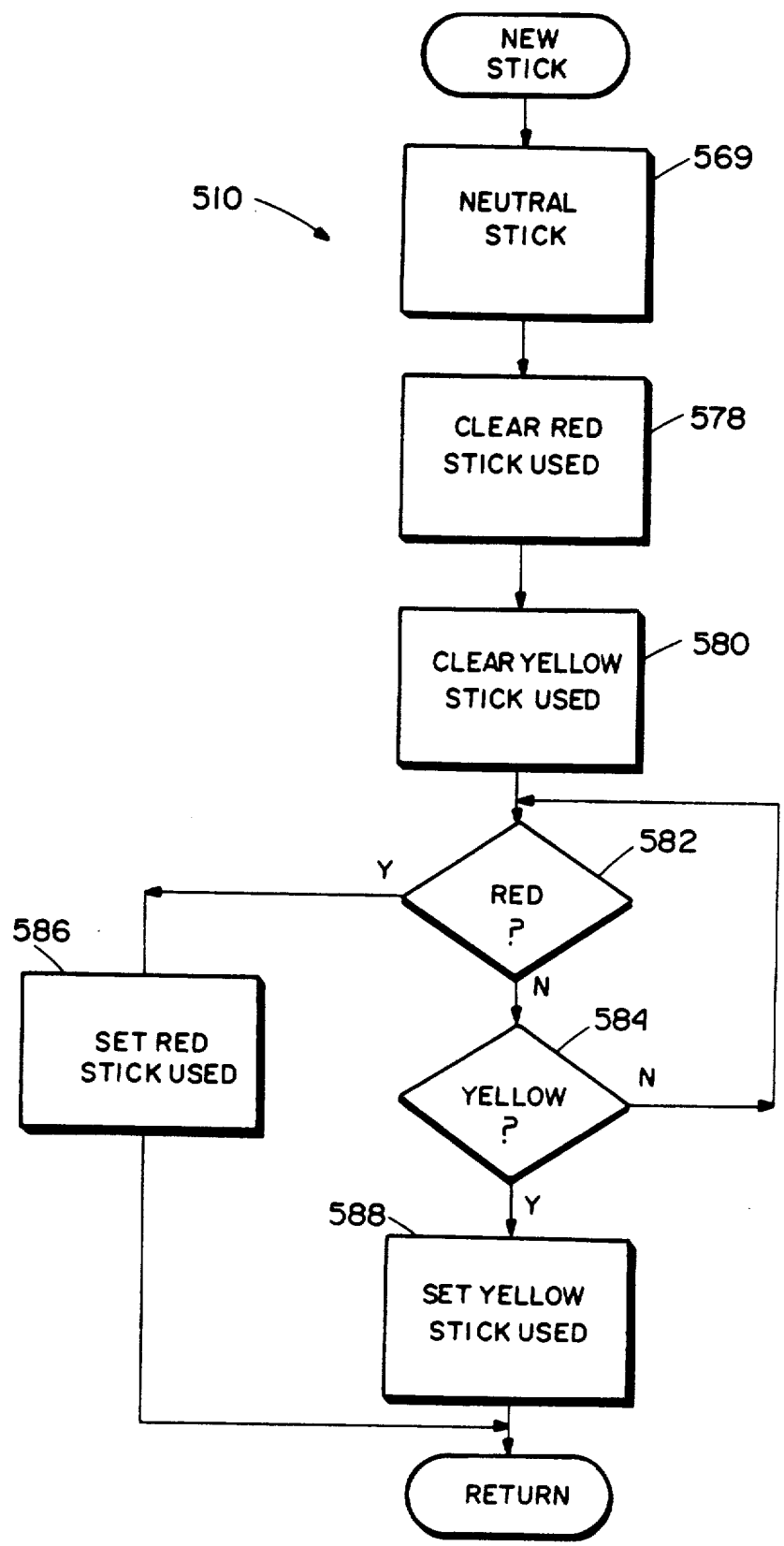

FIG. 18 is a flow chart of exemplary program control steps contained in the "new stick" routine 510 shown in FIGS. 16A and 16B. New stick routine 510 first calls a routine called neutral stick shown in FIG. 19. The FIG. 19 neutral stick routine waits for release of input switch 102 by testing the red and yellow flags provided by the FIG. 17 interrupt routine (decision blocks 570, 572) and waiting until both flags have been cleared. In addition, the FIG. 19 neutral stick routine may entirely disable input switch 102 (e.g., select an alternate input switch or ignore further operations of the input switch) if more than a predetermined relatively long period of time passes while red or yellow stick remains depressed (decision blocks 574, 576). Joysticks of the type commonly used to permit handicapped people to control electronic devices sometimes become jammed and may not be capable of being unjammed by the handicapped users without assistance from someone else. Blocks 574, 576 prevent jamming of red stick or yellow stick from locking up system 50.

Referring once again to FIG. 18, once the FIG. 19 neutral stick routine indicates that input switch 102 has been released, the new stick routine 510 clears two flags called red stick used and yellow stick used (block 578, 580) and then waits for the FIG. 17 interrupt routine to set the red or yellow flags indicating that red stick or yellow stick has been depressed (blocks 582, 584). If the FIG. 17 interrupt routine sets the red flag, new stick routine sets the flag red stick used (block 586). Similarly, if the interrupt routine shown in FIG. 17 returned the flag yellow, new stick routine 510 sets flag called yellow stick used (block 588). The flags red stick used and yellow stick used may be tested by the routine which called routine new stick 510 (e.g., shown in FIGS. 16A and 16B) to determine which stick—red stick or yellow stick—was depressed.

Figure 21:
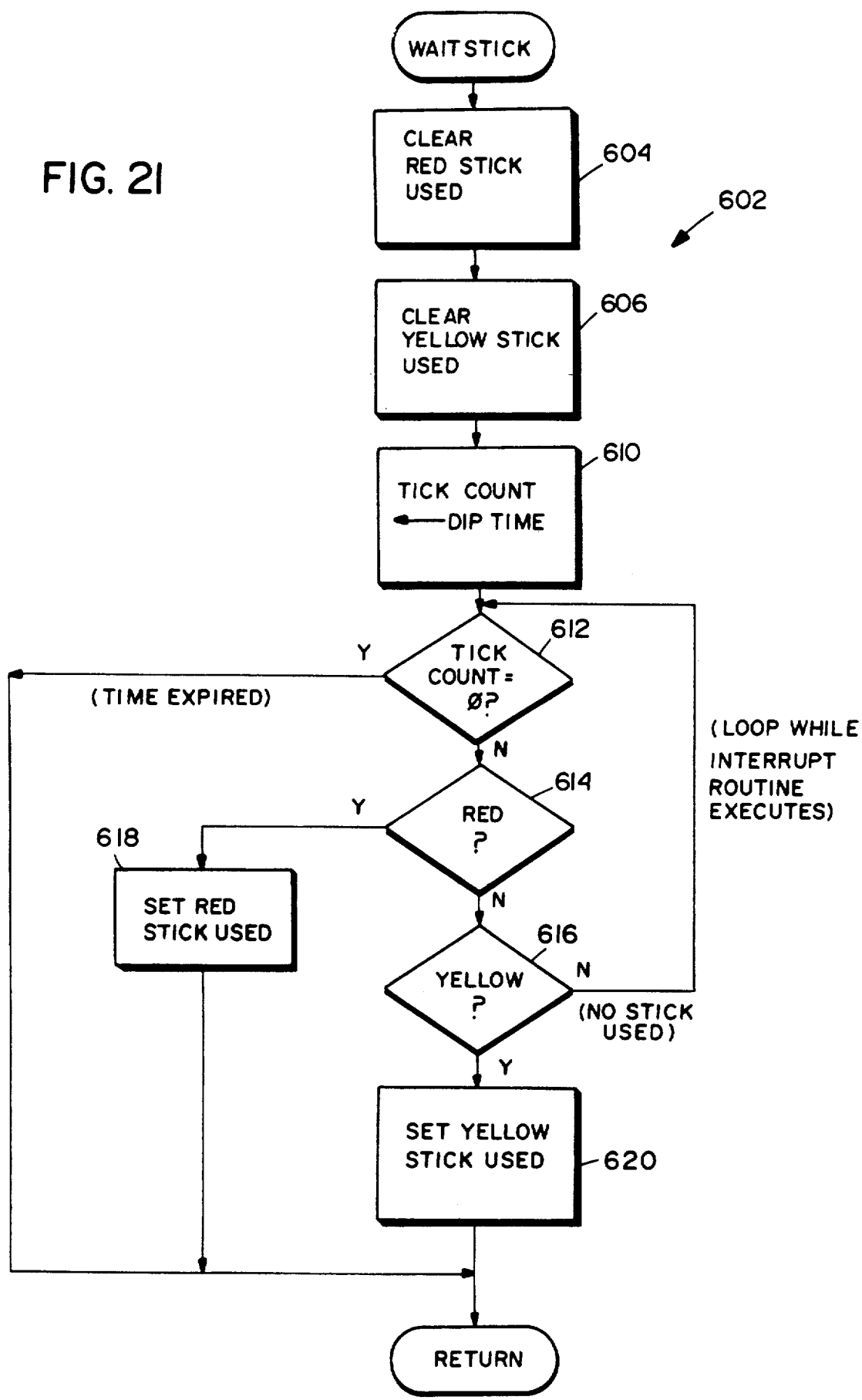

FIGS. 20 and 21 are flow charts of two additional routines used in the preferred embodiment to condition the performance of certain other steps on operation of input switch 102. FIG. 20 shows a routine 590 called long yellow which permits time encoding of the yellow stick. As described previously, sometimes the preferred embodiment performs different options depending upon how long the user has depressed the yellow stick (or the red stick). Routine 590 makes use of the tick count counter described in connection with FIG. 17 by loading this counter with the value of twice the time between the scans (as programmed by setup interface 68 shown in FIG. 1) (block 592). Routine 590 then waits for a FIG. 17 interrupt routine to clear the flag YELLOW (routine 590 is only called after yellow stick has been depressed and this routine in effect times how long the yellow stick remains depressed). If FIG. 17 interrupt routine decrements the tick count 804 before the yellow stick is released (decision block 596), the routine sets a flag called long yellow (block 598) indicating that the user has issued a long yellow stick. If, on the other hand, the yellow stick has released before tick count 804 had decremented to zero (decision block 594), routine 590 returns a clear long yellow flag (block 600) indicating that only a short yellow was issued. A "long red" FIG. 17 volume is also provided for the red stick.

FIG. 21 is a flow chart of exemplary program control steps performed by a routine 602 called "wait stick" the option of which is to determine whether input switch 602 is operated within a certain time period. Routine 602 first clears the red stick and yellow stick used flags (blocks 604, 606), and then sets the tick count counter 804 to the time between scans programmed by setup interface 68 (block 610). The routine then determines via decision blocks 612, 614 and 616 whether the time between scans has expired without the user operating input switch 102. If the time has expired (decision block 612), routine 602 clears both the red stick used and yellow stick used flags. On the other hand, if red stick is depressed before this time expires, the red stick used flag is set (block 618); and similarly if the yellow stick is depressed before this time is expired, the yellow stick used flag is set (block 620).

Wait stick routine shown in FIG. 21 is used in the preferred embodiment by scan routine 514—which will now be described in connection with FIG. 22. The option of scan routine 514 is to scan through a option control sequence, provide the audible prompts associated with the sequence, and determine whether the user selects one of the options in the sequence (and if a selection occurs, which option is selected). Referring now to FIG. 22 and FIGS. 27A and 27B together, scan routine 514 is provided by the calling routine with the address of a sequence list stored in memory 60. Several such lists are stored in memory 60, each corresponding to a different control sequence. For example, the root control sequence is contained in a list 802 shown in FIGS. 27A and 27B which contain, in sequence, the value microprocessor 52 needs to send to speech synthesizer 94 in order for the speech synthesizer to provide audible prompts corresponding to the root control sequence. Thus, list 802 corresponding to the root control sequence contains National Semiconductor-specific values corresponding to the sequence of phrases "one", "two . . . , zero"—these audible prompts indicating, in the preferred embodiment, different options available within the root control sequence. State variable I points to the current (e.g., the last selected) state within the root control sequence. Scan routine 514 copies the value of state variable I into its own state variable J (block 624), calls neutral stick routine 569 to wait for the user to release the stick to begin scanning the sequence, and then calls wait stick routine 602 to wait for the user to operate input switch 102 during a timed delay set by setup interface 68 as a delay time between scans (proper precautions may be taken to insure that this delay time can never be zero). Wait stick block 602 at the beginning of scan routine 514 allows the user to select the last-selected state of the control sequence being used (e.g., the root control sequence) before a prompt occurs and also introduces a delay between scanning begins and the time a first audible prompt is issued to give the user time to get ready to operate input switch 102 again. If the user operates user switch 102 within the delay time timed by wait stick routine 602, the value of state variable I is not changed and scan routine 514 returns indicating a good selection has been made and that this selection corresponds to the last-selected state (decision block 604). If the user does not operate input switch 102 within the time period timed by wait stick routine 602 (N exit of decision block 604), decision 636 tests whether the end of the current list has been reached (this test may be performed by passing the number of list entries to be scanned to scan routine 514 in a). If the end of the list has been reached ("Y" exit of decision block 636) without the user having selected an option, the good selection flag is reset and speech synthesizer 94 is controlled by microprocessor 52 to speak a high tone indicating no selection was made (blocks 638, 640). Scan routine 514 then returns after setting the value of state variable I to the value of local variable J (block 642)—the effect of which is to reset state variable I to the beginning of the current control sequence. The scan routine also may set a flag good-selection to false.

If decision block 636 indicates the end of the current list has not yet been reached, synthesizer 94 speaks the audible prompt corresponding to the entry in the list currently indexed by local state variable J (e.g., by simply reading the contents of the entry in sequence list 802 indexed by variable J and providing it to speech synthesizer 94). Routine 514 then calls wait stick routine to give the user a chance to select the option just spoken by operating switch 102. If the user does not select this option (decision block 646), the local state variable J incremented (block 648) and block 636-646 are executed again to give the user a chance to select the next sequential option in the control sequence. If no selection is made before the end of the control sequence is reached, the value of count is returned for I (block 642). Zero is a valid answer and indicates the first element in the list. When scan is called it is given a list and a count of items in that list. When scan returns, its value $\geq 0$ and $\leq$ count. If return value = count, then scan ran off the end of its list. If a selection is made, on the other hand, block 650 causes routine 514 to return the number of the selection to the calling routine for decoding further action.

Figure 21A:
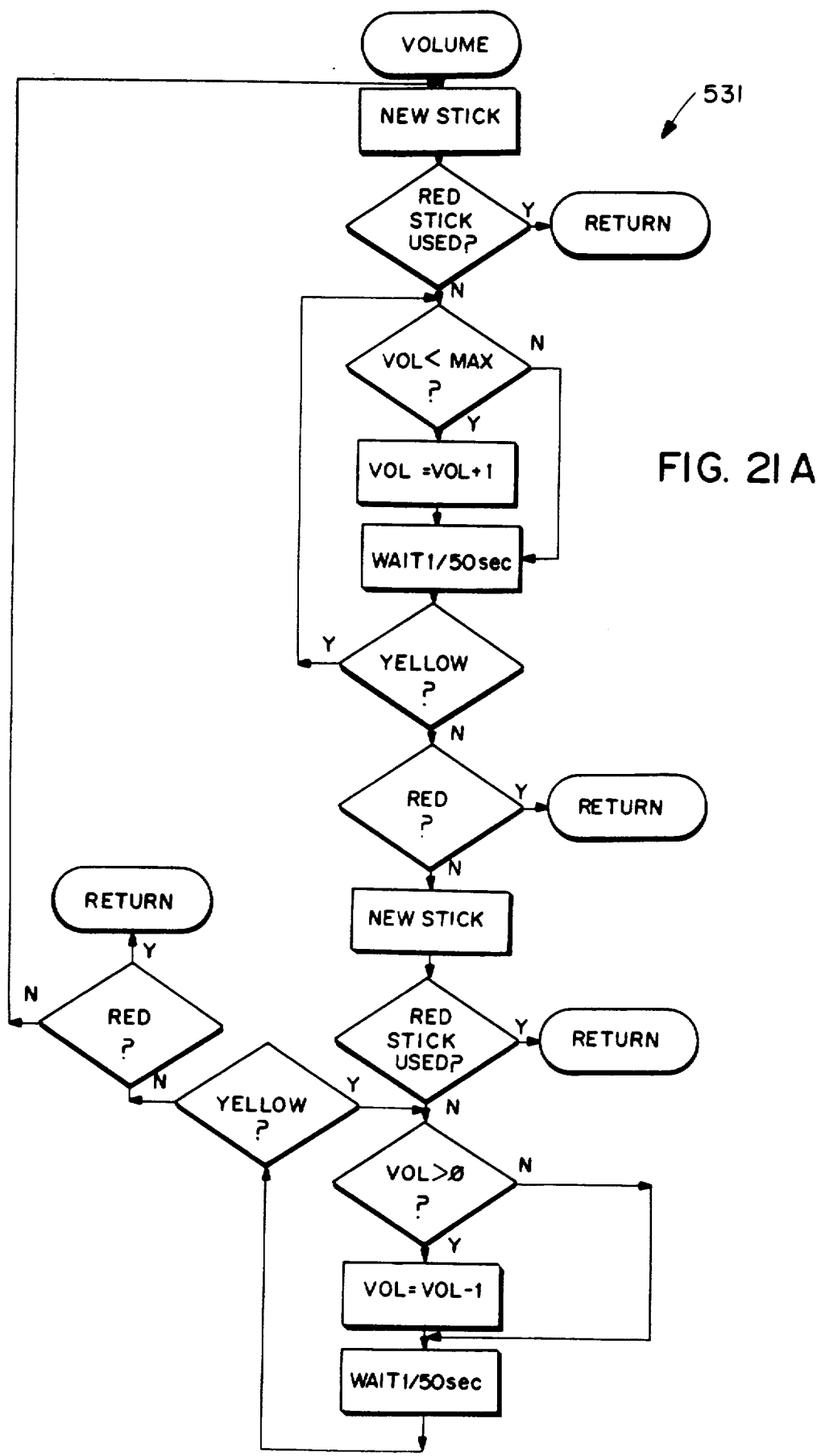

FIG. 21A is a flowchart of exemplary program control steps performed by volume routine 531 shown in FIGS. 16A and 16B. As can be seen from the steps shown in FIG. 21A, the volume routine 531 permits the user to control the volume of audio produced at the output speakers of audio sharing circuit 80. Upon selecting the volume option from the root control sequence, the user may increase the value of a variable called "vol" by holding down yellow stick (blocks 900-906). In the preferred embodiment, if the user releases yellow stick and then depresses yellow stick again, the variable "vol" is decremented regularly for the time the user holds down yellow stick (blocks 908-914). The variable—"vol" is written to attenuators 186a, 186b to control the audio output level of audio sharing circuit 80 to speakers 82, 84. The user may exit the volume routine 531 at any time by providing a red stick. Note that the volume routine 531 is typically invoked after the user has provided other control sequences to activate another device (e.g., telephone, am/fm radio, etc.) to provide an audio output. Thus, once the user has made a sub-option control selection, he can leave the sub-option control sequence, return to the root control sequence, and invoke a sub-option selection from an entirely different sub-function control sequence while maintaining the results provided by the first sub-option control selection.

Figure 23A:
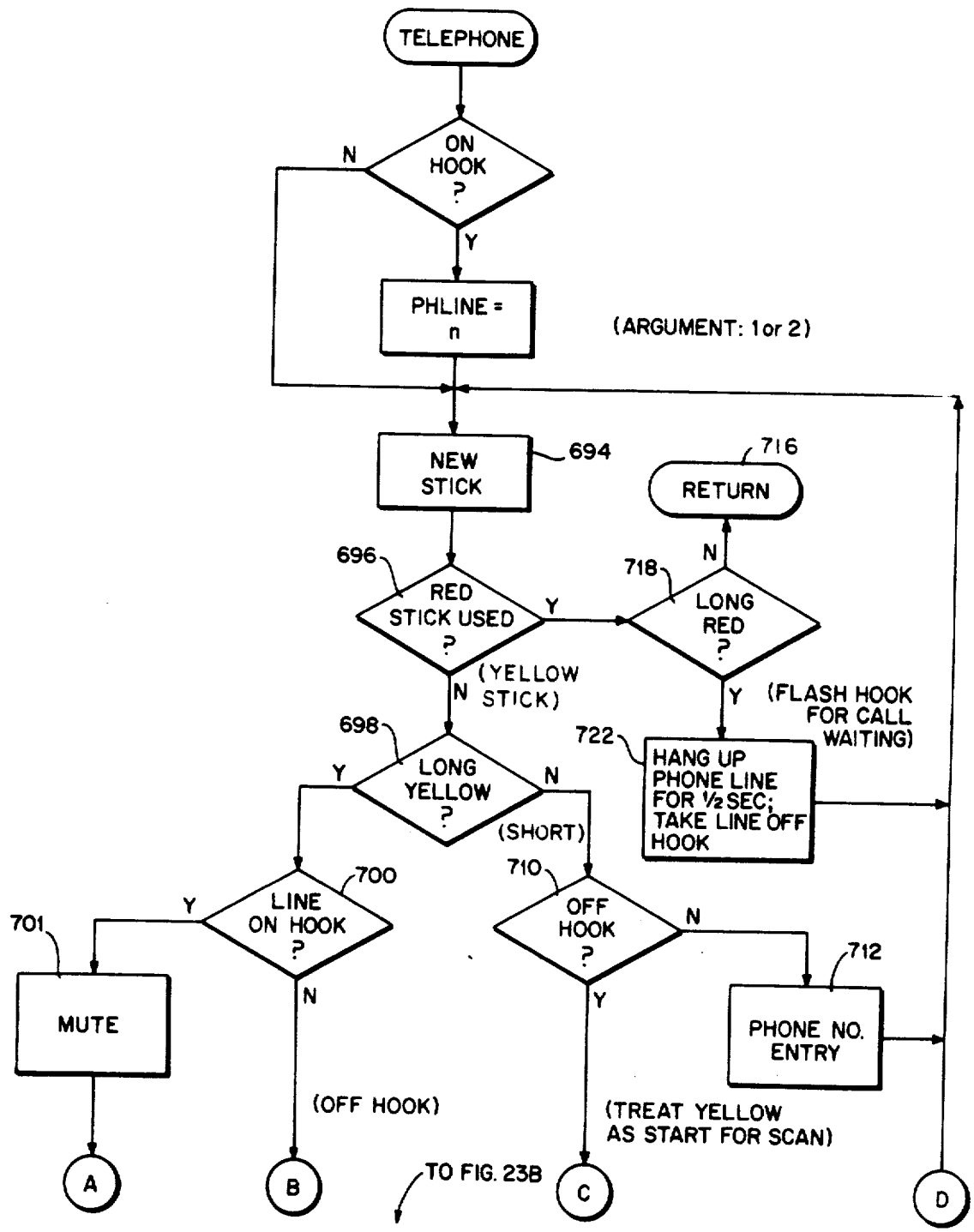
Figure 23B:
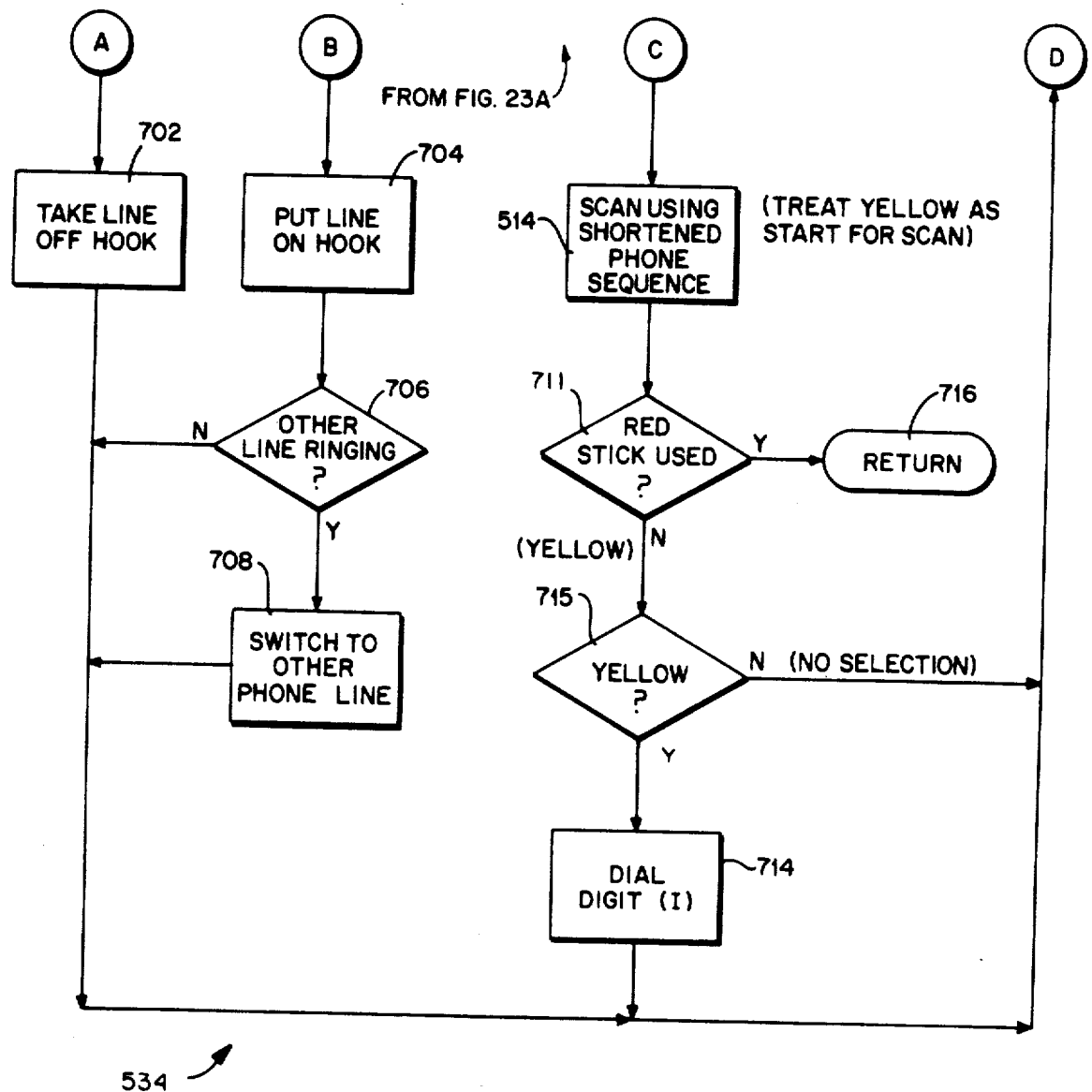

FIGS. 23A and 23B are together a flow chart of exemplary program control steps performed by telephone routine 534 shown in FIGS. 16A and 16B. Telephone routine 534 permits the user to operate and control telephone control interface 66. In the preferred embodiment, the telephone line is selected by stopping on channel 2 or channel 3 of the root menu. A bit flag is set for appropriate telephone line select 112 hardware. The telephone routine is also preferably passed a parameter telling it which telephone line (1 or 2) to use.

Routine 534 first calls the new stick routine 510 to require the user to release input switch 102 and again actuate the input switch. If the user actuates input switch 102 with a yellow stick (decision block 512), routine 534 tests whether the actuation was a long yellow or a short yellow (decision block 514) using long yellow routine 590 shown in FIG. 20. If the user provided a long yellow, then it is determined whether the selected line is on-hook or off-hook (decision block 700). If the line is on-hook, routine 534 takes the line off-hook in response to the long yellow (block 702) by changing the state of relay 118 shown in FIG. 2. If the line was off-hook, routine 534 puts the line back on-hook (block 704) and then checks whether the other telephone line is ringing (e.g., by looking at the output of one-shot 128, 130) associated with the other telephone line (decision block 706). If the other line is ringing, then the routine 534 actuates line select relay 112 (which may be set before block 694 if phone is "on-hook") to be switched to the other telephone line (block 708) so the user may answer the other line if desired.

If decision block 698 determines that the user did not depress a long yellow, then the user must have depressed a short yellow and program control steps are called to permit the user to dial a telephone number. Decision block 710 first determines whether the telephone is on-hook or off-hook. If the line is on-hook (i.e., hung up), a routine called phone number entry 712 is called to permit the user to assemble a telephone number off line. If, on the other hand, decision block 710 determines that the telephone line is off-hook, the scan routine 514 shown in FIG. 22 is called and requested to scan the shortened phone control sequence list 806 shown in FIGS. 27A and 27B which includes the digits 1-0. Scan routine 514 scans through this sub-option control sequence list 806 one time and allows the user to selects one of the control sequence options by providing yellow stick (tested for by decision block 516). If yellow stick is provided (block 713), the digit returned by scan routine 514 is dialed using DTMF tone encoder 110 (block 714). Control then returns to block 694 to await another yellow stick for an additional scan. If a red stick is provided at this point (decision block 710), a return to the root control sequence occurs (block 716).

Referring back again to decision 698, if a red stick is provided instead of a yellow stick upon entry of the telephone control sequence, routine 534 determines whether the red stick is a long red or a short red (decision block 718), using a copy of the long yellow routine 590 shown in FIG. 20 for decoding red stick. A short red causes control to return to the root control sequence (block 720). A long red, on the other hand, controls system 52 to hang the telephone line back up one half second and to take the line off-hook again—permitting the user to access the call waiting feature (block 722).

Figure 24A:
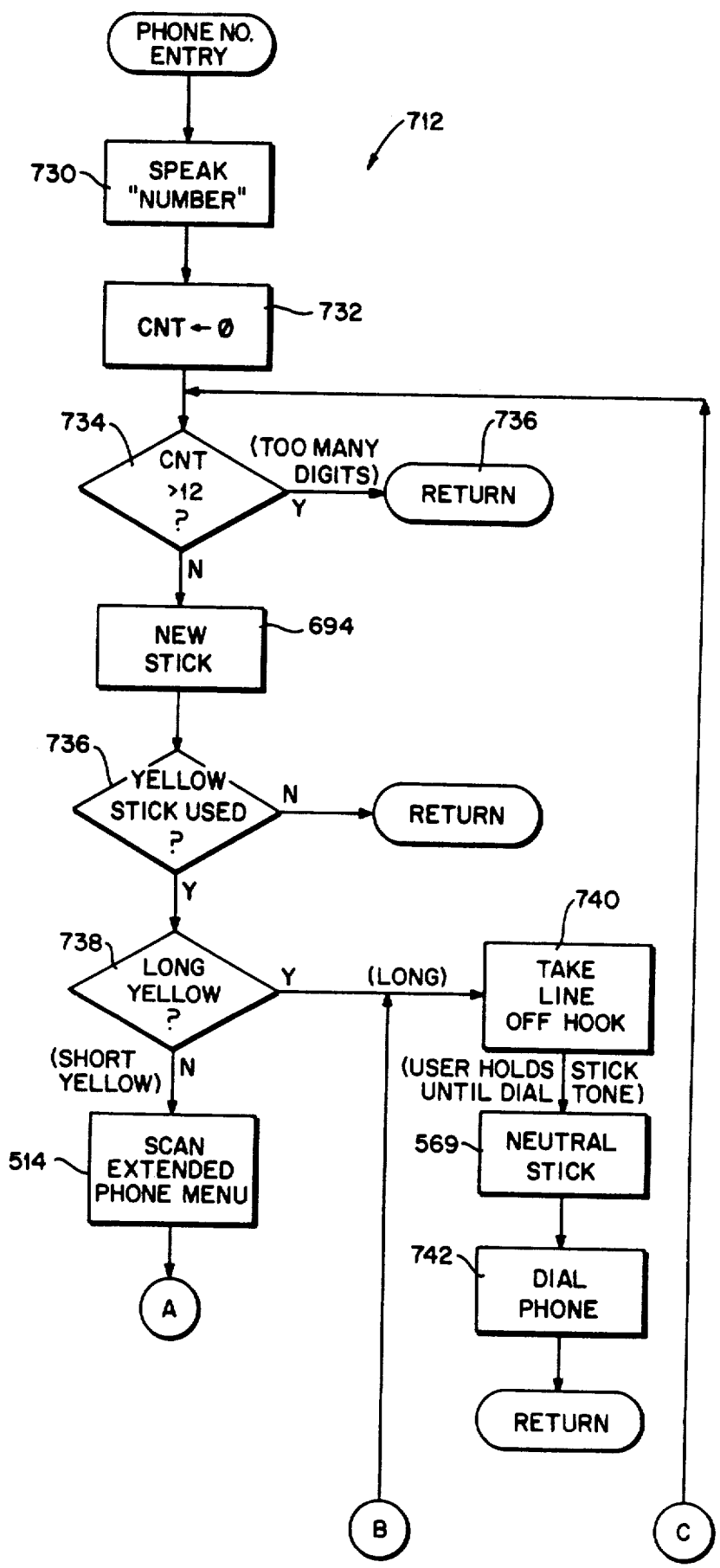
Figure 24B:
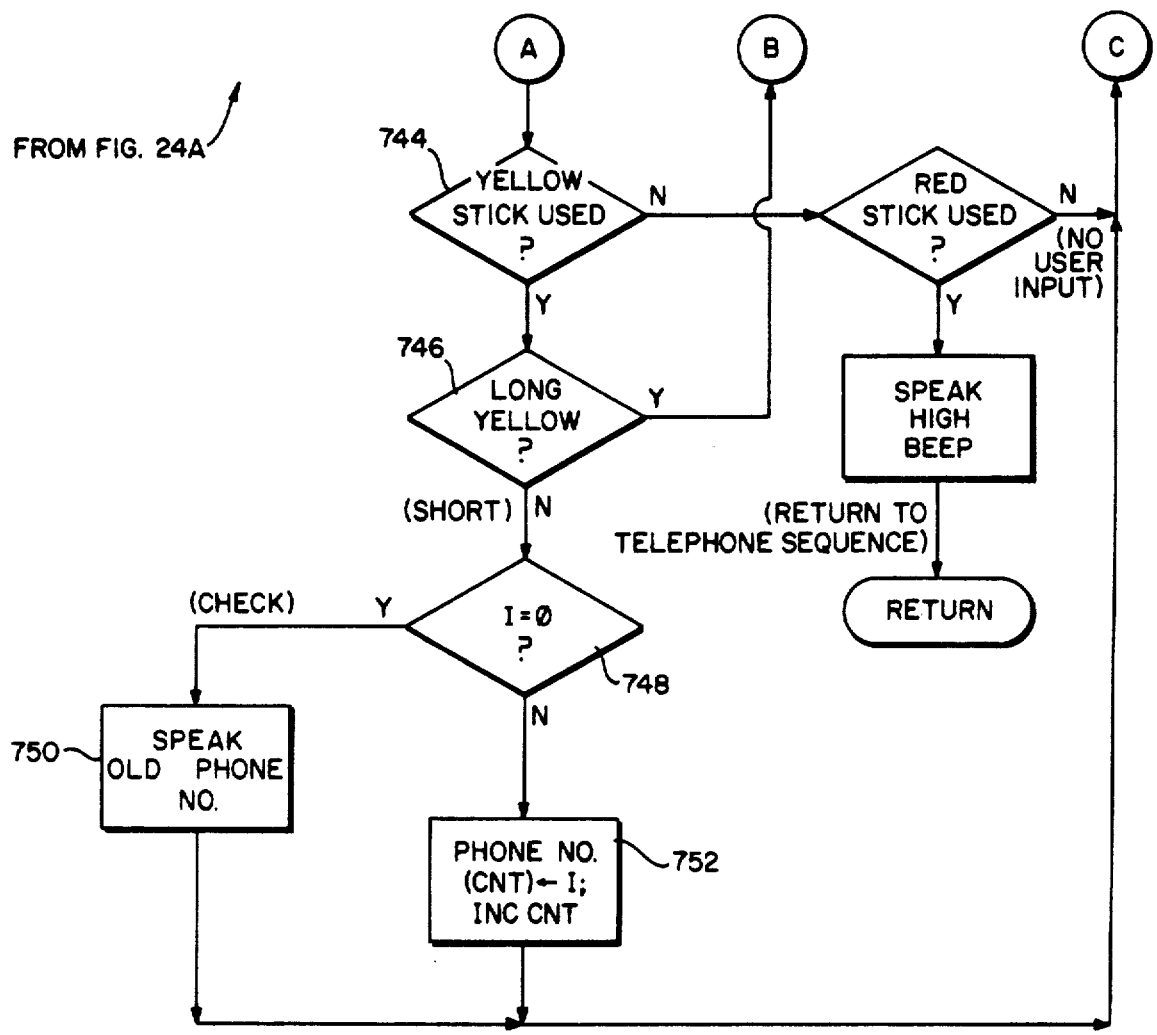
Figure 24C:
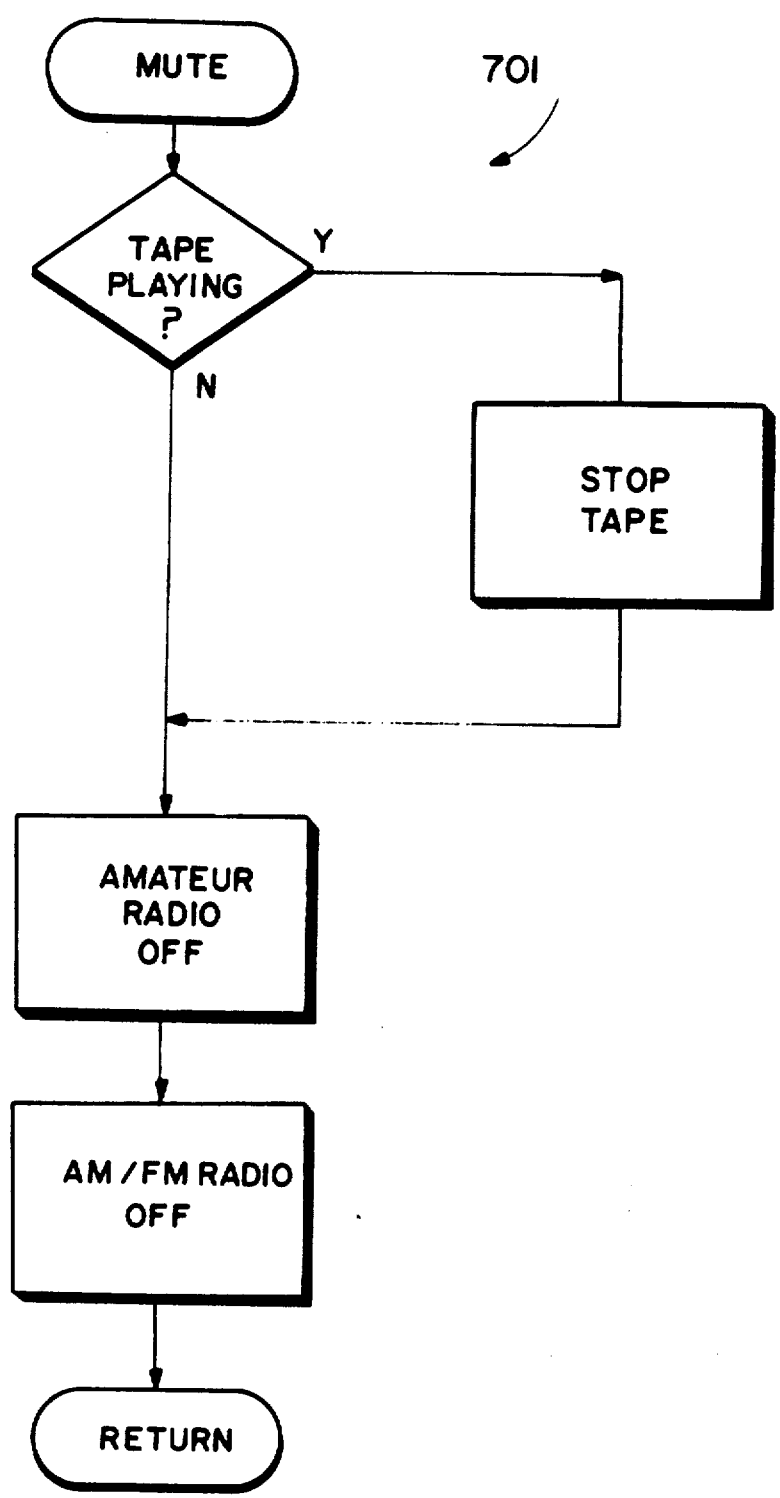

FIGS. 24A and 24B are together a flow chart of exemplary program control steps performed by phone number entry routine 712 shown in FIG. 23A and 23B. Routine 712 permits the user to assemble a telephone line off line and then dial it; and also permits the user to check a previously assembled telephone number stored in memory. Routine 712 makes use of the phone number data structure 810 for telephone line 1 data structure 810 and a different telephone line data structure 812 for telephone line 2, both of these data structures being stored in random access memory. Although system 50 in the preferred embodiment is capable of storing only two telephone numbers, additional random access memory would permit storage of multiple user-defined telephone numbers—preferably under a further sub-sub-option control sequence which catalogs the stored telephone numbers.

Routine 712 first speaks the phrase "number" (block 730) and then sets a string length counter CNT equal to zero (block 732). Decision block 734 then determines whether the string length counter exceeds the maximum length of data structures 810, 812. In the preferred embodiment, if this string length is exceeded the entire stored telephone number is simply erased and the user must begin again (block 736). If the string length counter is within a permissible range (decision block 734), the new stick routine 694 is called to wait for the user to release and reactuate input switch 102. If the user provides yellow stick (decision block 736), decision block 738 determines whether a long or a short yellow has been provided. A long yellow controls system 50 to take the telephone line off-hook (block 740), to wait for the user to release the long yellow stick when he hears dial tone (neutral stick routine 569) and to dial the telephone (block 742) by transmitting in DTMF tone pairs the contents of the appropriate ones of data structures 810, 812. If decision block 738 detects short yellow, on the other hand, the off line number assembly sub-option control sequence is entered to permit the user to either check the number previously stored in data structure 810, 812, or to enter a new digit into the data structure (scan routine 514 using the extended phone sequence 806 shown in FIGS. 27A and 27B, including the "*", "#" characters).

If the user provides yellow stick (decision block 744) to select one of the options on the sub-option control sequence, decision block 746 tests whether the user provided either long or short yellow. Long yellow causes blocks 740-742 to be executed. Short yellow, on the other hand, causes decision block 748 to test whether the "check" option has been selected. If "check" has been selected, speech synthesizer 94 is controlled to speak the entire contents the appropriate one of data structures 810, 812 so that the user can verify the contents and/or determine what number was previously stored in the data structure (block 750). After block 750, control returns to decision block 734 to await user instructions—without changing the contents of data structures 810, 812 so that these contents are preserved if the user wants to simply dial a prestored number. If, on the other hand, decision block 748 determines that the user selected any option other than the "check" option from the sub-option control sequence, the appropriate one of data structures 810, 812 is overwritten beginning at its first entry with the new digit the user just selected (block 752) and the variable CNT is incremented to point to the next entry in the data structure.

FIG. 24A is a flowchart of exemplary program control steps performed by the mute routine 701 shown in FIGS. 23A and 23B. The mute routine 701 simply deactivates the audio outputs of uses competing with the telephone use (e.g., the AM/FM radio use, the amateur radio use and the tape player use) so that the user does not have to manually deactivate each of these devices before answering the telephone. Mute routine 701 merely deactivates these devices—it does not inhibit them. Thus, the user can manually reactivate them if desired after he answers the telephone (e.g., to play a tape back to a person he has called).

Figure 25:
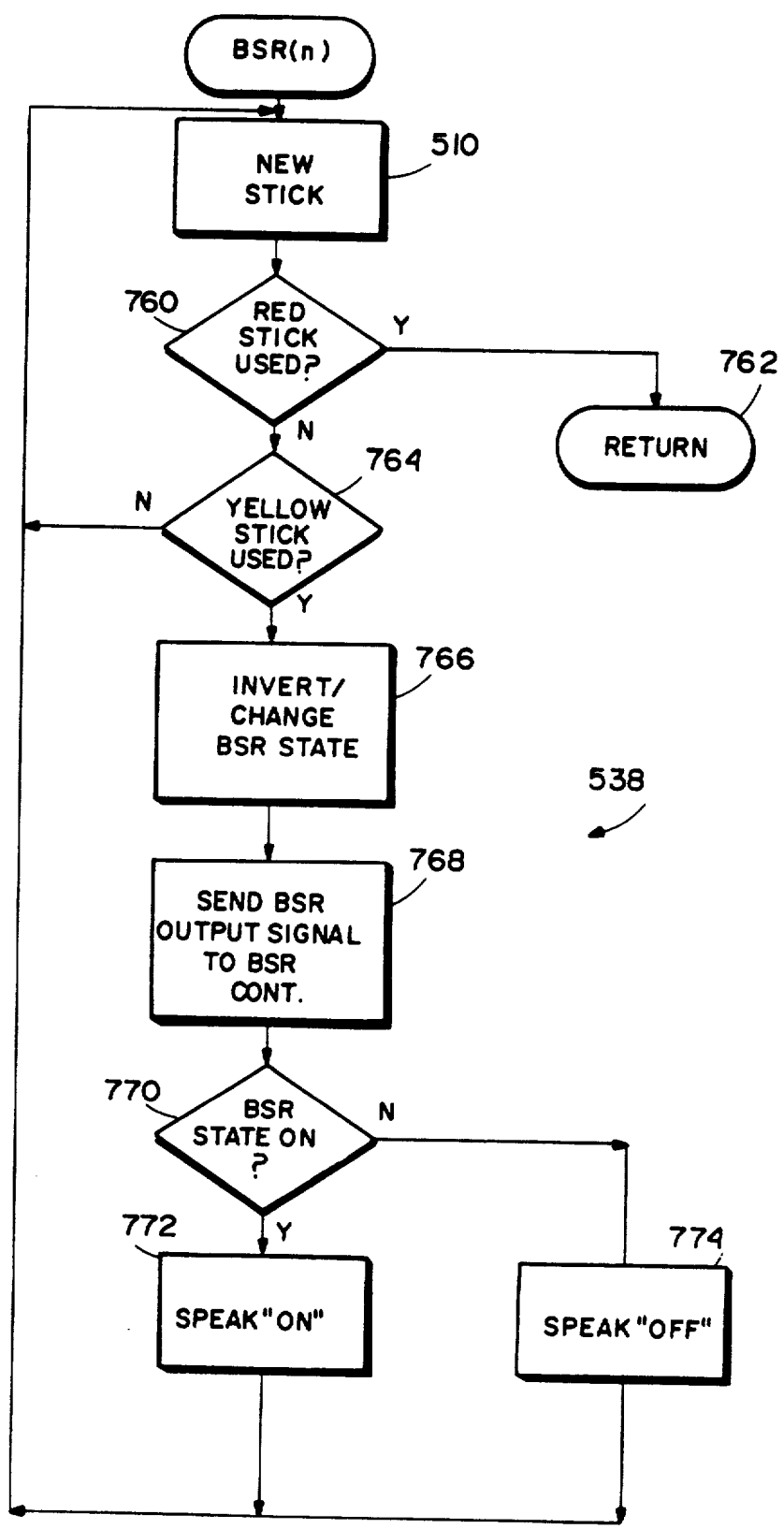

FIG. 25 is a flowchart of exemplary program control steps within the BSR control routine 538 shown in FIGS. 16A and 16B. BSR routine 538 controls the operation of the various BSR modules 166 shown in FIG. 7 by transmitting data via the microprocessor 52 serial output to BSR controller 164. BSR routine 538 is passed a parameter n by the FIGS. 16A and 16B routine which specifies which of modules 166 is to be controlled—this parameter value n depending upon which one of the root control sequence BSR options the user selected to gain access to the BSR routine.

BSR routine 538 first calls the New Stick routine 510, which requires the user to release input switch 102 and operate the input switch again. If the user provides red stick (decision block 760), a return to the root control sequence occurs (block 762). If yellow stick is provided (block 764), on the other hand, the current state of BSR module n is toggled by reading the current state of the corresponding latched output port (these states are maintained in a data structure 814 in RAM) and inverting the current state (block 766), and subsequently transmitting the new state to the BSR module 166 via BSR controller 164 (block 768). Speech synthesizer 94 then announces the new state of the BSR module by speaking the phrase "on" or "off" in accordance with the new state now stored in data structure 814 (blocks 770-774).

FIGS. 26A and 26B are together is a flowchart of exemplary program control steps performed by the AM/FM radio control routine 540 shown in FIGS. 16A and 16B. This routine 540 controls the operation of radio control interface 72.

Routine 510 waits for a "new stick" indicated by new stick routine 510, and then tests whether a red stick is used (decision block 776). If a red stick is used, a return to the FIGS. 16A and 16B routine block 510 is performed (e.g., a return back to the root control sequence occurs). If a yellow stick is used, on the other hand, microprocessor 52 tests whether the AM/FM radio is on or off (decision block 778)—since no control options relating to the radio can be performed unless the radio is on. If the radio is off, the yellow stick causes the radio to be turned on (block 780). If the radio is already on and the user has issued a long yellow (decision block 782), the radio is turned off (block 784). If the radio is already on and the user has issued a short yellow (the "N" output of decision block 782), the scan routine 514 is called and passed the radio sequence list 816 shown in FIGS. 27A and 27B so that the radio control sequence is scanned.

If the user provides red stick during the scan (decision block 786), a return to the FIGS. 16A and 16B routine (the root control sequence) occurs (block 788). If, on the other hand, the user selects one of the options in the radio control sequence by depressing yellow stick (block 790), decision blocks 850-866 determine (from the state variable returned by the scan routine) which option the user selected and initiate the appropriate control option. The first option (corresponding to the audible prompt "UP") controls the radio 72 to enter the seek up mode (block 868) by actuating opto-isolator 142(8) shown in FIG. 4. The second option (corresponding to the audible prompt "DOWN") controls the radio to enter the seek down mode (block 870), and selection of the third option (the audible prompt for which is "P" in the preferred embodiment) causes the radio to enter the preset scan mode. The remaining options save the last one control the radio to retune to different preset frequencies (blocks 874, 876, 878, 890, 892)—and each of these blocks includes a call to neutral stick routine 569 (not shown) so that the preset memory button is not released until the user releases yellow stick (to permit the user to program radio 140 himself using a combination of the seek option and a set preset memory option provided by the radio when the preset memory button is depressed for more than a certain time period).

The program control instructions used in the preferred embodiment to control the amateur radio control interface 76 are similar to those shown in FIGS. 26A and 26B except that the amateur radio sequence control list 818 is passed to scan routine 514 instead of the radio sequence routine 816. The first option in the amateur radio control sequence is the push-to-talk option (and corresponds to the audible prompt "over"). If the user provides yellow stick to select this first option, the amateur radio transceiver will switch into the transmit mode and remain transmitting until the user releases yellow stick. If the set up interface specifies latched mode for push-to-talk, then another yellow stick is required before the transmitter is unkeyed—just as for intercom mode.

FIGS. 16C and 26D are together a flowchart of exemplary program control steps within the tape routine 536 shown in FIGS. 16A and 16B. Tape routine 536 controls the tape recorder control interface 74 in the preferred embodiment.

Tape routine 536 first calls the new stick routine 510 to require to release input switch 102 and re-operate the input switch. If red stick was provided (decision block 890), a return to the FIGS. 16A and 16B routine (and thus the root control sequence) is performed (block 892). If a yellow stick is provided, on the other hand, the scan routine 514 is called is provided with the (address of the) tape sequence list 820 shown in FIGS. 27A and 27B. If the user provides a red stick (tested for by decision block 894), a return to the FIGS. 16A and 16B routine is performed.

If a good selection provided by yellow stick occurs (block 895), decision block 896 tests whether the user selected the first option (corresponding to the audible prompt "Speed" in the preferred embodiment). This first option is used in the preferred embodiment to select whether tape recorder 148 is in the record mode or in the stop mode. If the first option is selected, the new stick routine is called again to require the user to release and again operate input switch 102 before the mode of tape recorder 148 is actually changed. If the user depresses red stick (decision block 900), a return to the first new stick block 510 at the top of FIG. 26B is performed (and not a return all the way to the FIGS. 16A and 16B routine). If the user provides yellow stick, then decision block 902 determines whether the tape recorder 148 is in the record mode or not (e.g., by checking the values stored in a data structure 822 stored in the RAM which provide latched outputs to control relays 150 shown in FIG. 5). If the tape recorder is already in the record mode, block 904 switches it to the stop mode (e.g., by deactivating record relay 150(4)). If the tape recorder is in the play mode, block 906 switches it to the record mode.

If the user selected the fourth option in the tape recorder option selection list (corresponding to the audible prompt "P" for "play") (decision block 898), then the new stick routine 510 is called to require the user to release and the re-operate input switch 102. If the user provides a red stick (decision block 908), a return to the top of FIG. 26C occurs. If the user provides a yellow stick, then decision block determines whether the tape recorder is stopped (by referring to data structure 822; decision block 910). If the tape is stopped, relay 150(5) is closed to run the tape (block 912). If the tape is already running, the relay is opened to stop the tape (block 914).

A similar sequence of steps shown in blocks 916-928 is used to activate fast-forward and rewind tape movement, except that instead of toggling the tape recorder 148 operating mode between two states, the mode is toggled between four modes. For fast forward, the tape recorder will be stopped if it is running (blocks 920, 928). If the tape is stopped but was last running in the fast forward mode (block 922), the tape recorder 148 is put in the play mode (block 924). Similarly, if the tape is stopped but was last running in the play mode (block 922), the tape recorder is placed in the fast forward mode (block 926). Similar steps (not separately shown in FIGS. 26C and 26D) control the rewind option. By alternating the tape recorder 148 between stop-play-stop-fast forward (rewind), the user is able to more easily locate a desired point on the tape to listen to.

As can now be appreciated, the present invention provides an environmental control system which is very easy to use, yet provides the user with a high degree of control over a large number of different devices through operation of a simple two-position joystick, sip-and-puff switch, or the like. A hierarchical user interface structure provides multiple nested levels of scannable option control sequences which present the user with different control options in an order which makes sense and facilitates quick and simple accomplishment of desired tasks with minimal user confusion. Related options are presented together in the same scannable option control sequence, and subsidiary related options may be provided in a further sub-option control sequence at a lower level in the control sequence hierarchy. Selection of certain options cause logically related events to occur simultaneously (e.g., taking a telephone line off hook causes the AM/FM radio output to be muted if the radio is on) to reduce the number of different control options the user must select to accomplish a given task and increase user friendliness. Consistency is maintained throughout the user interface so that similar operations of the input switch produces similar results. Upward traversal through the hierarchical control sequence structure is made easy using this technique. Meanwhile, the system generally "remembers" the last-selected option and begins scanning control sequences at that option rather than at the beginning of the control sequence to provide easy recovery from accidental operation of the input switch and help the user determine where he "is" in the hierarchy of control sequences.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for providing a handicapped user with control over his environment comprising the steps of
    (a) presenting, one at a time in a predetermined sequence, a first set of options to said user;
    (b) selecting one of said options within said first set in response to user manipulation of a control having first and second active positions in synchronism with the time said one option is presented to said user;
    (c) presenting one at a time, in sequence, a further set of options different from said first set of options to said user in response to said selecting step (b);
    (d) subsequent to said step (b), repeating said presenting step (a) in response to further user manipulation of said same control to said first active position;
    (e) selecting one of said options within said further options set in response to further user manipulation of said same control to said second active position in synchronism with the time said one of said further options is presented to said user; and (f) controlling the operation of an appliance in response to said selecting step (e).

2. A method as in claim 1 wherein said controlling step (f) comprises the concurrent steps of:
(i) enabling the audio output of a first appliance; and
(ii) muting the audio output of a further appliance.

3. A method as in claim 1 wherein said presenting steps (a) and (c) each include the step of synthesizing audible prompts corresponding to said presented control options.

4. A method as in claim 1 wherein said controlling step (f) is performed in real time in response to said further user manipulation of said control to said second position.

5. A method as in claim 1 wherein:
said controlling step (f) controls said appliance to operate in a first operating mode; and
further selection of said one sub-option by said step (e) causes said controlling step (f) to control said appliance to operate in a second operating mode different from said first operating mode.

6. A method as in claim 1 wherein said selecting step (b) comprises the step of selecting said one option of said first option set in response to user manipulation of said control to said first position.

7. A method as in claim 1 wherein said controlling step (f) includes the following steps:
sensing the time duration over which said user control remains in said second active position; and
controlling said appliance in a manner response to said sensed duration.

8. A method as in claim 1 wherein said presenting step (c) is performed until said control is moved to said first active position.

9. A method as in claim 1 further including the step of presenting, to said user one at a time, a still further sequence of options different from said first and further sets of options in response to user manipulation of said control to said first position during said presenting step (a).

10. A method for providing a handicapped user with control over his environment comprising the steps of:
(a) providing said user with an input switch having first and second alternate active positions and a third, inactive position;
(b) audibly prompting said user with a sequence of options defined by a predetermined root control sequence;
(c) selecting one of said root control sequence options in response to user actuation of said input switch to one of said active positions in synchronism with the time said one option is presented to said user;
(d) audibly prompting said user with a sequence of sub-options associated with said option selected by said selecting step (c);
(d) repeating said prompting step (b) in response to further user actuation of said input switch in said first active position;
(e) selecting said one of said sub-options in said sub-option sequence in response to further user actuation of said input switch in said second active position in synchronism with the time said one sub-option is presented to said user; and (f) controller at least one operating parameter of an appliance in response to said selecting step (e).

11. A method as in claim 10 wherein said controlling step (f) includes the following steps:
sensing the time duration over which said user control remains in said second active position; and
controlling said appliance in a manner responsive to said sensed time duration.

12. An environmental control system for providing a handicapped user with control over his environment, said system of the type adapted for connection to a user-operable input switch having first and second alternate active positions and a third, inactive position, said system comprising:
means for providing a root control sequence including plural control options and for providing plural sub-function control sequences corresponding to and associated with said plural root control sequence control options, each of said plural sub-function control sequences including plural control sub-options ;
prompting means connected to said storing means for prompting said user one at a time with a sequence of audible prompts corresponding to said root control sequence control options;
processing means, connectable to said input switch, for:
(a) selecting a sub-function control sequence corresponding to a first root control sequence control option in response to user actuation of said input switch substantially in synchronism with the time the audible prompt associated with said first root control sequence option is provided by said prompting means, said prompting means audibly prompting said user with said sub-option control sequence in response to said selecting by said processing means,
(b) selecting one of said plural control sub-options in response to user actuation of said input switch to said first active position substantially in synchronism with the time said audible prompt associated with said one control sub-option is provided, and
(c) controlling said prompting means to again prompt said user one at a time with said sequence of audible prompts corresponding to said root control sequence control options in response to user actuation of said input switch to said second active position; and
function performing means connected to said processing means for performing a predefined function associated with said one control sub-option in real time in response to selection of said one control sub-option by said processing means.

13. A system as in claim 12 wherein:
said processing means includes means for sensing the time duration over which said input switch remains in said first active position; and
said function performing means includes means for controlling said appliance in a manner responsive to said sensed time duration.

* * * * *

UNITED STATES PATENT AND TRADEMARK OFFICE
CERTIFICATE OF CORRECTION

PATENT NO. : 5,016,003
DATED : May 14, 1991
INVENTOR(S) : Rice, Jr. et al.

It is certified that error appears in the above-identified patent and that said Letters Patent is hereby corrected as shown below:

In the drawings, sheet 4, delete Figure 5 and insert the attached Figure 4.

Signed and Sealed this

Twenty-third Day of November, 1993

Attest:

*Attesting Officer*

BRUCE LEHMAN

*Commissioner of Patents and Trademarks*

UNITED STATES PATENT AND TRADEMARK OFFICE
CERTIFICATE OF CORRECTION

PATENT NO. : 5,016,003

DATED : May 14, 1991

INVENTOR(S) : Rice, Jr. et al.

Page 2 of 2

It is certified that error appears in the above-identified patent and that said Letters Patent is hereby corrected as shown below:

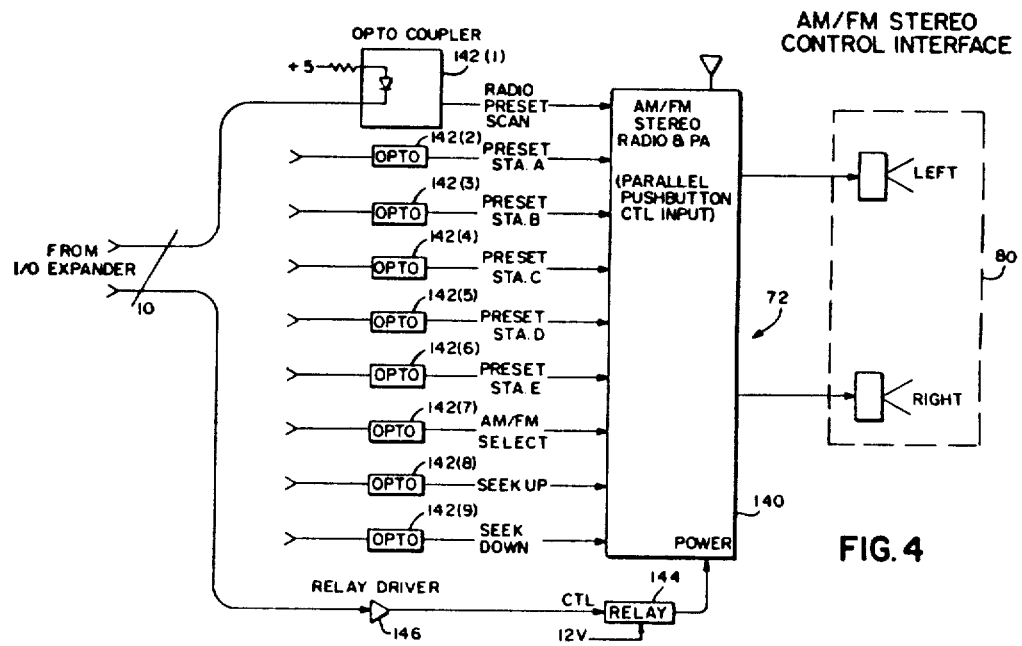

FIG. 4